US012293148B2

(12) United States Patent
Soyarslan

(10) Patent No.: US 12,293,148 B2
(45) Date of Patent: *May 6, 2025

(54) SYSTEM FOR SUPERIMPOSED COMMUNICATION BY OBJECT ORIENTED RESOURCE MANIPULATION ON A DATA NETWORK

(71) Applicant: LVT Enformasyon Teknolojileri Ltd. Sti., Beyoglu Istanbul (AR)

(72) Inventor: Osman Levent Soyarslan, Beyoglu Istanbul (AR)

(73) Assignee: LEATRON LLC, Dover, DE (US)

( * ) Notice: Subject to any disclaimer, the term of this patent is extended or adjusted under 35 U.S.C. 154(b) by 325 days.

This patent is subject to a terminal disclaimer.

(21) Appl. No.: 18/178,382

(22) Filed: Mar. 3, 2023

(65) Prior Publication Data

US 2023/0205981 A1 Jun. 29, 2023

Related U.S. Application Data

(63) Continuation-in-part of application No. 16/886,265, filed on May 28, 2020, now Pat. No. 11,625,448, (Continued)

(51) Int. Cl.
*G06F 40/169* (2020.01)
*G06F 16/906* (2019.01)
(Continued)

(52) U.S. Cl.
CPC .......... *G06F 40/169* (2020.01); *G06F 16/906* (2019.01); *G06F 16/9535* (2019.01);
(Continued)

(58) Field of Classification Search
CPC .. G06F 16/9558; G06F 3/0482; G06F 16/953; G06F 16/958; G06F 40/169
See application file for complete search history.

(56) References Cited

U.S. PATENT DOCUMENTS 6,877,137 B1 4/2005 Rivette et al.
8,713,438 B1 * 4/2014 Broniek ................ G06F 40/169
715/764
(Continued)

OTHER PUBLICATIONS

Gonzalo Navarro. 2001. A guided tour to approximate string matching. ACM Comput. Surv. 33, 1 (Mar. 2001), 31-88. https://doi.org/10.1145/375360.375365 (Year: 2001).*
(Continued)

*Primary Examiner* — Justin R. Blaufeld
(74) *Attorney, Agent, or Firm* — Crowell & Moring LLP

(57) ABSTRACT

An adaptive web resource interaction system based on analogue referencing includes a computer implemented method, a computer system, and a non-transitory computer readable medium to provide an autonomous infrastructure that enables an automatically controlled interaction environment on web resources for both human and machine users, where the system dynamically adapts itself to contextual and/or structural alterations of each interacted web resource according to each rendering of a client individually. Thus, within the scope of any data network including the Internet, the system provides an infrastructure that ensures the consistency (stability) and persistency (sustainability) of interactions, where human and machine users may interact with web resources by associating/integrating—and/or reaching to—virtually any kind of user input including user generated software applications—stored and executed by the system—that dynamically process/manipulate web objects, and interact with each other through those user inputs that act as network links.

31 Claims, 12 Drawing Sheets

Related U.S. Application Data which is a continuation-in-part of application No. PCT/TR2018/050742, filed on Nov. 28, 2018.

(60) Provisional application No. 62/591,750, filed on Nov. 28, 2017.

(51) Int. Cl.
*G06F 16/9535* (2019.01)
*G06F 16/957* (2019.01)
*G06F 40/123* (2020.01)
*G06F 40/14* (2020.01)

(52) U.S. Cl.
CPC ........ *G06F 16/9577* (2019.01); *G06F 40/123* (2020.01); *G06F 40/14* (2020.01)

(56) References Cited

U.S. PATENT DOCUMENTS

| | | | | |
|---|---|---|---|---|
| 11,625,448 | B2* | 4/2023 | Soyarslan | G06F 40/169 715/744 |
| 2004/0001093 | A1* | 1/2004 | Sellers | G06F 40/103 715/766 |
| 2004/0205542 | A1* | 10/2004 | Bargeron | G06F 40/169 715/201 |
| 2004/0205545 | A1* | 10/2004 | Bargeron | G06F 40/169 715/205 |
| 2004/0261016 | A1* | 12/2004 | Glass | H04L 51/212 715/230 |
| 2005/0091027 | A1* | 4/2005 | Zaher | G06F 40/169 703/22 |
| 2007/0174762 | A1* | 7/2007 | Plant | G06F 40/169 715/205 |
| 2008/0119235 | A1* | 5/2008 | Nielsen | G06F 3/04883 455/566 |
| 2009/0254540 | A1* | 10/2009 | Musgrove | G06F 16/951 707/999.005 |
| 2010/0070845 | A1* | 3/2010 | Facemire | G06F 40/169 715/753 |
| 2011/0258526 | A1* | 10/2011 | Supakkul | G06F 40/169 715/230 |
| 2012/0144286 | A1* | 6/2012 | Bank | G06F 3/0308 715/230 |
| 2012/0191728 | A1* | 7/2012 | Libin | G06F 16/9562 707/769 |
| 2014/0115441 | A1* | 4/2014 | Badoiu | G06F 40/169 715/230 |
| 2014/0344658 | A1* | 11/2014 | Srinivasan | G06F 40/279 715/205 |
| 2014/0380142 | A1* | 12/2014 | Mikutel | G06F 9/451 715/234 |
| 2015/0186350 | A1* | 7/2015 | Hicks | G06F 3/04842 715/230 |
| 2015/0278180 | A1* | 10/2015 | Nicholas, Jr. | G06F 3/04883 715/230 |
| 2017/0006349 | A1* | 1/2017 | Song | H04N 21/6379 |
| 2018/0173381 | A1* | 6/2018 | Bakker | G06F 16/986 |
| 2019/0147026 | A1* | 5/2019 | Jon | G06F 3/04883 715/230 |
| 2019/0294660 | A1* | 9/2019 | DeVoe | G06F 40/169 |
| 2020/0073903 | A1* | 3/2020 | Jain | G06F 40/117 |
| 2021/0141991 | A1* | 5/2021 | Pinnamaneni | G06F 3/0483 |

OTHER PUBLICATIONS

International Search Report and Written Opinion, dated May 13, 2019, pp. 1-12, issued in International Application No. PCT/TR2018/050742, European Patent Office, Rijswijk, The Netherlands.

Kahan, J. et al., "Annotea: an open RDF infrastructure for shared Web annotations," dated Aug. 5, 2002, pp. 589-608, Computer Networks, Elsevier, Amsterdam, The Netherlands, XP004369434.

Glover, I. et al., "Online annotation—Research and practices," dated Aug. 23, 2007, pp. 1308-1320, Computers & Education, vol. 49, No. 4, Pergamon, Amsterdam, The Netherlands, XP022208849.

* cited by examiner

SYSTEM FOR SUPERIMPOSED COMMUNICATION BY OBJECT ORIENTED RESOURCE MANIPULATION ON A DATA NETWORK

RELATED APPLICATIONS

This application is a continuation-in-part of U.S. patent application Ser. No. 16/886,265 filed May 28, 2020, which is a continuation-in-part of International Application No. PCT/TR2018/050742 filed Nov. 28, 2018, which takes priority from U.S. Provisional Patent Application No. 62/591,750 filed Nov. 28, 2017, all of which are hereby incorporated by reference.

TECHNICAL FIELD

This disclosure relates generally to data processing and more particularly to graphical user interface and document processing in regard to a knowledge-based system that provides an interactive communication medium on resources of a data network, such as on web resources of the Internet. In this context, the described system directly relates to some sub-fields of artificial intelligence, such as knowledge representation & reasoning and indirectly relates to natural language processing, machine learning, computer vison, pattern recognition, hybrid intelligence, etc.

BACKGROUND

The growth of Internet in the last decade has also seen an exponential growth of websites related to different areas. There are news websites, e.g., BBC.com™, CNN.com™, social networking websites, e.g., Facebook.com™, Twitter.com™, e-commerce websites, e.g., Amazon.com™, Alibaba.com™, official websites such as corporate, institutional, or governmental websites, e.g., Shell.com™, Whitehouse.gov, Un.org.

Currently the majority of the official websites do not allow user interaction at their web pages. For example, almost none of the corporate, institutional, or governmental websites allow the publication of comments or any form of user generated content. Moreover, there are major news websites that fall into this category such as BBC.com™. On the other hand, while other websites such as social networking websites or e-commerce websites allow user interaction, they may have technical limitations on publication of user generated content such as number of characters or time lag and/or they may have administrative limitations such as requiring an exclusive membership for providing comments. Further, user interaction may be controlled by moderation or censorship in accordance with the interests of the websites.

In addition, currently comments are usually presented at the lower end of user interfaces. In this presentation format the comments are typically ignored by a web page viewer, and it is also confusing when a web page includes such comments on multiple topics. Further, meaningful data, such as comments provided by a user on web pages, cannot be collected or compiled in the current format.

SUMMARY

The Internet, or Web, has been the cradle of many revolutionary concepts, and socio-economically one of the most influential of all is probably the interactive features such as interactive posts, social networking capabilities, etc. that triggered the Social Web or Web 2.0. Users' ability to interact on the Web has enabled users to become active contributors instead of passive followers and thus these users began to shape the Web and through the Web they began to shape the world. There have been countless initiatives on the Web that have influenced society, for example crimes committed by governments were exposed, or public revolts against tyranny were coordinated through social networks, and all this was achieved through interactive platforms.

On the other hand, the interaction ability of users has indeed reached only a small part of its potential despite this revolutionary leap. Unlike the rosy picture that is widely accepted, users' ability to interact on the Web is quite limited, and it is almost entirely dependent on the interactive features provided by websites. Moreover, user interaction is being deliberately restricted in the interests of websites, and interaction design—including APIs—has become a frontend manipulation tool. For example, YouTube™ has decommissioned the dislike counter to increase the view rates and, in this context, has regressed to the level of Facebook™ or Twitter™, which have never provided such a feature.

Alternatively, interaction ability of users on resources of a data network, such as web resources of the Internet, can be extended by virtually associating/integrating user generated contents and/or features into web resources. In this context, especially associating/integrating contents or features in relation with web objects in a web page drastically enhances the interaction ability of users, since web objects are building blocks of web resources. Moreover, because associated/integrated features can provide further interaction capabilities, via feature association/integration in relation to web objects, users can interact with any component of any web resource in any possible way on their own initiative.

In current practice, content association/integration is manifested in the form of web annotations. Web annotation systems enable users to annotate web objects with user generated contents and share them with other users. These web annotation systems perform in relatively static, non-complex web environments, such as in static web documents. However, web resources alter both contextually and structurally, and such resources can be manifested in complex forms. In this context, sustainability of interactions, i.e., maintaining associations between user generated contents and web objects, becomes a problem as the complexity of web resources and/or the complexity of alterations increase. Presently available systems for content association/integration does not provide a concrete solution for the problem of sustainability in relatively complex and dynamic web environments, such as web resources as dynamic interfaces rather than static documents.

On the other hand, associating/integrating features is a much more challenging process than that of associating/integrating contents as in web annotations. Web resources must be interpreted both contextually and structurally, and applications must be developed to provide features to be associated/integrated accordingly. Further, despite contextual and structural alterations, associations with web objects must be maintained and applications must be able to continue working by adapting to the latest state. In the prior art, each application is developed manually by experts particularly for a target website and deployed on web browsers by users in the form of extensions, plugins, addons, etc. Adaptation capability of these applications is extremely limited, and in response to significant alterations, sustainability is ensured either by utilizing data/apps provided by websites—if any—such as integration APIs, or through manual maintenance of experts. By and large, the prior art in feature association/integration does not provide a system for: i) semi-automatic feature development and association/integration; and/or ii) full-automatic interaction control; and/or iii) full-automatic re-association/re-integration and adaptation (i.e., maintenance) in response to contextual and/or structural alterations in multifarious web environments. Moreover, unlike web annotation systems designed/used for content association/integration, even a simple system with very limited capacity that provides an infrastructure whereby any user—including layman—can develop, associate/integrate, and share features on web resources does not exist.

To sum up, there is presently no solution that considerably enhances the interaction ability of users upon the web—regardless of features/services provided by websites—, including a concrete solution for the fundamental problem of sustainability of interactions, i.e., sustainability of associated/integrated contents and features, and further interactions with/through associated/integrated contents and features. By and large, the ability to interact on web resources of a data network may be extended tremendously by revealing the true potential of content and feature association/integration—which, in essence, is one of the main goals of the technology (system and method) described herein.

In principle, the system disclosed herein provides a medium that enables users to virtually associate/integrate both contents and features into web resources in relation with web objects and share them with other users—so that they may interact with and/or through them—to maximize the interaction ability on the Web regardless of the respective website. On the other hand, in order for such a tool to be considered effective and become a useful mass media, it is essential to ensure the consistency and persistency of interactions as long as the interacted components of web resources continue to exist. Besides, no user can be expected to rely and invest on a medium that is inconsistent and non-persistent. In this context, the primary challenge in order to cope with this technical problem is determined as: enabling the stability and sustainability of interactions (i.e., how users interact with exactly what, and how interactions are maintained despite alterations in web resources) in complex and variable environments, in a self-contained manner, based on comprehensive interaction and adaptation rules set in accordance with the operational needs. More precisely, it is essential to provide an intelligent system that is fully capable of automatically controlling users' interactions with web objects and fully capable of automatically maintaining interactions despite alterations in web resources, while operating independently without website support—as most websites do not provide APIs for integration or what is provided may not be adequate and/or permanent. An infrastructure based on such a system paves the way for the vertical development (or advanced bundle development) of the Web, which essentially is building 'a Web on the Web'.

In this context, using the system disclosed herein, resources of any data network including the web resources of the Internet may be transformed into a limitless interaction space—far beyond the interactive features provided by resource providers such as websites—through an intelligent web infrastructure that may enable users to interact with singular or clustered web objects (e.g., a visual element or a cluster of interrelated visual elements), such as images, videos, audios, texts, or GUIs, forms, tables, lists, articles, etc., while ensuring the consistency and persistency of interactions in a self-contained manner—independently without the need for any website collaboration or participation.

Employing the system disclosed herein: i) Users may be able to associate/integrate contents into web resources in response to singular or clustered web objects. For example, a post created and shared by a user at a governmental website to criticize a particular portion of an article, or a document to support the entire article; ii) Users may be able to associate/integrate features into web resources by developing and associating apps that virtually process/manipulate singular or clustered web objects. For example, an application developed and shared by a user that dynamically processes/manipulates the video player interface of an online video platform for improvement of its features, or the video content itself for entertainment purposes; iii) Users may be able to interact with associated/integrated contents and features. For example, responding to an associated/integrated post by another post, or initiating a particular process of an associated/integrated app; iv) Users may be able to connect to and interact with each other through associated/integrated contents and features that act as network links. For example, webwide social networking through associated/integrated posts and apps.

The term 'Superimposed Communication' is introduced for the concept, since users are enabled to interact/communicate through a virtual superlayer upon web resources using the disclosed system. Similarly, the term 'Superimposed Networking' is introduced since users are enabled to build social networks based on superimposed communication using the disclosed system—by which any field of a web page may become a junction point, connecting users with each other through superimposed contents or applications. Within the context of superimposed communication, even a single web page has an enormously rich interactivity potential including superimposed networking that liberates social interactivity from the bounds of social media websites by providing an unbounded social interaction alternative webwide. Such a development may deeply affect websites/webpages that are currently idle, especially in terms of an increase in demand.—Indeed, why should someone express herself on a 3rd party intermediary platform about a subject, instead of expressing herself right on the source of the subject matter when applicable.

In essence, the described system that is designed to realize 'Superimposed Communication' is an intelligent web resource interaction system with the ability to autonomously control users' interactions with singular or clustered web objects in any web environment while adapting to contextual and structural alterations of interacted web resources in any scenario. Furthermore, the system includes a software framework by which users—including laymen—may be able to develop apps that dynamically process/manipulate web objects including data extraction. Consequently, the system provides ordinary users with the ability to semi-automatically develop and associate/integrate features in any web environment while fully-automatically maintaining (i.e., re-associating/re-integrating and adapting) the features in response to contextual/structural alterations. Thus, the system described herein may pave the way for the development of enormous variety of unprecedented sub-systems created by masses—such as novel systems for improvement of services, evaluation of information, data extraction, social networking, entertainment, etc.—while providing users with the utmost content association/integration capabilities.

All in all, employing the system based on the described technology herein, ordinary internet users may become publishers & broadcasters anywhere on the Web, or they may become web developers & service providers throughout the Web, or they may just become nodes of a web-wide social network without borders and greedy stakeholders. Thus, the domain of the internet may be expanded tremendously, but more importantly, users may gain utmost interaction ability on any web resource, thereby the Web may be liberalized to a tremendous degree. And because interaction is the key to evolution, this system may eventually pave the way for the evolution of information and services on the Web, while corroding the monopoly power of major websites and social media networks by extending the borders of interaction far beyond their scope. A totally new industry may thus be formed within the users' initiative that may provide infinitely many solutions, such as bringing the aforementioned dislike counter to YouTube™, Facebook™, Twitter™ or wherever needed and igniting a social network among those who express their dissent whenever needed right on the spot. Consequentially, employing this system may deeply influence the future of the society and economy while influencing various fields of science both as a novel communication medium and as a source of idiosyncratic big data.

Some interesting features of the web resource interaction system include: Within the scope of any data network including the Internet, embodiments provide an infrastructure that enables an automatically controlled interaction environment on web resources, where the system continuously and dynamically adapts itself to the contextual and/or structural alterations of—previously interacted—web resources, while controlling the web objects to be interacted, e.g., according to their roles/functions in web resources, and/or interrelationship, and/or predefined features introduced to the system. Thus, embodiments of the system provide an infrastructure that enables a steady and consistent interaction environment, where human and machine users may interact with singular or clustered web objects of web resources by associating—and/or reaching to—virtually any kind of user generated content and/or user generated software application, or interact further with user generated contents and/or user generated applications that are already associated with singular or clustered objects of web resources, or interact with each other through those user generated contents and/or user generated software applications that act as network links. More precisely, this web resource interaction system enables: i) Semi-automatic content generation and integration (i.e., generating and associating contents with web objects); ii) Semi-automatic feature development and integration (i.e., developing and associating applications that dynamically process/manipulate web objects including script content, i.e., other applications existing on the web); iii) Full-automatic interaction control (i.e., controlling users' interaction with objects of web resources and further controlling interactions with/through superimposed user inputs); iv) Full-automatic re-association/re-integration and adaptation in response to contextual and/or structural alterations (i.e., maintenance of interactions by re-associating/re-integrating user inputs and adapting to alterations accordingly); in multifarious web environments, in real time, in a self-contained manner, based on an analogue referencing mechanism for establishing associations and adaptation. Further, the system includes rule libraries to be set in accordance with operational needs for interaction and adaptation within the scope of superimposed communication. Furthermore, the system also includes a software framework for the development of applications that dynamically process/manipulate web objects, by which layman users—besides expert users—may also be able to develop applications—thus become web developers and service providers.

The current disclosure therefore offers a novel communication medium where system users may build a web on the Web, while improving or integrating the services of websites, or challenging the information right at the source without technical and/or structural limitations or limitations imposed through administrative regulations. In this context, unlimited number of sub implementations may be formed with many practical benefits.

DETAILED DESCRIPTION

Figure 1:
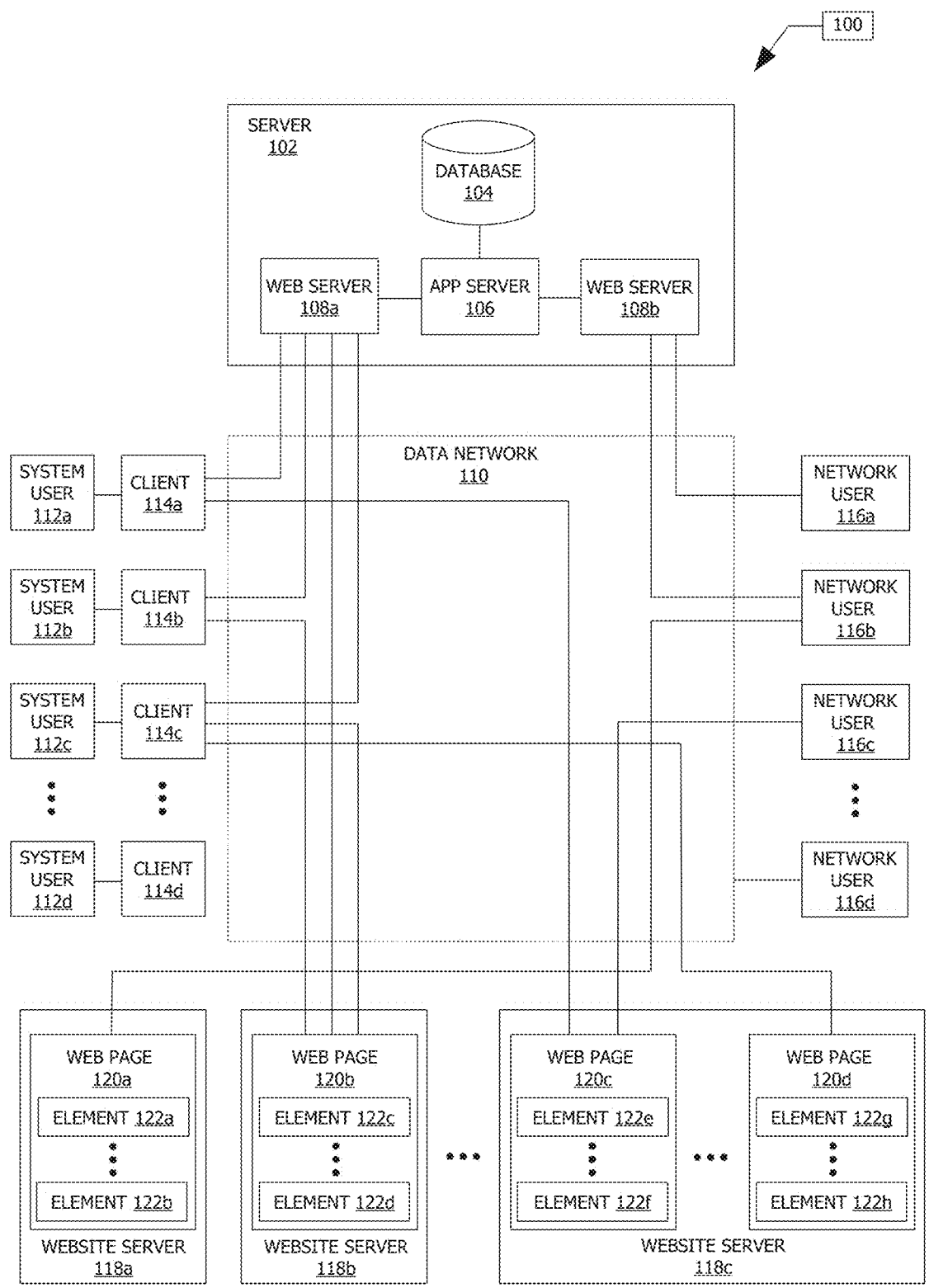
FIG. 1 is a high-level architecture of an exemplary system, according to an embodiment.

The web resource interaction system described herein includes a computer implemented method, a computer system, and a non-transitory computer readable medium to superimpose user generated contents and/or user generated software apps—that are stored and executed by the system—on web resources (e.g., web pages) of a data network. 'Superimposing' is defined herein as the combined process of associating user generated contents and/or user generated software apps with visual elements and/or clusters of visual elements (i.e., singular and/or clustered web objects) of a web resource, identifying and marking visual elements and/or clusters of visual elements that are associated with user generated contents and/or user generated software apps, displaying metadata of user generated contents and/or user generated software apps in connection with the corresponding visual elements and/or clusters of visual elements, and displaying user generated contents and/or executing user generated software apps. In this context, 'superimposed communication' is further defined herein as communication based on superimposing, and 'superimposed networking' is defined herein as the social networking based on superimposing, i.e., connecting users through user generated contents and/or user generated applications that are superimposed on web resources. In this context, the system includes embodiments that virtually process/manipulate visual elements and/or clusters of visual elements (i.e., singular and/or clustered web objects) of web resources (e.g., web pages) on a data network, and provide a communication infrastructure, which coordinates superimposed resources (i.e., user generated contents and/or user generated software apps that are associated with visual elements and/or clusters of visual elements) with conventional web resources, where superimposed resources may be created by human users and/or machine users, and/or by the system itself. User generated contents and/or user generated software applications that are associated with web objects, and/or to be associated with web objects, are herein referred to as 'user content inputs' or 'user inputs,' which may be used interchangeably.

The computer implemented method including/the computer system configured to perform/the non-transitory computer readable medium storing code for: I) Analyzing a web page that a user is viewing, and identifying each visual element, i.e., extracting distinctive information about content—if any—, information about distinctive properties—if any—, relative position information of the corresponding visual element, and exact location information (e.g. URL) of the web page where the corresponding visual element belongs to. For each visual element, generating a uniform visual element identifier (UVEI) (i.e., an element identifier that includes distinctive information about content—if any—, information about distinctive properties—if any—, relative position information of the corresponding visual element, and exact location information of the web page where the corresponding visual element belongs to). Based on the analysis of the UVEIs, ii) Classifying and clustering visual elements (i.e., identifying the role/function and cluster information (CI) of each visual element, wherein clustering is based on positional and/or functional relationships of visual elements, and further, identifying the role/function of each cluster of interrelated visual elements and assigning a 'uniform cluster function identifier' (UCFI) for each of them as a contextual reference to be used for establishing associations with a cluster of interrelated visual elements besides the UVEIs of the visual elements belonging to the cluster). Based on the identified role/function of each visual element, and/or the identified role/function of each cluster of interrelated visual elements, iii) Deciding on interactions according to said interpretations of visual elements and predefined interaction rules (e.g., filtering visual elements for interaction according to a predefined filtering/decision criteria, wherein the filtering/decision criteria is based on context such as roles/functions of singular or clustered visual elements, {as clusters of interrelated visual elements according to their 'positional', or 'positional and functional' relationships}, and enabling filtered visual elements for interaction and disabling the remaining visual elements), and further indicating visual elements that are available for interaction with a visual indicator for selection by a user. Based on receipt of selection by a user of one of the filtered visual elements or visual element clusters, iv) Assisting the user for generating contents or applications that dynamically process/manipulate visual elements and/or clusters of visual elements, and further, setting adaptation rules for each corresponding user generated application in coordination with the user. Based on receipt of a user generated content or user generated application, v) Associating the user generated content or user generated software application with the selected visual element or visual element cluster (i.e., storing the user interaction with one of the visual elements or one of the clusters of visual elements as 'user input' in association with one of the UVEIs or with one of the sets of UVEIs, wherein each set represents the corresponding one of the clusters of visual elements, and further, if interacted web object is a cluster then storing the corresponding one of the uniform cluster function identifier (UCFI) within the 'user input' record). When the interacted web page is visited by another user and/or when the web page is subsequently rendered, processing the steps i and ii for the web page; Based on new uniform visual element identifiers (nUVEIs) generated, including each corresponding class and cluster information, and based on uniform cluster function identifiers (nUCFIs) generated, vi) Identifying associations based on analogue references and similarity comparison (e.g., comparing the nUVEIs with UVEIs stored in the database as recorded UVEIs (rUVEIs), and associating the nUVEIs with the rUVEIs based on a predefined threshold of similarity, and/or comparing the nUCFIs with UCFIs stored in the database as recorded UCFIs (rUCFIs), and associating the nUCFIs with the rUCFIs based on a predefined threshold of similarity). Further, adapting to the most recent state of each cluster of interrelated visual elements according to each user generated application associated by comparing the initial state representations constructed based on rUVEIs, and the most recent state representations constructed based on nUVEIs of the cluster in order to identify a procedure to adapt the respective execution procedures of the associated applications to the most recent state according to a predefined set of adaptation rules corresponds to each user generated application. Based on the identified associations, viii) Displaying metadata and content of user generated contents, and executing user generated software apps, and further connecting system users with each other through user generated contents and/or user generated software apps that act as network links on web pages.

According to the embodiments, visual objects of web resources are used as 'base for reference' for locating/associating user inputs. Visual objects are objects (i.e., web objects) on a web page that form the structure of the web page. According to Kudĕlka M et al. (2010); Visual objects are independent in their content, have an ability to be classified in the meaning of their purpose, and identifiable in terms of labelling a certain physical part of the web page. Visual objects carry some information to a user and as a whole perform certain functions. A visual object generally performs one or more of 4 basic functions: A visual object may be i) informative (e.g., may provide some basic semantic content to users), ii) navigational (e.g., may have a hyperlink to guide users to another object), iii) interactive (e.g., may have an interactive tool for users to communicate with the system), iv) decorative (e.g., may include elements for beautifying a page). (Ref: Kudĕlka M et al. (2010) Visual Similarity of Web Pages. In: AINSC volume 67, Springer.) A visual object is essentially either a visual element or a cluster of interrelated visual elements. To be more precise in an example, a singular visual object is a visual element, and a meaningful cluster of singular visual objects is a cluster of interrelated visual elements—wherein a meaningful cluster of singular objects is not an arbitrary cluster but a cluster with a definable/identifiable role and/or function. In this context, visual elements are the visual building blocks of a web page, and any visual element of a web page may be used as a landmark/reference for locating/associating user inputs.

Visual elements are defined to facilitate the description of the systems and methods of the current subject matter. According to the embodiments, a visual element is an elementary visual field that includes 'content' and 'visual aspects' of a web page element. For example, in the case of rendering hypertext markup language (HTML) and cascading style sheets (CSS), when laying out a document (i.e., web page), the browsers rendering engine may represent each HTML element as a rectangular box according to the standard CSS basic box model. While 'HTML element' provides the content, CSS determines the position and properties (size, border size, background color, etc.) of these example boxes. In principle, each CSS box (i.e., visual element field) with its content (i.e., content of visual element) is a visual building block (i.e., visual element) of a web page. Accordingly, every HTML element may correspond to a visual element, which may be a—singular—CSS box (i.e., visual element field) that includes the content of the corresponding HTML element (e.g., English text, markup text, hyperlink, image, audio, video etc.). Further, the same may apply for other markup languages supporting CSS, such as XHTML, XML, XUL, SVG, etc. Regarding the positioning of visual elements; In a web page, a visual element may have a fixed position (e.g., relative to canvas) or may be positioned relative to other visual elements (e.g., CSS structures). For example, a cluster of interrelated visual elements (e.g., a GUI object) may be positioned in a framing visual element, and that framing visual element may be positioned relative to another visual element (e.g., container of the header). In the case of rendering HTML and CSS, the layout of a web page may be specified by CSS. A rendering engine may interpret each style sheet and calculate precise graphical coordinates of CSS boxes (i.e., visual element fields) for the visual representation.

To elaborate on the characteristics of a visual element: According to the embodiments, content of a visual element may be textual, or visual, or audial, or combinations thereof. Alternatively, or in addition, a visual element may include no content at all, i.e., a visual element with null content. A content may be included to a visual element by various methods, for example by transclusion, i.e., inclusion of the content by reference, or embedding the raw data of the content into markup. Textual content of a visual element is character content that may be: i) text for humans (e.g., a paragraph of an article), and/or ii) text for machines (e.g., markup/script). Visual content of a visual element is any visual content excluding text (e.g., an image, an image sequence, a video without sound, etc.). Audial content of a visual element is any audial content (e.g., an audio file, a radio stream, etc.). A visual element may simultaneously contain textual, visual, and audial contents individually (e.g., a visual element may contain an image, an embedded invisible hyperlink, and a text simultaneously), or a visual element may contain textual, visual, and audial contents in a single pack (e.g., a single multimedia file containing text, audios, images, animations, videos, etc.). On the other hand, although a visual element with null content has no content at all, its field (i.e., visual element field) has properties such as, size and shape of the field, color and thickness of the border, color of the background fill, etc. Note1: Although a textual content can be physically classified as a visual content, it is separated for clarity and simplicity. Note2: Besides the standard visual and audial interfaces, a computer system may also involve special interfaces such as, haptic or olfactive interfaces, and accordingly a visual element may also include other types of content according to data to be decoded.

The web resource interaction system is not limited with the use of visual elements as landmarks/references. Embodiments may use any element of a web page as a landmark/reference for locating/associating user inputs. However, to provide a steady, object-oriented communication platform focusing on a user's interaction with perceivable information, example embodiments described herein mainly use visual elements and/or clusters of visual elements as landmarks/references for locating/associating user inputs.

To elaborate on the fundamental problem of sustainability of interactions (i.e., sustainability of associated/integrated contents and features, and further interactions with/through associated/integrated contents and features): Web resources have evolved from relatively static documents into dynamic user interfaces and are becoming increasingly complex and variable both contextually and structurally, e.g., via adaptive web pages. Furthermore, even the simplest static web documents can alter dramatically in time manually. To illustrate the complexity of the problem of 'ensuring the consistency and persistency of interactions', the simple case of a static web page with extremely basic components without any interactive features can be considered. As an example, a static 'article page' that includes singular web objects namely, a header and a footer—as components of the page—, a heading, a couple of paragraphs, a picture, and a video—as components of the article—can be discussed. In order to further simplify the problem, the case of annotating only, which is among the simplest interaction options that requires only establishing associations between user generated contents and components without the additional processing/manipulation of the components can be discussed. In this context, users can interact with objects of the page individually—in whole or in part—such as, annotating the footer, the video, one of the paragraphs, or a sentence in one of the paragraphs, etc. Or users can interact with arbitrary clusters in the page such as, annotating the heading, the video, and the footer as a group selected randomly. Or users can interact with meaningful clusters of the page such as, annotating the article as a whole, i.e., the cluster including all web objects related to the article such as the heading, the paragraphs, the picture, and the video—but, not extraneous content, such as ads, scattered in the article. Furthermore, users can interact with objects of the page contextually, which can vary greatly from interaction with the 'exact contents' to interaction with the 'roles and functions' of singular or clustered web objects. For example, users can annotate the article based on its content, or they can annotate it regardless of its content. As can be seen, despite the simplicity of the page, the interaction possibilities are quite rich.

In addition to the interaction possibilities, contextual and structural alterations in the web page, such as manual alterations by a user, may further increase the difficulty and complexity of the problem. Contents of the web objects can be altered slightly or drastically, and/or existing objects can be deleted and new objects (e.g., contents) can be added. Further, relative positions of the singular objects can be altered slightly or drastically, such as the layout of the components or the layout of the whole page can be altered. Further, object identifiers can be altered along with the previous alterations, and as a result, object model of the web page—such as the Document Object Model (DOM)—can be altered completely. Thus, the page can be altered deeply both contextually and structurally in various levels, and all of these alterations can occur simultaneously and rapidly. For example, paragraphs of the article can be modified grammatically, or attributes of the image and the video—such as the resolution and format—can be altered. Further, the article displayed in the web page can be rearranged so that the number of paragraphs can increase or decrease, or the image can be replaced with another one within the same context. Further, a new paragraph, image, or video can be added to the article that are out of context, e.g., hidden advertising content meticulously inserted as if it was part of the article. Further, the position of the new paragraph, image, or video within the article can be altered, thus the structure of the article can be altered. Despite the simplicity of the page, the possibilities for alterations are also very rich and these examples could be multiplied further.

By and large, both the interaction and alteration possibilities that can occur even in the simplest web document, can be very diverse and challenging. Besides, web resources have evolved from static documents to highly capable dynamic user interfaces, and the scope of the interaction options aimed to be provided—such as feature association/integration—is far more complex than web annotations. This is the problem statement that is identified and presented herein, and the aim of this system is to provide the technological foundation to overcome these problems in order to unlock said interaction potential of the Web—or, in general, of any web of any data network. In this context, the high-level approach to this compelling problem is to overcome it via the intelligent web resource interaction system described herein that is capable of: i) ensuring the stability of interactions, i.e., controlling how users interact with exactly what; and ii) ensuring the sustainability of interactions, i.e., maintaining interactions despite alterations in web resources; in different web environments within different scenarios, in real-time, in a self-contained manner.

Adaptability to any environment, real-time processing, and self-sufficiency are considered essential in the process of ensuring stability and sustainability. Regarding the 'adaptability to any environment' and 'real-time processing' constraints,—as mentioned before—web resources have evolved from static pages to dynamic user interfaces, and they are evolving further to intelligent user interfaces that are capable of adapting to their users individually, providing personalized experiences. As a result, most of the web resources are individualized, structurally complex and subject to frequent alterations both contextually and structurally. Furthermore, websites can have adversarial attempts such as making specially designed alterations in web pages in an attempt to create confusion by/regarding contextual/structural alterations in the web page. Accordingly, a system that is capable of ensuring stability and sustainability of interactions should not rely solely on pre-scanning, pre-analyzing, pre-organizing, or archiving web resources as a primary method for the processes regarding association/integration and adaptation. For example, keeping track of the states and activities of web resources by data crawling or scraping and utilizing the collected information in order to recover intended previous versions and/or identify the correct representations of altered web resources may provide a historical record that omits relevant details/information. Regarding the 'self-sufficiency' constraint, such a system should not rely only on collaboration with websites since the tools provided by websites, such as integration APIs, are often insufficient or no tools are provided. Besides, even if a fully competent API is provided, its continuity cannot necessarily be guaranteed. Accordingly, such a system should not rely solely on utilizing tools provided by websites as a primary source in operations related to contextual and/or structural alterations of web resources, such as maintaining associations, adaptation, etc. Consequently, such a system should be able to adapt to any web environment (e.g., static, dynamic, adaptive etc.) within any scenario (e.g., rapidly and/or drastically altering complex web environments including adversarial attempts of websites to confuse the system), in real-time, in a self-contained manner, to cope with highly advanced and extremely competitive web environments.

To elaborate on the high-level system basics: One primary focus of the system is to ensure the stability and sustainability of interactions in accordance with the design constrains. In this context, the system may analyze each visited web resource in-depth individually for each client at each viewing/rendering cycle. In order to ensure the stability of interactions, the system may control web objects to be interacted with by, for example, determining 'what exactly the objects of web resources are' at a contextual level and deciding 'how users can interact with them' according to system-defined comprehensive interaction rules. In this context, the system may analyze and interpret web objects contextually, e.g., according to the roles, functions, and other distinctive features, which may include identifying and clustering interrelated objects in rank order and assign each singular or clustered object a contextual reference, i.e., an analogue reference, and decide on the interaction possibilities accordingly. In this process, once an interaction is established with a component (e.g., a graphical user interface (GUI) with a certain function, or a content with a certain context) the system may record both the contextual reference of the component (e.g., UVEI/s, UCFI, etc.) and the interaction procedure regarding that component (e.g., a set of instructions to process or manipulate the component), for example, a user generated application dynamically processing/manipulating a GUI with a certain function or associating a user generated content with a certain context. Similarly, in order to ensure the sustainability of interactions, once an interacted web resource is revisited and/or subsequently rendered, the system may compare recently extracted contextual references (analogue references) of components with previously recorded contextual references (analogue references) to identify interacted components and the system may adapt itself to the recent state of the interacted components contextually according to the respective interaction procedures previously recorded (e.g., identifying a contextually and structurally altered GUI with a steady function and adapting the interaction procedures to its recent structure within a contextually and structurally altered web page when revisited).

In a nutshell, the web resource interaction system disclosed herein is an interaction control system with real-time computing properties based on a fully analogue referencing mechanism developed based on the assumption that: 'in today's modern web environments, all web pages—including the static documents—has to be treated as contextually and structurally dynamic, complex, user specific interfaces rather than documents (since even the simplest static web document can be manually altered dramatically, both contextually and/or structurally), therefore, tracking the web objects themselves in such environments to maintain associations and adaptations is inefficient and insufficient. In this context, instead of establishing particular associations with particular web objects, associations may be established solely according to the context of web objects—which inherently corresponds to a set of analogue references to be chosen in various combinations for each singular or clustered web object in accordance with predefined interaction rules. In other words, associations are established with the context of objects that are chosen as the reference, instead of the objects themselves and any object that provides the same context, satisfies the association criteria. Thus, URIs' of web objects—i.e., any segment identifier—can be totally ignored in the processes of establishing and maintaining associations, including recording and re-constructing intended previous versions of document object models. In an example, this may be a truly analogue approach, and even URLs of websites can be eliminated thus, URI's can be totally eliminated in the processes of establishing and maintaining associations. Similarly, instead of developing particular interaction procedures for web objects (such as procedures to dynamically process/manipulate web objects including complex components), interaction procedures may be developed according to the context of web objects (such as according to their roles and/or functions).

Consequently, conventional mechanisms such as keeping track of the states and activities of web resources, recovering intended previous versions, identifying the correct representations of altered web resources, etc. becomes absolutely redundant. Furthermore, the system described herein paves the way for the development of a software development framework based on pure analogies, thus, the system also paves the way for laymen—besides experts—to become web developers. By and large, the system may automatically control users' interaction with web objects and may automatically maintain established associations in response to contextual and/or structural alterations of web resources. Thus, the system may ensure the consistency and persistency of interactions (i.e., establishing and maintaining associations including adaptation to any kind of contextual and structural alteration) in any web environment (i.e., any environment including extremely dynamic, extremely complex, and rapidly altering harsh environments) within any scenario, in real-time, in a self-contained manner.

Ensuring the consistency and persistency of interactions in real-time, in a self-contained manner, in the most complex and harsh dynamic environments within any possible scenario (including possible adversarial attempts of websites in order to jam/destabilize the operations of the system) is also a must have to persuade internet users to trust and invest in any implementation of said communication model, i.e., the superimposed communication.

A detailed description of the web resource interaction system is presented through various examples, description and embodiments provided herein. According to various embodiments, the system includes a browser-based application at the client-side, that works in collaboration with an application server and a database server at the server-side. Client-side application, i.e., the client, in collaboration with the server-side application, i.e., the server, may perform processes within the system for enabling interaction of users with elements of web pages and/or user inputs and/or with each other, on a data network. As described herein, FIGS. 2-5 provide respective example flowchart diagrams 200, 300, 400 and 500, which are configured to minimize the data processing load of the client-side, while maximizing the data processing load of the server-side. In other examples, other configurations are possible regarding the allocation of the processing load between client-side and server-side, including maximizing the processing load of the client-side, and minimizing the processing load of the server-side.

FIG. 1 is a high-level architecture of an exemplary web resource interaction system 100. The system 100 shown is a configuration for illustrating the functionality with exemplary components and architecture. One of ordinary skill in the art will appreciate that the system may include other features, components and/or modules to illustrate the functionality described herein and is not limited to the components and architecture illustrated in FIG. 1.

The server 102 of the system 100 includes—or has access to—the database 104 (including the database server), the application server 106, and two separate web servers 108a and 108b. The data network 110 may include gateways, routers, other servers and clients, etc. which are not shown. The system 100 includes N number of system users (112a, 112b, 112c, 112d) and their clients (114a, 114b, 114c, 114d), respectively. For example, the client 114a is the client of the system user 112a. The system 100 also includes a plurality of network users. Four of the M number of network users (116a, 116b, 116c, 116d) are shown in FIG. 1. A network user may refer to a data network user who is not a system user. According to various embodiments, a system user is also a network user, but a network user is not a system user. The system 100 include a plurality of website servers. Three of the K number of website servers (118a, 118b, 118c) are connected to the network 110 are shown in FIG. 1. The website server 118a is shown with a first web page 120a, which also includes L number of visual elements. Two of the L number of visual elements are shown as 122a and 122b. The website server 118b is shown with a second web page 120b, which also includes H number of visual elements. Two of the H number of visual elements are shown as 122c and 122d. The website server 118c may be a server of a social media network (e.g., Facebook, Twitter, Instagram, etc.). The website server 118c may store P number of web pages including a third web page 120c and a fourth web page 120d. Web pages 120c and 120d may be social media user pages which include various visual elements. Four of the W number of visual elements are shown as 122e, 122f, 122g and 122h. Clients 114a to 114d are uniform client-side applications working on the web browsers of the system users 112a to 112d, in collaboration with the server-side application, i.e., the application server 106. Web servers 108a and 108b are connection ports of the server 102 to the data network 110. The web server 108a is dedicated for the system users (clients), while the web server 108b is dedicated for the network users. In addition to these, all user inputs of the system 100 also have their own accessible conventional web pages (not shown). Network users may reach to these web pages, if there is no restriction put in place by the system user who created the associated user input. System users also have accessible home pages within the system 100, similar to the conventional social media websites where the posts of a system user are listed on a personal home page.

Network user 116a is connected to the server 102. Network user 116a may be browsing web pages containing user inputs of the system 100 or may be interacting with particular user inputs of a system user. Network user 116b is connected both to the server 102 and the web page 120a. Network user 116c is connected to the web page 120c only and not related with the system 100. Network user 116d is connected to the network 110 but not connected to the system 100 or any other web page shown.

Client 114a is connected to the server 102 and the web page 120c of the website server 118c. The web page 120c is a social media user page which is open to a closed subgroup only. While the client 114a has permission to reach to the web page 120c, the server 102's access is prohibited. The system 100 scans (probes) the web page 120c indirectly through the client 114a, i.e., the system uses the client 114a as a data link between the server 102 and the web page 120c. Thus, the server 102 may scan the source code of the web page 120c and/or communicate with the website server 118c to retrieve information about hyperlinks and visual elements associated with the web page 120*c*, such as 122*e* or 122*f*.

Client 114*b* is connected to the server 102 and the web page 120*b* of the website server 118*b*. The web page 120*b* is accessible by any network user including the system users (e.g., a news website). The server 102 is connected directly to the web page 120*b* known to be unrestricted for all network users with intent to reduce the data transfer load of the client 114*b*. In this case the system 100 scans (probes) the web page 120*b* directly. Thus, the server 102 may scan the source code of the web page 120*b* and/or communicate with the website server 118*b* to retrieve information about hyperlinks and visual elements associated with the web page 120*b*, such as 122*c* and 122*d*.

Client 114*c* is connected to the server 102, the web page 120*b* of the website server 118*b*, and the web page 120*d* of the website server 118*c*. The web page 120*d* is another user page which is not accessible by all network users. On the other hand, the web page 120*b* is accessible by any network user including the server 102. While the server 102 is indirectly connected to the restricted web page 120*d* through the client 114*c*, it is connected directly to the web page 120*b*, known to be unrestricted for all network users. Thus, the server may scan the source code of the web pages 120*b* and 120*d* and/or communicate with the website servers 118*b* and 118*c* to retrieve information about hyperlinks and visual elements 122*c*, 122*d*, 122*g* and 122*h* associated with the web pages 120*b* and 120*d*.

The system user 112*d* and its client 114*d* are not connected to the network 110. They are passive members of the system 100.

Within the communication structure of the system 100, and via the execution of the example methods 200, 300, 400 and 500 explained below, system users 112*a* to 112*d* may associate user inputs with the visual elements 122*a* to 122*h* of the web pages 120*a* to 120*d* and set up a superimposed social network on the web pages of the data network 110 through user inputs that act as network links. Similarly, system users 112*a* to 112*d* may reach to any user input that is associated with the objects of web pages of the data network 110. However, a network user who is not a system user may also connect to the system through a client that acts as a proxy server. In one embodiment, one of the clients of the system is used as a proxy server at the system, in which some of the network users, who are not system users, are connected to the system through this client and immediately become system users.

To elaborate the concept of superimposed networking: Any system user, who is connected to the data network 110 via a client, may be interconnected with other system users through the data network 110 via communication protocols (e.g., TCP/IP), and various user interfaces. In this context, user inputs possessing communication modules and interfaces may connect users with each other for communication, and user inputs may act as network links of an overlay social network on web resources of a data network. For example, users may communicate through commenting, messaging, reacting interfaces deployed on user inputs, while adding some of the authors of the user inputs and/or comments on the user inputs to their follow list or friends list and join each others social network. Therefore, system users may set up an overlay social network on web pages and connect with each other across the data network that the web resource interaction system is included in. Accordingly, each user generated content or application that is associated with objects of web pages, may become a junction point connecting users. Furthermore, a system user may connect to the publisher/developer (e.g., author) of a user input through the corresponding user input via particular interfaces. For example, a user who is an author may have a unique user identifier stored in the database record of his/her user input, which is associated with one or more visual element/s of a web page, such that rendering of the web page displays the user identifier as available to another user who may provide a connection request to the web page (e.g. through a system's user interface displayed on the web page) to initiate communication (e.g. P2P communication). Furthermore, interaction through a user input may be allowed to all users or may be restricted for use by a closed subgroup only, thus, sub social groups may be formed.

For brevity, the web server 108*a* and the application server 106 are together hereinafter referred to as ' server', and the database server with the database 104 are together hereinafter referred to as 'database'.

Figure 2:
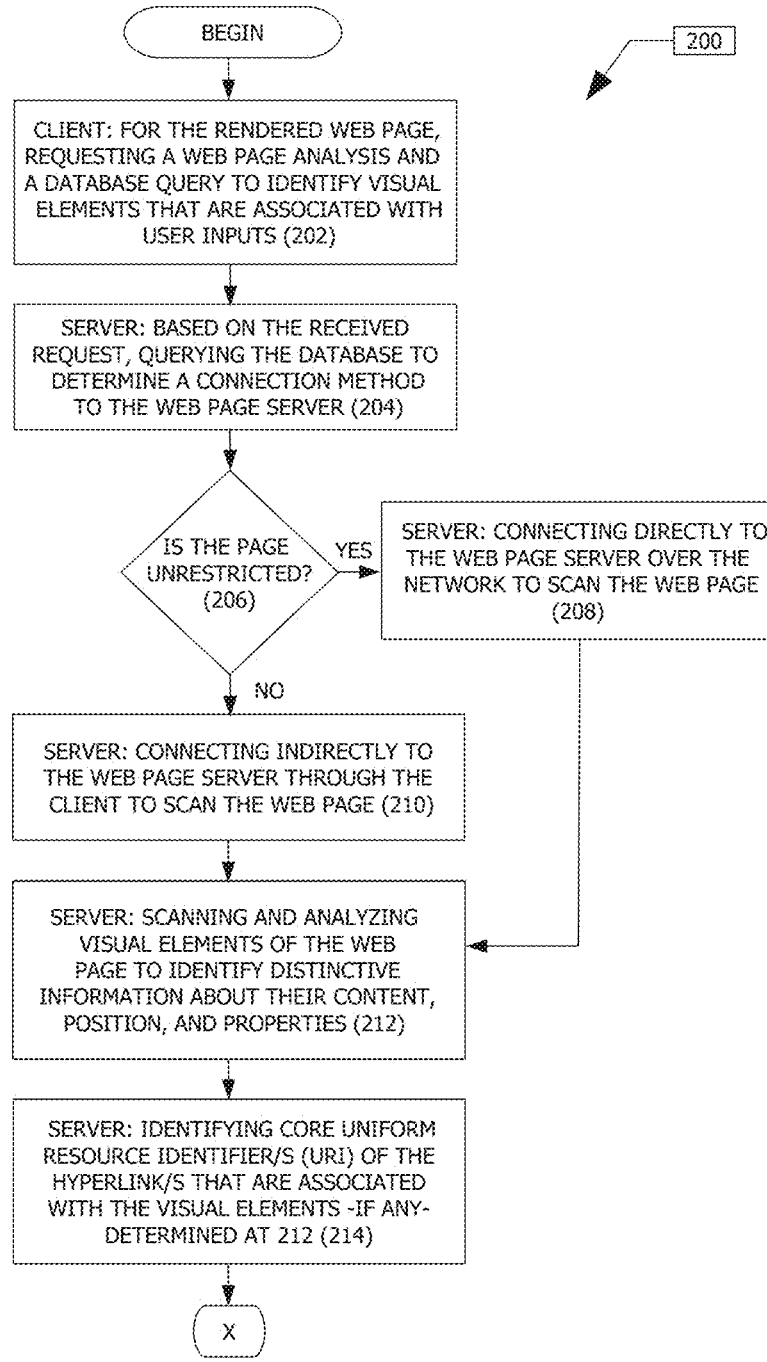
FIG. 2 is a flowchart diagram illustrating an example process to identify and mark visual elements—of a rendered web page—that are associated with user inputs.
Figure 2:
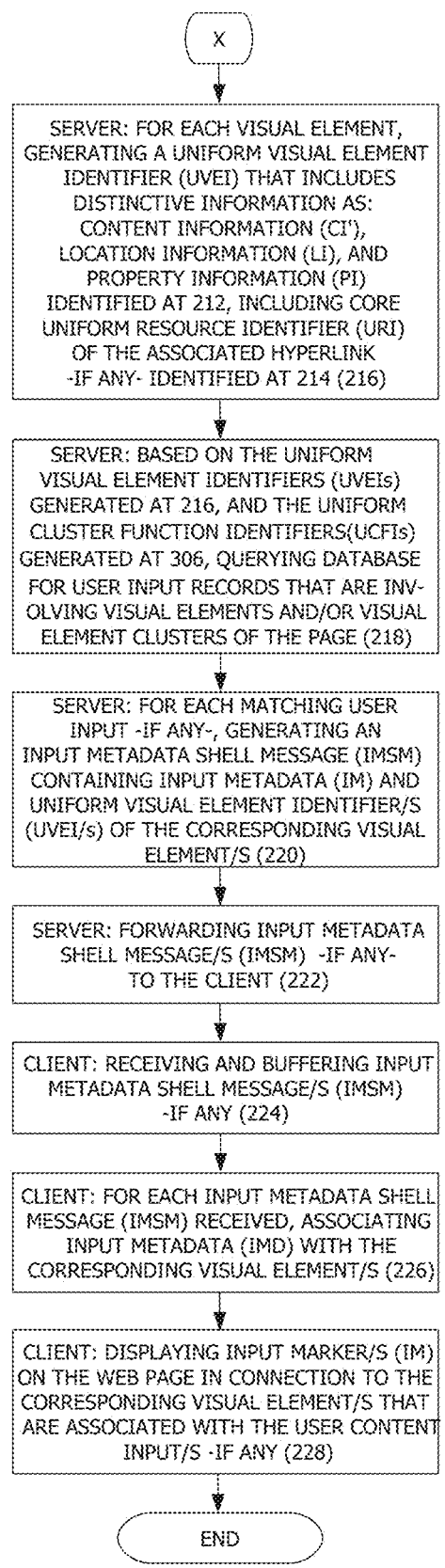

FIG. 2 is a flowchart diagram 200 illustrating an example process to identify and mark visual elements—of a rendered web page—that are associated with user inputs.

The process begins with the manifestation/presentation of a web page by the web browser of a system user. At 202, for the rendered web page, the client requests a web page analysis and a database query from the server to identify visual elements that are associated with user inputs. Next, based on the received request, the server queries the database to determine a connection method in order to communicate with the web page server and scan the web page (204). In some embodiments, the server may connect directly to the target web page over the data network. In yet other embodiments, the server may connect indirectly to the target web page via linking up through the client, i.e., using client as a data link. Indirect connection is always reliable, because server may not have access to the target web page (e.g., the target web page may be a social media user page accessible to a closed subgroup only), or may have limited access, or there may be some restrictions for ordinary network users or for the system user itself. On the other hand, for various reasons such as reducing the data transfer load of the system user, the server may directly connect to the web pages known to be unrestricted for all network users (e.g., news websites, government websites, e-commerce websites, etc.). For this purpose, the system may use an URL list of unrestricted websites and may decide between direct or indirect connection by comparing the URL of the target web page with the URLs of the websites, i.e., domain names, in the list. In one embodiment, the server scans the unrestricted website list (UWL) for a match with the URL of the target website (204). Unrestricted website list (UWL), which includes the URLs of the websites that are known to be unrestricted for all network users (e.g., CNN.com, BBC.com, etc.), may be generated and updated manually and/or by software algorithms working under the system.

Next, the server decides the connection method (206). If the target web page is unrestricted then the server connects to the target web page directly over the network to scan the web page directly (208). If the target web page is restricted, then the server connects to the target web page indirectly through the client to scan the web page indirectly (210). According to an embodiment, the server prefers to connect to any web page server indirectly only, because the indirect connection method provides a reliable communication mechanism for all cases and may be preferred if extra data transfer load of the client is not a concern.

At 212, based on the source code (which may specify the content, layout, and structure of the web page, and may define the meaning of each element) and/or any information retrievable from the web page server, the server scans the rendered web page and analyzes each visual element to identify distinctive information about its content, position, and properties, in order to generate a visual element identifier. Content of a visual element may be a text, an image, an audio, a video, a hyperlink, an application etc., and the source code may contain the content itself (e.g., a container including a text and a hyperlink) or the identifier/locator of the content for retrieving it from the website server (e.g., a container including an image or a video). Position of a visual element on a web page is the relative position of the visual element according to other visual elements. Properties of a visual element varies, e.g., size, shape, border width, background color, etc. of the visual element field. Content and properties of a visual element are solid references for identification in most of the cases. However, in some cases, relative position information may be the only reference to identify a visual element since position of a visual element is always distinctive,—as long as content, and/or layout, and/or structure of the web page does not alter in a way to invalidate it. For example, there may be multiple visual elements with identical properties and content. On the other hand, there may be cases where the position itself may not be sufficient to identify a visual element. For example, layout of web page may be changed in time. Accordingly, a visual element of a web page may be identified more accurately by referencing all variables (i.e., content, relative position, and properties) simultaneously, or one of them individually, or in any combination that fits the needs of the application.

Next, the server analyzes the resource identifiers (e.g., URLs) of the hyperlinks that are associated with visual elements—if any—determined at 212, and identifies the core resource identifiers (e.g., core URLs) (214). Core resource identifiers are resource identifiers of hyperlinks isolated from the additional extensions, e.g., subsequently added auxiliary extensions by search engines.

Next, for each visual element, the server generates a uniform visual element identifier (UVEI) that includes distinctive information about content—if any—, information about distinctive properties—if any—, and relative position information of the visual element identified at 212 including exact location information (e.g., URL) of the web page (216). The server also assigns an ID for each uniform visual element identifier (UVEI) generated. In one embodiment, a uniform visual element identifier (UVEI) of a visual element includes: i) A sample of the content, an attribute of the content (e.g., the media type) and the associated URI of a hyperlink—if any—determined at 212, as the content information (CI'); ii) Resource identifier of the web page (e.g., URL) and relative position information of the visual element with respect to other visual elements determined at 212, as the location information (LI), iii) Information about the properties of the visual element field determined at 212, as the property information (PI). While distinctive information about the position and location, i.e., 'relative position' and 'exact location', always exists (at least in the moment of rendering), 'distinctive information about content' and 'information about distinctive properties' of a visual element may or may not exist. In this context, for example, a uniform visual element identifier (UVEI) within the CSS structure may include: i) 'null content' as content information (CI'); ii) CSS properties such as style sheet dimensions and color, as property information (PI); iii) URL of the web page and the relative position information of the style sheet, as the location information (LI). In such a case, LI is the only distinguishing parameter if there are other elements with exactly the same PI, i.e., CSS properties, in the source. According to another embodiment, uniform visual element identifier (UVEI) may also include core resource identifier (e.g., core URL) of the associated hyperlink isolated at 214, for example, i) Core URL of the hyperlink K of visual element Z; ii) URL of web page Y of website X, and relative position information of visual element Z on web page Y; iii) Property A and B of visual element Z, according to the embodiment.

Next, based on the uniform visual element identifiers (UVEI) generated at 216, the server queries the database for user input records that are involving visual elements and/or hyperlinks—if any—of the web page (218). Thus, the server queries the database for identifying matches between new UVEIs (i.e., nUVEIs) and recorded UVEIs (i.e., rUVEIs) of the user input records that are including the locator (e.g., URL) of the web page in the rUVEIs, based on various comparison methods such as relative position comparison and/or comparison based on similarity analysis of contents, etc. Further, based on the uniform cluster function identifiers (UCFIs) generated at 306, the server may also query the database for user input records that are involving visual element clusters of the web page. In this context, for example, based on a functional similarity comparison, the server queries the database for identifying matches between new UCFIs (i.e., nUCFIs) and recorded UCFIs (i.e., rUCFIs) of the user input records that are associated with the web page. Process 300 may be executed after the execution of 216 where the UVEIs are generated, thus, following the execution of process 300, process 218 may be executed, according to the embodiments.

In some embodiments, only one visual element may be associated with a user input if the user input is a user generated content, while one or more visual elements may be associated with a user input if the user input is a user generated software app. In this scenario, for user generated contents, the server may include contents partially in the UVEIs as the content information (CI') by a predefined sampling procedure, for each UVEI generated at 216, and the server may execute a similarity comparison between the sampled contents included in the recently generated UVEIs (nUVEIs) at 216 and the sampled contents included in the recorded UVEIs (rUVEIs) of the rendered web page, which may represent interacted visual elements in the rendered web page. In other words, user input records may be stored to include the UVEIs of interacted visual elements which a user has interacted with to add user input thereto, e.g., into the database record of a user input. In addition, the server may also query database records for a match between the hyperlinks detected at 212 and interacted web pages, i.e., web pages associated with one or more user inputs. In this process, core URLs of the hyperlinks determined at 214, are compared with the URLs of the interacted web pages recorded in the database. Within an example scenario, for user generated software apps, the database may be also queried according to the cluster information (CI)—that is identified in process 300 according to positional and functional relationship of visual elements—besides the uniform visual element identifiers (UVEI) of the interacted visual elements. In this process, for each record of a user input associated with the web page, recently extracted cluster information (CI) is compared with the cluster information (CI) (or the portion related with the interacted cluster) that is recorded in the database in process 400, i.e., rUVEIs belonging to an interacted cluster are compared with each set of nUVEIs that belong to each identified cluster.—It should be noted herein that this comparison technique may be optimized by various sub-methods, such as preliminary image analyses based on computer vision techniques in order to eliminate irrelevant cluster pairs in the process of similarity comparison. In the process of identifying interacted clusters, cluster information (CI)—along with other information obtained at 300 such as, subjective function type (SFT), etc.—is used as a reference, in order to maintain the associations in case of occurrence of contextual and/or structural alterations in interacted clusters. Alternatively, or in addition, based on the uniform cluster function identifiers (UCFIs) generated at 306, the server may also query the database for user input records that are involving visual element clusters of the web page, i.e., querying the database for identifying matches between new UCFIs (i.e., nUCFIs) and recorded UCFIs (i.e., rUCFIs) of the user input records that are associated with the web page, based on a functional similarity comparison, according to the embodiments. In various embodiments, both user generated contents and software applications may be associated with singular visual elements, such as images, videos, paragraphs, or with clusters of interrelated visual elements, such as, link previews, social media posts, media players, tables, lists, articles, headers, footers, other predefined clusters etc.

Next, for each matching user input—if any—, the server generates an input metadata shell message (IMSM) containing input metadata (IMD), i.e., metadata of the user input, and uniform visual element identifier/s (nUVEI/s) of the corresponding visual element/s of the rendered web page (220).

Next, the server forwards input metadata shell messages (IMSM) to the client—if any (222). At this phase, no other information about the content of the user inputs is sent to the client. Thus, the process gains speed by decreasing the data transfer load. According to an embodiment, input metadata (IMD) contains brief information about the associated user input stored in the user input records of the database, e.g., publisher, heading, summary, popularity score, rank etc. of the user input. Next, the client receives and buffers input metadata shell messages (IMSM)—if any (224).

Next, for each input metadata shell message (IMSM) received, the client associates input metadata (IMD) with the corresponding visual element/s of the web page being rendered for the user (226).

Next, the client visually displays input markers (IM) on the web page in connection to the corresponding visual elements and/or clusters of visual elements that are associated with the user inputs—if any—in order to indicate the availability of the user inputs for user access (228). According to various embodiments, user input markers (IM) may be transparent, miniature, and/or inconspicuous icons marking discrete visual elements and/or clusters of visual elements of the web page in a manner which does not impede the usage of the web page. In one embodiment, the client places input markers (IM) at only certain points within visual element fields, e.g., top right corner of a visual element field. Thus, input markers (IM) may be integrated with the web page's sense of balance and esthetics due to their association with visual element fields. In case of a cluster of interrelated visual elements,—which are identified in the process 300—, the marker may be placed at a predetermined position, such as a top right corner, of the visual element field that is enclosing the group—if any. Else, the client may create a virtual frame that is enclosing the cluster of interrelated visual elements and mark it by the same way. Moreover, appearance of the input markers (IM) in an embodiment may vary and particular input markers (IM) may be used for particular user inputs. For example, in embodiments, while ordinary user comments that are associated with a visual element are marked with a circular input marker (IM), expert user comments associated with the same visual element are marked with a triangular input marker (IM) separately. Regarding the method of manipulation, client may change the source code of a page to include markings, or the browser may be programmed to mark the relevant positions without changing the source code. In case of HTML, the client may utilize DOM (Document Object Model) of the web page to manipulate the web page without changing the source code, according to the embodiments.

The process terminates after the execution of 228 unless the page is an infinite scrolling web page. In case of an infinite scrolling web page, for every additional manifestation of the web page the process loops between 212 to 228, i.e., all sub processes are executed in sequential order starting at 212 and ending at 228. As a result of the process 200, the client, in collaboration with the server, identifies and marks visual elements and/or clusters of visual elements that are associated with user inputs—if any—, according to an embodiment.

To elaborate on the process 200, i.e., the procedures to identify visual elements that are associated with user inputs in a rendered web page, and the primary function/purpose of the uniform visual element identifier (UVEI) concept: According to the embodiments, there may be two phases of identifying visual elements, and whenever a web page is rendered by a browser of a client, these procedures may be executed specifically for that client: Phase 1) 'Analyzing a web page that a user is viewing, and identifying each visual element; for each visual element, generating a uniform visual element identifier (UVEI) that includes distinctive information about content—if any—, information about distinctive properties—if any—, relative position information of the corresponding visual element (e.g., with respect to neighboring visual elements), and exact location information (e.g., URL) of the web page where the corresponding visual element belongs to. An UVEI identified in the phase 1 may also be called as 'new UVEI' or 'nUVEI', which is a temporary reference of a visual element particular to the viewing session of a rendered web page of a client. An nUVEI becomes a recorded UVEI (i.e., rUVEI) and becomes stationary, if it is recorded in the database (e.g., in a field of a user input record) to associate a user input with the corresponding visual element. Phase 2) 'Based on uniform visual element identifiers (UVEIs) of visual elements identified in phase 1 (i.e., nUVEIs), i) identifying visual elements that were previously interacted by comparing nUVEIs with rUVEIs stored in the database, and/or ii) identifying role/s of each visual elements and/or iii) identifying clusters of interrelated visual elements, and/or iv) identifying visual elements that are available for interaction. According to the embodiments, for each visual element, a uniform visual element identifier (UVEI) is generated in each viewing session of a client, because a stable reference—independent of source code dictated by website servers—is required, since content, and/or layout and/or structure of a web page (i.e., source code) may be altered—manually (e.g., by website admins) and/or automatically (e.g., by executing scripts/programs)—in progress of time, and such alterations may result in loss of association between the interacted visual elements and their corresponding user inputs associated therewith and stored in the database records. For example, element attributes may be changed in such a way that alteration invalidates a locator strategy. Accordingly, methods such as anchoring based on element IDs, or executing conventional fragment identification systems, may not work properly. Moreover, alterations can be done deliberately to jam such systems by more advanced procedures. For example, content of some visual elements of a web page may be altered in such a way that altered content (e.g., pictures, videos, etc.) may be identifiable only by the detailed analysis of the content itself. Consequently, any system depending on the identification of interacted visual elements based on source code of web pages is inevitably prone to loss of associations or false associations between the time the web page elements are interacted, and corresponding web pages are re-rendered. For example, associations may be lost, or user inputs may be associated with irrelevant visual elements. In principle, the UVEI serves as a stable reference to maintain that association by holding/containing any possible distinctive information about content and properties, and also relative position information of each visual element with respect to other visual elements. Thus, the UVEI creates a base for various locating/identifying strategies and procedures.

To elaborate on the subject of distinctive information about content of a visual element: According to the embodiments, distinctive information about content of a visual element may be the type of the content (e.g., media type), and/or general properties of the content (e.g., type, size, etc.), and/or the content itself,—and which can be considered a reliable reference for most of the cases if the extra data processing load is not a concern. Accordingly, a uniform visual element identifier (UVEI) of a visual element may include the content—of the visual element—itself partially or wholly as a reference for comparison. For example, if the content of a visual element is a text, a hyperlink, a script, or an image, then it may be included in UVEI directly. For larger files (e.g., audio or video files) where the data processing load may be a concern, general properties of the content (e.g., type, size, etc.) may be used in combination with the properties of the visual element. Furthermore, content—of a visual element—may be included in its UVEI partially, and sampling techniques may be used for estimation/approximation of the content, such as interpolation. On the other hand, not all visual elements do possess distinctive content. For example, in a web page, there may be multiple visual elements with identical content.

To elaborate on the subject of distinctive information about the properties of a visual element: According to the embodiments, distinctive information about properties of a visual element may be any property (e.g., shape, size, background, padding, border, margin size, etc.) of the visual element that are unique among all visual elements of a web page (e.g., a unique background color, size, font, etc.). For example, the size of a canvas element of a web page is a distinctive property for most of the cases since it contains all visual elements of a web page. On the other hand, not all visual elements possess distinctive properties. For example, in a web page, there may be multiple visual elements with identical properties. In the case of CSS, properties of a visual element field is as follows: animation properties, background properties, border properties, color properties, dimension properties, generated content properties, flexible box layout properties, font properties, list properties, margin properties, multi-column layout properties, outline properties, padding properties, print properties, table properties, text properties, transform properties, transitions properties, visual formatting properties, etc.

To elaborate on the subject of relative position information of a visual element: According to the embodiments, 'relative position information' and 'exact location information' of a visual element includes position of the visual element relative to other visual elements in a rendered web page, and the URL of the rendered web page that it belongs to. Unlike content and properties of a visual element, relative position information is always distinctive as long as content and/or structure of the web page does not alter in a way to invalidate it. In one embodiment, positioning rules of visual elements included in the string of relative position information of UVEIs are similar to the ones in the style sheets of CSS.

To elaborate on the subject of distinctive information in general: According to the embodiments, distinctive information about content, information about distinctive properties, relative position information, and exact location information that are all included in UVEI may be used in several combinations for associating/identifying interacted visual elements, according to needs. In all cases, 'exact location information' is essential,—even if the relative position of the visual element alters—, since it includes locator (URL) of the web page that the visual element belongs to. On the other hand, there can be special cases where content, properties, and relative position information of a visual element—all together—cannot be sufficient to identify the visual element depending on the level of alteration of content, and/or layout and/or structure of a web page. For example, there can be multiple visual elements with identical properties and content in a web page, where relative positions of visual elements alter frequently. Accordingly, maintaining associations in between interacted web page elements and their corresponding user inputs may not be possible in some special cases.

To elaborate on the possible identifying strategies: According to various embodiments, content of visual elements (which may be stored in the database within a corresponding UVEI generated by the system), may be used partially or wholly (e.g., depending on data size) as the primary reference for locating/identifying visual elements that are interacted, besides (or in addition to) the URL of the web page that the visual elements belong to. In this regard, content of a visual element may be included—partially or wholly—in the corresponding UVEI as the distinctive information about content. In embodiments, for associating user inputs with visual elements, and identifying visual elements that are associated with user inputs in web pages that are viewed by users; the system collects content fragments from visual elements that include media files, such as images, videos, audios, documents, etc. by appropriate sampling procedures particularly selected according to content properties (e.g., media type, size, format, etc.) of each visual element, and include collected content fragments to the corresponding UVEIs as the distinctive information about content, in order to reduce the data processing load. In this process, for content located in website servers (e.g., documents, videos, audios, or any kind of streaming media) the system fetch data from website servers for sampling (e.g., by sampling the first 'one second' of videos, or by sampling small segments from PDF documents, etc.). When the system queries the database for identifying interacted visual elements of a web page, recently generated UVEIs are compared with the recorded UVEIs of the said web page according to their content type (e.g., video with video, image with image, text file with text file, etc.). In this process, the system compares content fragments with each other according to their similarities, and for each tested pair calculates the similarity rate—or resemblance rate—based on the similarity analysis. If similarity percentage of a pair exceeds a predefined similarity threshold, then the system associates the pair, according to the embodiment. In such embodiments, various statistical similarity measures may be used as a base for similarity analysis of data sets, and various algorithms may be preferred or developed depending on the type of content (e.g., image, audio, video, text, etc.) of visual elements. Furthermore, even semantic similarity comparison may be used in some specific applications.

To elaborate on the subject of analyzing and identifying interacted visual elements, a hypothetical example is provided as following: In one embodiment, a system user SU interacts with a dynamic web page that he/she is viewing, by associating respective user inputs as APP1, POST1, and POST2, with a text T, which is the content of visual element VE1, with an image P, which is the content of visual element VE2, and with a video V, which is the content of visual element VE3. APP1 which is associated with the VE1 may be a translator program that translates text from one language to another and dynamically processes/manipulates the visual element in order to display the translated version of the original text. POST1 and POST2 which are associated with VE2 and VE3 respectively, are social media posts including pictures and ideas of SU about the content of the corresponding visual element. A database record is generated and stored by the system for each user input APP1, POST1 and POST2, wherein each record contains content information CI', property information PI and relative position information LI of VE1, VE2 and VE3 in their corresponding UVEIs respectively. Properties information PI may be all available information about the properties of VE1, VE2, and VE3. Image P and text T may be included as a whole to their corresponding database records in their corresponding UVEIs respectively,—due to their relatively small data sizes—, and video V may be included partially (e.g., by collecting samples from the source file of the video, which are fetched from the website server),—due to its relatively large file size—, as content information CI'. For example, in this process, the system may associate each post or application with the corresponding visual element in the rendered web page by recording the posts or applications with corresponding UVEIs to the database. In the first attempt, the website server alters the layout and structure of the said web page deliberately to jam the system including formal alterations in the source code, such as altering element IDs, content identifiers etc. As a result, relative positions and properties of VE1, VE2 and VE3 becomes altered including corresponding element IDs, content IDs etc., and they become the derivatives DVE1, DVE2, and DVE3 of the original visual elements (except the contents). When SU—or any other system user—views the web page (e.g., when the web page is rendered), the system generates new UVEIs (nUVEIs) of DVE1, DVE2, DVE3 and compares them with the user input database records involving UVEIs (rUVEIs) that include the URL of the said web page. In this process, the system compares the original text T with other texts, image P with other images and video V with other videos (by comparing sampled fragments) of the web page based on recorded UVEIs (rUVEIs) and recent nUVEIs. Based on the query, recorded UVEIs of VE1, VE2 and VE3, match with the recent nUVEIs of DVE1, DVE2, and DVE3 on content basis with a predetermined similarity level, such as a 100% similarity. Consequently, based on the similarity comparison of the content, the system successfully associates SU's user inputs with the corresponding visual elements in the rendered web page, and visually marks them. By selection of these markers, SU—or any other system user—may reach to the corresponding metadata. In the second attempt, the website server alters the content of DVE1 by slightly changing the text T (thus becomes T'), alters the content of DVE2 by slightly degrading the image quality of P—by processing the image—(thus becomes P'), and finally modifies DVE3 by transforming the visual element into a dynamic one that alters video content randomly in progress of time from a list that include N number of different videos. In addition to that, the website server also alters the layout and structure of the web page including radical alterations in the source code. As a result, relative positions, properties and contents of DVE1, DVE2 and DVE3 becomes altered and they become the derivatives DDVE1, DDVE2, and DDVE3. When SU—or any other system user—views the web page, the system generates new UVEIs (nUVEIs) of DDVE1, DDVE2, DDVE3 and compares them with the user input database records involving UVEIs (rUVEIs) that include the URL of the said web page. In this process, the system compares the original text T with other texts, image P with other images and video V with other videos. Based on the query, i) recorded UVEI of VE1, partially match with the recent UVEI of DDVE1, on content basis with X % similarity, ii) recorded UVEI of VE2, partially match with the recent UVEI of DDVE2, on content basis with Y % similarity, iii) recorded UVEI of VE3, does not match with the recent UVEI of DDVE3 initially but thereafter with 100% similarity, based on the comparison of the sampled fragments of video V (included in the UVEI of VE3) with altering video content in any visual element of the web page during the viewing. Consequently, based on the similarity comparison of the content, the system successfully associates SU's user inputs with the corresponding visual elements and visually marks them, because the similarity rates X and Y exceed the predefined similarity threshold. On the other hand, the system visually marks the dynamic visual element DDVE3 whenever video V is loaded and deletes the marker whenever video V is altered with another video. By selection of these markers, SU—or any other system user—may reach to the corresponding metadata. In the third attempt, the web page server alters the content of DDVE1 by significantly changing the text T' (thus becomes T") and alters the content of DDVE2 by significantly degrading the image quality of P' (thus becomes P"). Text T" and image P" diverge from originals in such a degree that similarity rates fall below the predefined similarity threshold. Consequently, while keeping the association of visual element DDVE3 with video V, the system terminates the association of visual elements DDDVE1 and DDDVE2 with text T and image P respectively, according to the embodiment.

According to the embodiments, the process of identifying/locating visual elements of web pages does not have to rely on any ID based on the source code of web pages (e.g., utilizing namespaces, etc.). If preferred, uniform visual element identifiers (UVEIs) of visual elements do not include IDs assigned by website servers such as fragment identifiers, content identifiers, etc. Methods and systems presented within the current disclosure include embodiments designed on the basis that source codes of web pages—including any ID assigned by website servers—can be deliberately changed to confuse, and/or damage, and/or jam such systems. Alternatively, or in addition, the web resource interaction system may also include processing IDs based on the source codes and is not limited to the methods presented.

Uniform visual element identifier (UVEI) is similar to URL, which is a reference to a web resource that specifies its location on a data network, and a mechanism for retrieving it. According to various embodiments, uniform visual element identifier (UVEI) is also a reference to a visual element that specifies its location on a data network, and a mechanism for retrieving it. However, conceptually the difference between conventional URIs and UVEIs is radical. Firstly, each UVEI is generated by analyses of the corresponding visual element in order to extract distinctive information about its content, properties, and position within a framework of universal standards, and the UVEI of a visual element may be recorded as rUVEI and used as a reference for comparison of similitude with the distinctive information of each visual element extracted subsequently as nUVEIs when the corresponding source (e.g., a web page that the visual element belongs to) is re-rendered in order to identify a match. Secondly, similitude may be compared on the basis of content, role, function, etc., i.e., context thus, a visual element may be linked according to content, role, function, etc., i.e., context. In this regard, the UVEI mechanism described herein may be defined as a fuzzy logic referencing mechanism based on pure analogies (i.e., a comparison between one thing and another), by which 'a distinctive representation identified by the analyses of one thing' (i.e., an analogue) is compared with 'a distinctive representation identified by the analyses of another thing' (i.e., another analogue) based on similitudes or partial similarities (analogies) in order to associate/link the former with the latter.

The above-listed elaborations with regard to the process 200 is not limited with the embodiments provided, thus many more embodiments and implementations are possible.

Figure 3:
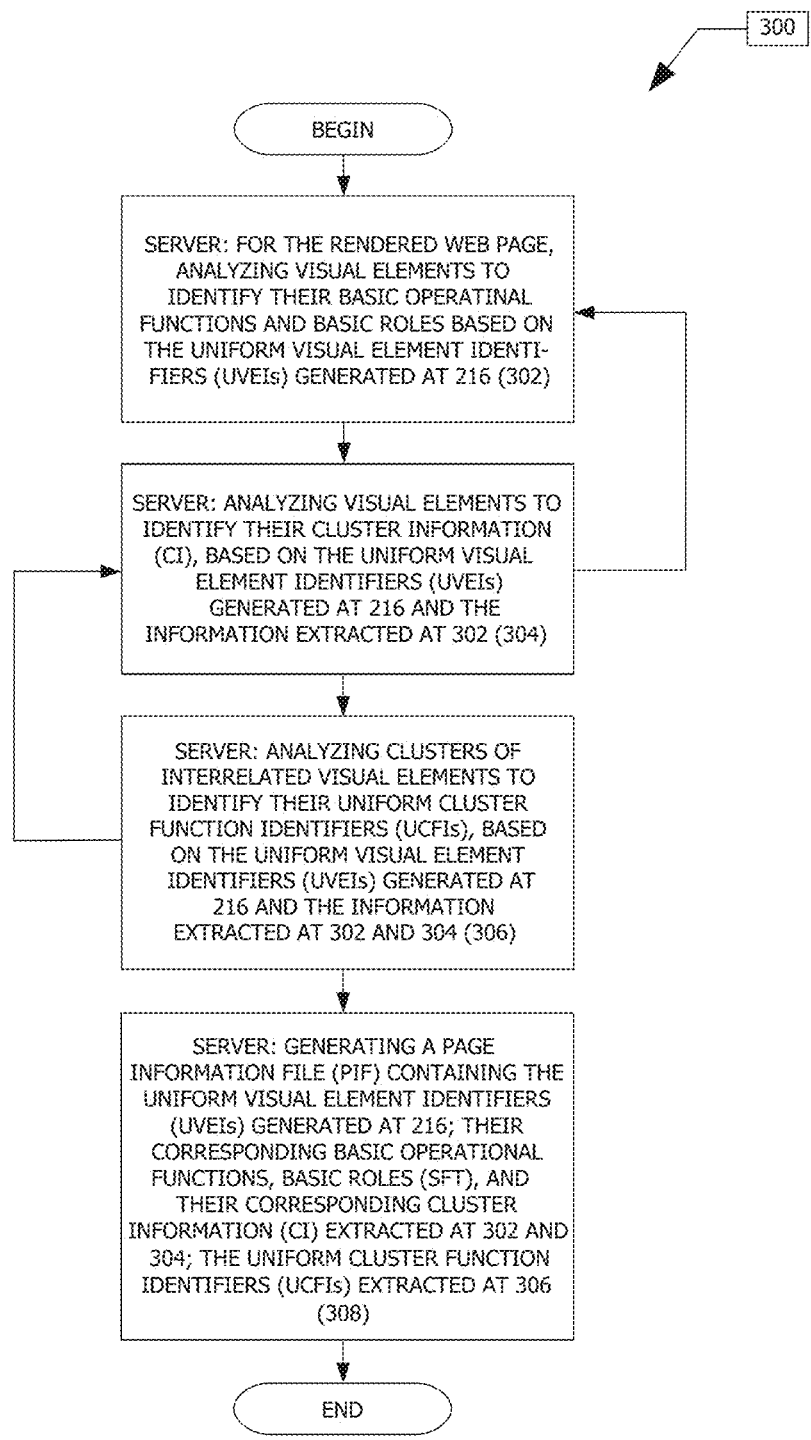
FIG. 3 is a flowchart diagram illustrating an example process to classify each visual element, and identify each cluster of interrelated visual elements including corresponding function of each, in a rendered web page.

FIG. 3 is the flowchart diagram 300 illustrating an example process to classify each visual element, and identify each cluster of interrelated visual elements including corresponding function of each, in a rendered web page, according to an embodiment;

The process begins after the execution of 216, in which the server generates a uniform visual element identifier (UVEI) for each visual element of the rendered web page. At 302, for the rendered web page, based on the uniform visual element identifiers (UVEIs) the server analyzes the visual elements to identify the role/function of each visual element, i.e., extracting basic operational function/s (BOF) described in the elaborations regarding 300 and the basic role (i.e., subjective function type classification) of each visual element.

According to various embodiments subjective function type is classified/categorized as main content, side content and auxiliary element. In this context, main content is the main subject of a web page, e.g., the subject matter presented for consideration of the viewers. For example, in a news web page, news articles, news videos, link previews of other news article pages or videos etc. are main contents. Side content is the subaltern subject of a website such as ads, extraneous announcements, or any other extraneous content. Finally, auxiliary element is any visual element without a subjective function. For example, visual elements that are graphic components of GUI elements are auxiliary elements, such as containers—like canvases and frames—, buttons, sliders, text fields, list boxes, icons, navigation links, search boxes, lines, special shapes, etc. are auxiliary elements. Subjective function type (SFT) does not overlap among the visual elements. A visual element is either main content, or side content, or auxiliary element. In embodiments, to identify subjective function type (SFT) of the visual elements of a web page, the server identifies only the side contents and auxiliary elements. The remaining visual elements of the web page fall into the main content class. In this regard, identifying any 2 of the 3 classes/categories is sufficient in order to identify corresponding subjective function type (SFT) of each visual element of a web page, according to the embodiments.

Next, the server analyzes each visual element to identify cluster information (CI) of visual elements (304). Cluster information (CI) is information about the relationship of a visual element with other visual elements in a rendered web page and used as a reference to group interrelated visual elements of the rendered web page. For example, a group of visual elements within a framing visual element (e.g., a container) are identified as positionally interrelated visual elements. Moreover, by frames within frames, or groups within groups, cluster information may also include ranks of interrelationship. For example, a search field and a search button lined up next to each other may be a first order cluster, while the entire navigation bar containing them besides some link buttons may be a second order cluster. In this context, the highest rank of interrelationship may correspond to all visual elements of the web page framed/enclosed by the canvas, i.e., the web page itself. According to the embodiments, analysis of visual elements to identify cluster information (CI) is based on relative positional relationship of visual elements (e.g., a group of visual elements that is framed by another visual element), or functional relationship of visual elements (e.g., a group of visual elements serving for a particular purpose regardless of their positions), or 'relative positional and functional' relationship of visual elements together (e.g., a group of visual elements lined up next to each other serving for a particular purpose).

In embodiments, the server may utilize DOM (document object model) of the rendered web page to analyze parent, child, and sibling node relationships in order to identify the cluster information (CI) according to positional relationship of visual elements. Further, the server may utilize the classification of each visual element as 'basic operational function/s' (BOF) and 'subjective function type' (SFT) including any other information determined at 302, in order to identify the cluster information (CI) according to functional relationship of visual elements. Further, the server may also utilize the cluster information (CI) determined at 304 in a feedback loop structure, to identify the subjective function type (SFT) of previously unidentified visual elements, according to the embodiments. In various embodiments, cluster information (CI), identified according to 'positional+functional' relationship of visual elements, includes IDs of uniform visual element identifiers (UVEIs), where each cluster of 'first degree relative visual elements' is designated by a first order cluster ID—that is assigned for each first order cluster (i.e., first order sub-cluster), including information about the functional relationship of the visual elements—within the first order cluster—that is predicted or determined based on the interbedded process of 302 and 304 as discussed with reference to FIG. 3; and each cluster of 'second degree relative visual elements' is designated by a second order cluster ID—that is assigned for each second order cluster (i.e., second order sub-cluster), including information about the functional relationship of the first order sub-clusters—within the second order cluster—that is predicted or determined based on the interbedded process of 302 and 304; and so forth. Clustering based on 'relative positional and functional' relationship of visual elements (i.e., 'positional and functional' relationship in short) may be a more accurate and safer option than only 'relative positional' relationship of visual elements (i.e., only 'positional' relationship in short) for both normally structured web pages and structurally disorganized web pages with disorganized layouts. However, the interbedded process of 302 and 304 may impose more data processing load and thus it may be more time consuming. In order to gain speed and/or decrease the data processing load, the system may use artificial intelligence such as machine learning, and/or computer vison/pattern recognition algorithms to prefer only positional clustering and bypass the process 302 in order to identify the CI swiftly, and/or may decide which one to use according to the structure/layout of the rendered web page, based on a pre/rough analysis of the page. In one embodiment, the system scans and analyzes popular websites in order to identify and learn their page structures/layouts and use artificial intelligence to decide which method to be used, and records that decisions for each website and/or web page including their locators in a log that is stored in the database. Thus, the system may optimize the performance according to a predefined action.

Next, based on the uniform visual element identifiers (UVEIs) generated at 216; their corresponding basic operational functions (BOF) and basic roles (SFT), and their corresponding cluster information extracted at 302 and 304, the system may further analyze each identified cluster of interrelated visual elements to extract their high-level function/s (e.g., a standard video player with a color corrector and 2D to stereoscopic 3D convertor, or a search box with a search button within a container) (306). In this step, high-level functions of identified clusters may be extracted, for example, the high-level functions of high to low rank clusters may be 'a header' as the $N-1^{st}$ rank, 'a search box with a search button within a container in the header' as the $N-2^{nd}$ rank, 'only the search box with the search button' as the $N-3^{rd}$ rank, and 'only the search box' alone as the $N-4^{th}$ rank ($0^{th}$ rank for this case) respectively, where the $N^{th}$ rank cluster ($4^{th}$ rank for this case) represents the whole web page. According to various embodiments, the system may further perform additional semantic analyses for the extraction of high-level function/s of each cluster of interrelated visual elements. For example, via utilizing various artificial intelligence algorithms based on—such as—natural language processing, machine learning, pattern recognition, etc. Thus, even more accurate, detailed, and comprehensive UCFIs may be extracted. Upon the extraction of the high-level function/s of a cluster, the system generates a 'uniform cluster function identifier' (UCFI) that includes/represents the extracted function/s of the corresponding cluster and assigns the extracted/interpreted function/s, i.e., UCFI, as a contextual reference to be used for establishing associations with a cluster of interrelated visual elements besides the UVEIs of the visual elements belonging to the cluster. Further, the system may also utilize the uniform cluster function identifiers (UCFIs) in a feedback loop structure to identify—especially—functional relationship of visual elements whose functional relationship with other visual elements is previously unidentified. For example, a pair of distantly positioned but functionally related clusters (similar to that of header-footer relationship) may be identified in a web page. Thus, via utilizing the process 306, functional relationship of distantly positioned visual elements may be identified at 304, and further this information extracted at 304 may lead to the extraction of additional information at 306, and so forth.

Next, the server generates a page information file (PIF) containing uniform visual element identifiers (UVEIs) generated at 216 including their corresponding basic operational functions (BOF) and basic roles (SFT), and their corresponding cluster information (CI) extracted at 302 and 304; and the uniform cluster function identifiers (UCFIs) extracted at 306 (308). More precisely, page information file (PIF) may include information obtained in processes 302, 304, and 306 including i) basic operational function/s of each visual element; ii) basic role, i.e., subjective function type (SFT), of each visual element; iii) cluster information (CI) of each visual element—identified according to positional and/or functional relationship of visual elements—in order to extract clusters of interrelated visual elements; iv) the uniform cluster function identifiers (UCFIs) as contextual references of clusters of interrelated visual elements and v) any other information may further be extracted or preferred. In this context, a client may use the information provided by a page information file (PIF) to reach all information extracted from the web page—so far—and may use this information for further analyses and/or as a further reference (e.g., via storing the PIF in the database and utilizing it later for constructing a reference that represents the initial state of the rendered web page). Thus, the client may identify for example the availability for interaction, according to a special (e.g., customized) or generalized predefined filtering criteria.

The process terminates after the execution of 308 unless the page is an infinite scrolling web page. In case of an infinite scrolling web page, for every additional manifestation of the web page the process loops between 302 to 308, i.e., all sub processes are executed in sequential order starting at 302 and ending at 308. As a result of the process 300, the client in collaboration with the server, classifies each visual element of a web page, and identifies each cluster of interrelated visual elements including corresponding function of each, thus provides information to the system such as for enabling/disabling visual elements and/or clusters of visual elements for interaction according to a set of predefined interaction rules (i.e., identifying web objects that are available to receive one or more user inputs), according to an embodiment.

To elaborate on the subjective function type (SFT): According to the embodiments, subjective function type (SFT) is a non-overlapping predetermined classification/categorization of each visual element in a web page according to its role. In an example, the predetermined classifications/categorization of the subjective function types may be based on three discrete types: i) main content, ii) side content, and iii) auxiliary element. According to this classification/categorization; an 'auxiliary element' is a visual element that possesses only operational function/s without a subjective function, while a 'main content' or a 'side content' is a visual element that possesses a subjective function besides its operational function/s, in which any additional function beyond operational functions is considered subjective. Essentially, this is a classification of 2 discrete—and naturally existing—parent types of page elements: i) elements without a subjective function; and ii) elements involving a subjective function besides their operational function/s.

A web page is an interface whose main purpose is to convey information to a user and receive information from the user. In this context, an auxiliary element is an element that provides only operational help and support in the process of conveying and receiving information without possessing a subjective function. For example; a check box for interaction, a frame grouping elements for ease of perception, an icon for attention, a background texture for decoration, a menu button or a search field for navigation are visual elements without a subjective function, and accordingly are auxiliary elements. However, a heading of a news item, a paragraph of an article, an image of a product or an add, a video of a movie, an audio of a musical piece, an application for gaming, a link preview of another web page, or a document including an e-book, are contents of visual elements possessing functions beyond operational functions about the web page and/or website that they belong to (e.g., content for the consideration of viewer/s), and accordingly are main or side contents. In this regard, while a visual element that functions as a navigation button including the name of the link location is an auxiliary element, a similar visual element that functions as a navigation button including a line of poetry or a mathematical formula—besides the name of the link location—is not, since the additional information that it is carrying is not operational, but for the consideration of the viewers, and accordingly, such a visual element is qualified as main or side content.

To elaborate on the principles to identify subjective function type (SFT): Similar to the visual objects as defined hereinbefore, a visual element may perform one or more of the four basic functions in a web page, besides a primal function: A visual element may be navigational, interactive, decorative, informative, or combinations thereof, and in addition to these four basic functions, a visual element inherently—and inevitably—performs an architectural/structural function by taking part in the formation of a web page,—just like a brick of a wall. These basic functions also define the said operational functions: i) Navigational: A navigational visual element helps viewers to navigate (e.g., through a hyperlink) in a single page and/or multiple pages of a website including links to external web pages. A navigational visual element may include visual/audial/textual content related to navigational processes including markup/script; ii) Interactive: An interactive visual element helps viewers to interact (e.g., through a form) with the web page, and/or with the web page server. An interactive visual element may include visual/audial/textual content related to interactive processes including markup/script; iii) Decorative: A decorative visual element carries content for beautifying a page. A decorative visual element may include visual/audial/textual content with decorative features including markup/script (e.g., a script for fetching images from the server); iv) Informative: An informative visual element provides informative content to users. An informative visual element may include visual/audial/textual content with informative features including markup/script (e.g., a script for fetching text from the server). Note: According to the embodiments, in order to simplify the process 302, informative content used in navigational and/or interactive processes without possessing a subjective function are excluded, and considered as content with navigational and/or interactive features (e.g., purely operational GUI elements such as, addresses, icons, etc.); v) Architectural: An architectural/structural visual element helps viewers to perceive layout and content of a web page more accurately, easily and enjoyably by separating segments, framing inter-related visual elements, etc. Only visual elements with null content are purely architectural (e.g., containers like frames, separators, canvases, etc.), and inherently, every visual element is also architectural by taking part in the formation of the web page. And lastly, a visual element may also possess more than one of these functions simultaneously. For example, a navigational visual element may also be decorative by involving an image for beautifying the page, while being informative by involving a text relevant with the link location, e.g., the summary of the content of the link location.

In principle, informative, navigational, interactive, decorative and architectural functions are all operational functions. However, informative function differs from the rest, because only informative content (e.g., a paragraph or an image) may involve a subjective function, and if this is so, then the visual element is considered as main or side content, else it is auxiliary element. In the context of operational and subjective functions, it can be deduced that any visual element with navigational, and/or interactive, and/or decorative, and/or architectural function/s cannot involve any sort of subjective function, i.e., only a visual element with informative function may involve a subjective function. Although this deduction is important in the process of identifying SFT classes/categories, some navigational, interactive, and decorative visual elements may also possess informative content and thus, informative function, as described in examples herein. Therefore, in various embodiments, functional analysis of each content of a visual element is made according to the basic operational functions, in order to identify their functional relation with the respective visual element.

According to the embodiments, for identifying subjective function type (SFT) of each visual element in a web page that a user is viewing, example rules are listed based on the definitions and deductions presented about SFT classification/categorization: i) Basic operational functions of visual elements are: informative, navigational, interactive, decorative, architectural functions; A visual element may possess one or more of these functions simultaneously, and it always possesses an architectural function; ii) Any additional function of a visual element beside its basic operational function/s is considered subjective, and therefore the visual element is considered subjective, i.e., possessing a subjective function; iii) An auxiliary element is a visual element without a subjective function; A 'main content', or a 'side content' is a visual element that involves a subjective function besides its operational function/s; iv) Any visual element with null content (i.e., without any textual/visual/audial content) is auxiliary element; v) Only informative content may involve a subjective function; vi) An informative visual element is an auxiliary element as long as its content does not involve any sort of subjective function; vii) Any visual element whose function is ambiguous is considered decorative, and therefore considered as auxiliary element.

To elaborate on the process 302 to identify subjective function type (SFT), and the process 304 to identify cluster information (CI), an exemplary interbedded procedure is presented according to the embodiments: In embodiments, for identifying roles, such as main contents, side contents and auxiliary elements of a web page, the following sub-processes are executed in the process 302; In step 302/1: each visual element that includes textual/visual/audial content,—including related markup/script—is identified by the system analyzing content properties and/or content itself (e.g., for markup/script), based on the uniform visual element identifier (UVEI) of each visual element. If a visual element includes textual/visual/audial content then it is flagged as 'unidentified element'; else, it is flagged as 'auxiliary element'. In this step, visual elements with null content are identified (e.g., containers, separators, frames, etc.), and which are considered purely architectural. Although they are null in content, they possess properties such as, size, border size, border color, background color, etc. In one embodiment, the system—roughly—estimates the possible roles of visual elements with null contents by comparing their properties and relative positions with the known web page layouts when rendered.

In step 302/2, among the 'unidentified elements' that are flagged in step 302/1, each visual element with navigational and/or interactive features without possessing a subjective function is identified by the steps: For each visual element among the 'unidentified elements' that are flagged in step 302/1; 302/2.1) detecting textual content—including markup/script—related with the execution of navigational and/or interactive processes; 302/2.2) detecting visual content that is a component of a navigational and/or interactive user interface (GUI), 302/2.3) detecting audial content that is a component of a navigational and/or interactive user interface (AUI); 302/2.4) detecting textual content that is a component of a navigational and/or interactive user interface (GUI); Following the execution of the steps regarding functional analysis 302/2.1 to 302/2.4, executing process 304 for identifying cluster information (CI); 304/1) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/2.5) for each detected visual element, deciding whether the visual element is auxiliary element or not, based on the steps 302/2.1, 302/2.2, 302/2.3, 302/2.4, 304/1 and by utilizing the information obtained in the step 302/1. Flagging each visual element as 'unidentified element' or 'auxiliary element' according to the decision.

In one embodiment, for each visual element flagged as 'unidentified element' at 302/1; Regarding the step 302/2.1, textual content including markup is analyzed to detect a hyperlink associated with the visual element for detecting a navigational feature (e.g., URL), and any script associated with the visual element is analyzed for detecting an interactive feature (e.g., JavaScript); Next, the system executes the steps 302/2.2, or 302/2.3, or 302/2.4, or combinations thereof according to the content of the analyzed visual element, (whether or not a navigational and/or interactive feature is detected). Regarding the step 302/2.2, visual content is compared with known graphic components of navigational and interactive GUI elements of web pages such as, buttons, search fields, special shapes, icons (like play, pause record icons)—if any. Further, if the visual element is detected as navigational and/or interactive at the step 302/2.1, then a similarity comparison may be also executed in between the visual content and known graphic components of GUI elements for identifying the purpose of unique images, e.g., special icons, logos, avatars, etc. Regarding the step 302/2.3, audial content is compared with known audial components of navigational and interactive AUI elements of web pages such as, audio like clicks, buzzers, etc.—if any; Regarding the step 302/2.4, textual content is analyzed in order to detect text used only as a component of the GUI that it belongs to, such as an address, an instruction, etc.—if any; Regarding the step 304/1, the position of each detected visual element relative to other visual elements of the web page is analyzed, and based on the detected roles and relative positions, related visual elements for each detected visual element is identified. Accordingly, framing visual elements, i.e., containers, and framed visual elements are identified as groups of interrelated visual elements—if any; Regarding the step 302/2.5, for each detected visual element, based on 302/2.1, based on 302/2.2, or 302/2.3, or 302/2.4 or combinations thereof, and based on 304/1 the system evaluates the obtained information and decides whether the analyzed visual element is auxiliary element or not. For example, based on the features of the visual elements that are enclosed by a container, and based on the relative position of the framing container, the system may predict the purpose of the enclosed group (e.g., a navigation bar, a header, a footer, a social media post, etc.) and may deepen its evaluation for the role detection of the visual elements within the enclosed group. For a visual element that is detected as possessing navigational and/or interactive features in 302/2.1, possible outcomes are as follows: i) if the content (visual, and/or audial, and/or textual) is a component of a navigational and/or interactive user interface, then the visual element is flagged as auxiliary element. ii) if any of the content (visual, and/or audial, and/or textual) is not a component of a navigational and/or interactive user interface, then the visual element is flagged as 'unidentified element'. For a visual element that is detected as 'not possessing' navigational and/or interactive features in 302/2.1, possible outcomes are as follows: i) if the content (visual, and/or audial, and/or textual) is a component of a navigational and/or interactive user interface, then—because its function is ambiguous—the visual element is flagged as auxiliary element; ii) if any of the content (visual, and/or audial, and/or textual) is not a component of a navigational and/or interactive user interface, then the visual element is flagged as 'unidentified element'; according to the embodiment.

In step 302/3, among the 'unidentified elements' that are flagged in step 302/2, each visual element with decorative features without possessing a subjective function is identified by the steps: For each visual element among the 'unidentified elements' that are flagged in step 302/2; 302/3.1) detecting visual content with decorative features; 302/3.2) detecting audial content with decorative features; 302/3.3) detecting textual content with decorative features; Following the execution of the steps regarding functional analysis 302/3.1 to 302/3.3, executing the process 304 for identifying cluster information (CI); 304/2) i) analyzing the position of each detected visual element relative to other visual elements of the web page, ii) analyzing the properties of each detected visual element, and iii) based on the detected roles, relative positions, and properties identifying related visual elements for each detected visual element and grouping the interrelated ones; 302/3.4) for each detected visual element, deciding whether the visual element is auxiliary element or not, based on the steps 302/3.1, 302/3.2, 302/3.2, 304/2, and by utilizing the information obtained in the steps 302/1 and 302/2. Flagging each visual element as 'unidentified element' or 'auxiliary element' according to the decision.

Various strategies may be applied for the detection of visual, audial and textual content with decorative features, without possessing a subjective function. One strategy may be comparing positions of the visual content relative to other visual elements containing visual content for detection of overlapping sections. For example, any visual content that is positioned under another visible content may be considered as background image, and thus decorative. Similarly, a background music may be considered as decorative. Another strategy may be using size and position factors together for identifying images like logos, icons, etc. For example, a visual element containing a relatively small sized image positioned at the top left of a web page without possessing navigational or interactive features may be considered as an ornamental image with pure decorative features. In some cases, separating decorative content from informative ones may require more effort, e.g., due to the similarities of contents. Semantic analysis of textual, visual, and audial contents, may be used in such cases.

In one embodiment, for each visual element flagged as 'unidentified element' at 302/2; Regarding the step 302/3.1, visual elements including images or image sequences with overlaying visual elements including visible content upon them are detected, and also other images like icons, logos, etc. are detected based on their relative positions and their properties like size, shape, etc.; Regarding the step 302/3.2, audio used for decorative purposes such as background music, etc. are detected; Regarding the step 302/3.3, text used for decorative purposes such as, a background fill, ornamental patterns etc. are detected; Regarding the step 304/2, the position of each detected visual element relative to other visual elements of the web page is analyzed, and based on the detected roles and relative positions, related visual elements for each detected visual element are identified. Accordingly, framing visual elements, i.e., containers, and framed visual elements are identified as groups of interrelated visual elements—if any; Regarding the step 302/3.4, for each detected visual element, based on 302/3.1, or 302/3.2, or 302/3.3 or combinations thereof, and based on 304/2, and also utilizing the information obtained by the previous steps 302/1 and 302/2, the system evaluates all obtained information and decides whether the analyzed visual element is auxiliary element or not. For example, based on the features of the visual elements that are enclosed by a container, and based on the relative position of the framing container, the system may predict the purpose of the enclosed group (e.g., a header with a background picture or a canvas with ornamental patterns etc.) and may deepen its evaluation for the role detection of the visual elements within the enclosed group. For a visual element that is processed by the step 302/3, possible outcomes are as follows: i) if the visual element possesses only decorative function (i.e., visual, and/or audial, and/or textual content is decorative), then the visual element is flagged as 'auxiliary element'; ii) if the visual element possesses only navigational and/or interactive function/s with a decorative function, then the visual element is flagged as 'auxiliary element'; iii) else, the visual element is flagged as 'unidentified element'; according to the embodiment.

In step 302/4, among the remaining 'unidentified elements' that are flagged in step 302/3, each visual element with informative features without possessing a subjective function is identified by the steps: For each visual element among the 'unidentified elements' that are flagged in step 302/3; 302/4.1) detecting visual content with informative features without a subjective function; 302/4.2) detecting audial content with informative features without a subjective function; 302/4.3) detecting textual content with informative features without a subjective function; Following the execution of the steps regarding functional analysis 302/4.1 to 302/4.3, executing the process 304 for identifying cluster information (CI); 304/3) i) analyzing the position of each detected visual element relative to other visual elements of the web page, ii) analyzing the properties of each detected visual element, and iii) based on the detected roles relative positions, and properties identifying related visual elements for each detected visual element and grouping the interrelated ones; 302/4.4) for each detected visual element, deciding whether the visual element is auxiliary element or not, based on the steps 302/4.1, 302/4.2, 302/4.3, 304/3, and by utilizing the information obtained in the steps 302/1, 302/2, and 302/3. Flagging each visual element as 'main or side content' or 'auxiliary element' according to the decision.

Various strategies may be applied for the detection of visual, audial, and textual content with informative features without possessing a subjective function. According to the processes 302/1, 302/2 and 302/3, architectural, navigational and/or interactive, decorative visual elements including ambiguous ones (which are flagged as decorative) are identified and flagged as auxiliary elements. In addition, at 302/3, 'navigational and/or interactive+decorative' visual elements are also identified (based on 302/2) and flagged as auxiliary elements. Any remaining visual element that is flagged in step 302/3 as 'unidentified element' possesses an informative function,—with or without other basic operational functions—, and may or may not have a subjective function. These visual elements may be: 'informative', 'informative+navigational and/or interactive', 'informative+decorative', or 'informative+navigational and/or interactive+decorative'. One strategy may be a rough elimination based on content type. Unlike text and images, most of the multimedia files (e.g., videos, audios, image sequences etc.) are main or side contents, and they may be flagged directly as main or side content. However, it is still possible to encounter with a video, audio or multimedia file in a web page that is used purely for operational purposes, e.g., an instructional video about an interactive feature of the web page, or an audio guide for navigating within the website. For precise identification of such content, semantic analysis may be a requirement. On the other hand, in steps 302/1, 302/2 and 302/3, since all operational functions of visual elements are identified (as architectural, navigational, interactive, and decorative respectively and the rest as informative), including clusters of interrelated visual elements (with the exception of the ones belonging to informative visual elements, which are being determined in this step), more practical approaches are also possible. In this context, one strategy may be identifying positional and functional relationship of the content with the cluster that it belongs to, based on: i) the properties of the content such as, size for images or number of characters for text; ii) previously identified function/s of the visual elements that are members of the cluster; iii) predicted or identified function of the cluster as a whole. For example, a relatively short text—that is purely informative without navigational and/or interactive features—positioned on the header may be considered as the name or label of the web page or website, and thus, informative content without a subjective function. However, a relatively long text positioned on the header may be considered as informative content with a subjective function. For example, it can be a quote or a message from the author of the web page. Further, clusters of visual elements with distinctive features may be defined to the system. For example, tables may be defined to the system, in which the content of a data cell element is informative with a subjective function, while the content in a column or row header (e.g., names of the variables) is informative without a subjective function. Furthermore, the system may identify the functions of higher rank clusters by prediction based on the identified functions of visual elements, identified functions of lower rank clusters, and consideration of the positional and functional relationship of lower rank clusters according to the know higher rank clusters with distinctive features. For example, a container including, a link preview with a commenting interface may be considered as a social network post. In general, this strategy may be applied for identifying text and/or image content of articles, social media posts, comments, comments related with the social media posts, etc. And may be supported with semantic analysis of contents.

In one embodiment, for each visual element flagged as 'unidentified element' at 302/3; Regarding the step 302/4.1, each visual element including an image is analyzed according to its content properties (e.g., size and shape), its positional and functional relationship with the cluster that it belongs to and predicted or determined function of the cluster as a whole—if available. Based on the analyses, each informative content without a subjective function is detected. All video and multimedia files, and all image sequences are considered as possessing a subjective function; Regarding the step 302/4.2, each visual element including a relatively small sized audio file is analyzed based on semantic analysis. Based on the analyses, each informative content without a subjective function is detected. The rest of the audio files—including the audio data of video files—are considered possessing a subjective function; Regarding the step 302/4.3, each visual element including text is analyzed according to its content properties (e.g., number of characters, words, sentences, etc.), its positional and functional relationship with the cluster that it belongs to and predicted or determined function of the cluster as a whole—if available. Based on the analyses, each informative content without a subjective function is detected; Regarding the step 304/3, the position of each detected visual element relative to other visual elements of the web page is analyzed, and based on the detected roles and relative positions, related visual elements for each detected visual element is identified. Accordingly, framing visual elements, i.e., containers, and framed visual elements are identified as groups of interrelated visual elements—if any; Regarding the step 302/4.4, for each detected visual element, based on 302/4.1, or 302/4.2, or 302/4.3 or combinations thereof, and based on 304/3, and also utilizing the information obtained by the previous steps 302/1, 302/2 and 302/3, the system evaluates all obtained information and decides whether the analyzed visual element is 'main or side content' or auxiliary element. For example, based on the features of the visual elements that are enclosed by a container, and based on the relative position of the framing container, the system may predict the purpose of the enclosed group and may deepen its evaluation for the role detection of the visual elements within the enclosed group. For a visual element that is processed by the step 302/4, possible outcomes are as follows: i) if the informative content of the visual element does not possess a subjective function (i.e., visual, and/or audial, and/or textual content without a subjective function) then the visual element is flagged as 'auxiliary element'; ii) if the informative content of the visual element does possess a subjective function (i.e., visual, and/or audial, and/or textual content with a subjective function) then the visual element is flagged as 'main or side content'; according to the embodiment.

In step 302/5, among the remaining visual elements that are flagged as 'main or side content' in step 302/4, each visual element with side content (i.e., extraneous content) is identified by the steps; For each visual element among the 'main or side contents' that are flagged in step 302/4; 302/5.1) detecting visual extraneous content; 302/5.2) detecting audial extraneous content; 302/5.3) detecting textual extraneous content; Flagging each detected visual element as 'side content' and flagging the rest as 'main content'. Since the cluster information (CI) is identified for all visual elements of the web page in the previous steps 302/1, 302/2, 302/3 and 302/4, and since the final decision step is needles, process 304 and the final step are eliminated.

Various strategies may be applied for the detection of side content, i.e., extraneous content. One strategy may be detecting third party websites, e.g., by analyzing download/upload activities. Another strategy may be detecting ads based on the industrial standards that are being used, such as standardized banner sizes, or add fields etc. Another strategy may be semantic analysis of textual, visual, and audial contents, which may be considered as the most reliable but the costliest in terms of the data processing load.

In one embodiment, for each visual element flagged as 'main or side contents' at 302/4; Regarding the step 302/5.1, image and field size of the visual element is compared with known industry standards and flagged as suspicious if it matches. Next, download/upload activities of the—suspicious—visual element may be inspected based on the related markup/script and fetched data. As a result, third party ad resource and visual extraneous content is detected; Regarding the step 302/5.2, audial extraneous content is detected by detecting 3rd party streaming transmissions; Regarding the step 302/5.3, textual extraneous content is detected by semantic analysis; Regarding the outcome of the step 302/5, among the visual elements that are flagged as 'main or side contents' each visual element with 'side content' is identified, and accordingly each visual element with 'main content' is identified; according to the embodiment. In addition to all these, 'main content' may be sub-classified/sub-categorized and be used for further filtering of visual elements for interaction. In one embodiment, content published by the website (e.g., columns, articles, news items, etc.) and content published by the viewers (e.g., comments, etc.) are identified and only website's content is filtered for interaction (e.g., based on functional analysis, cluster information, etc.). In another embodiment, link previews of other web pages, and dynamic data displayed in tables (e.g., fetched data from the database of the website displayed in a HTML table upon a request) are identified and filtered out (e.g., based on functional analysis, cluster information, etc.).

To summarize the processes 302 and 304, which are interbedded according to the embodiment; In step 302/1, visual elements with null content, i.e., purely architectural visual elements, are identified, and the remaining visual elements may be flagged as 'unidentified element' and filtered for further evaluation. At this stage, 'unidentified elements' to be processed may include visual elements with navigational features, and/or interactive features, and/or decorative features, and/or informative features, or—as a special case—ambiguous features—which are considered as decorative—, with or without a subjective function. In step 302/2, visual elements with navigational and/or interactive features without possessing a subjective function are identified—if any. Furthermore, by the step 304/1 cluster information (CI) of the said visual elements are identified, and thus, clusters of interrelated visual elements regarding the said visual elements are determined—if any. In this process, any visual element containing a visual or audial or textual content that is not related with navigational and/or interactive functions is flagged as 'unidentified element' and filtered for further evaluation. In step 302/3, visual elements with decorative features without possessing a subjective function are identified—if any. Furthermore, by the step 304/2 cluster information (CI) of the said visual elements are identified, and thus, clusters of interrelated visual elements regarding the said visual elements are determined—if any. In this process, any visual element containing a visual or audial or textual content that is not related with the decorative functions is flagged as 'unidentified element' and filtered for further evaluation. In step 302/4, visual elements with informative features without possessing a subjective function are identified—if any—, and the rest of the visual elements are flagged as 'main or side content'. Furthermore, by the step 304/3 cluster information (CI) of the said visual elements are identified, and thus, clusters of interrelated visual elements regarding the said visual elements are determined—if any. In step 302/5, each visual element with side content is identified—if any—, and accordingly remaining ones are flagged as main content. As a result, the system identifies basic operational function/s of each visual element, while identifying any subjective function classified/categorized as main or side content, and determines clusters of interrelated visual elements, according to the embodiment. In one embodiment, in order to speed up the process 302/1 to 302/5, for the uniform web pages of websites (e.g., Twitter, Instagram, Facebook etc.), before executing 302/1, common objects of web pages are identified such as, header, footer, local navigation boxes, scan columns, etc., by comparing the web pages of the website. Next, based on the common visual elements, the system—roughly—estimates the possible roles of the visual elements by comparing their properties and relative positions in the rendered web page with known web page layouts.

The above-listed elaborations with regard to the process 300 is not limited with the embodiments provided, thus many more embodiments and implementations are possible.

Figure 4:
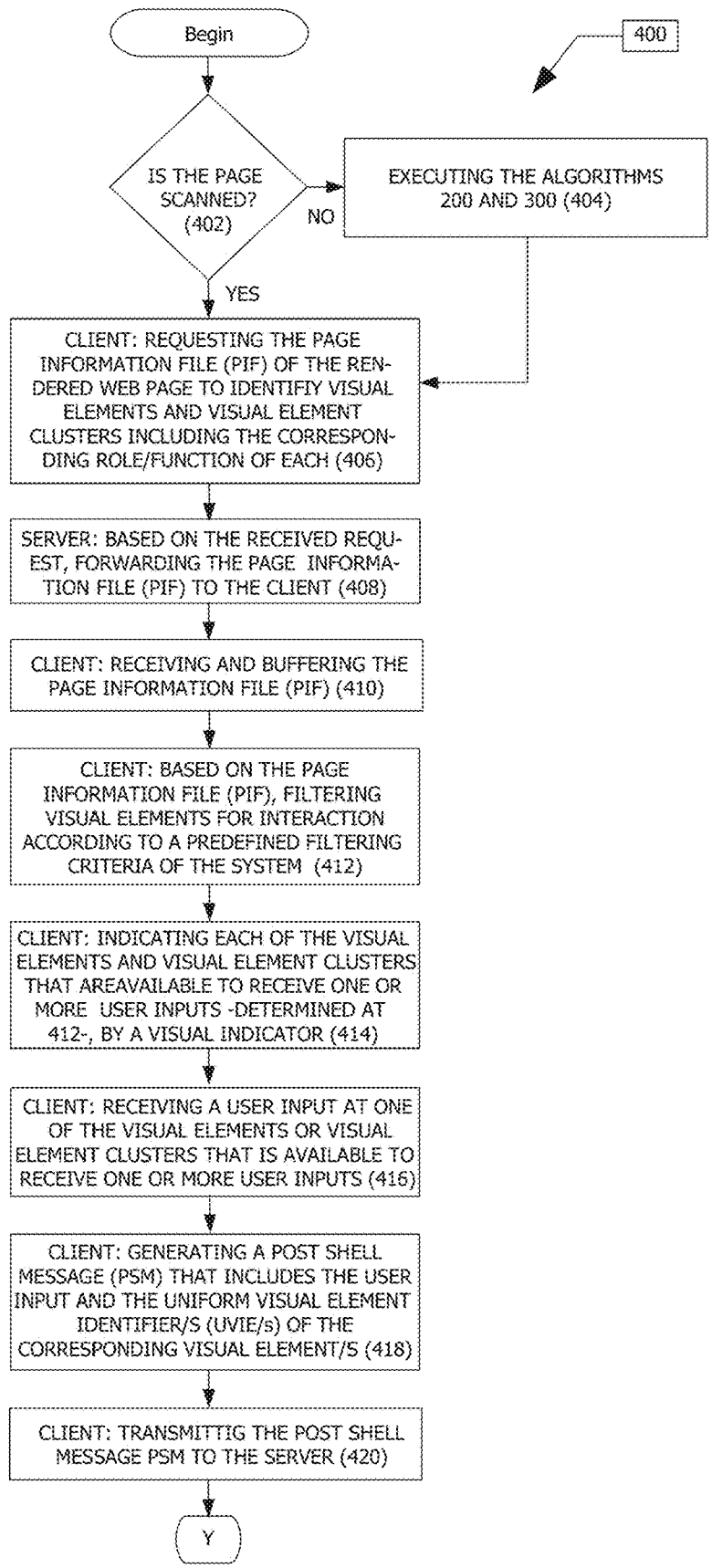
FIG. 4 is a flowchart diagram illustrating an example process to filter visual elements for interaction, and based on receipt of a selection by a user from among these filtered visual elements, to associate user inputs with selected visual elements of a rendered web page.
Figure 4:
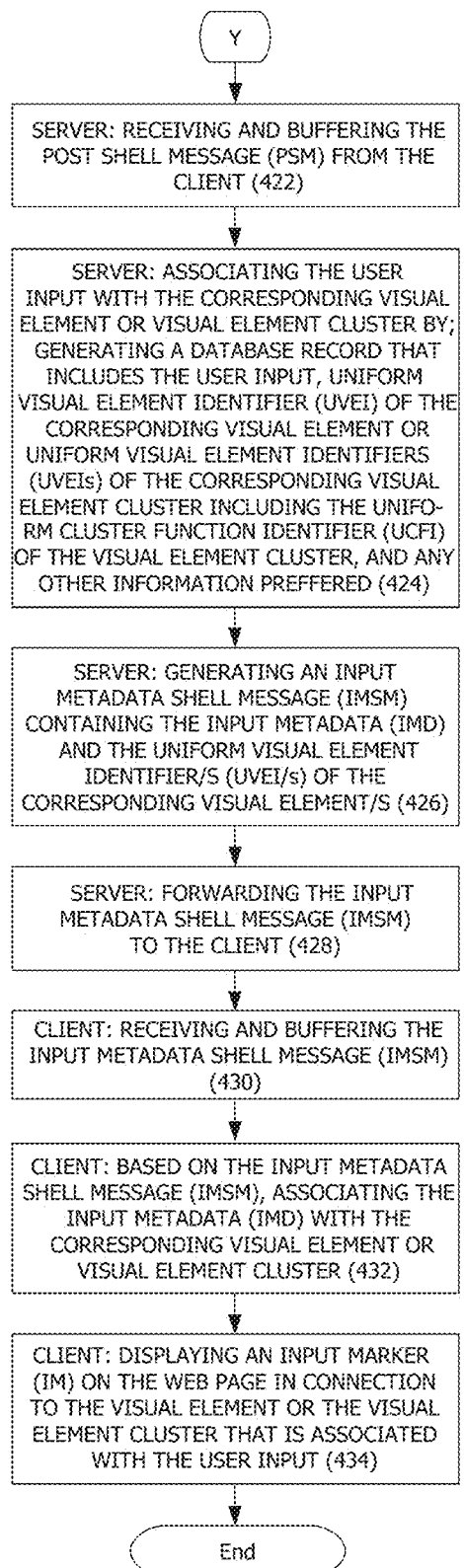

FIG. 4 is the flowchart diagram 400 illustrating an example process to filter visual elements and/or clusters of interrelated visual elements for interaction and based on user's selection among these filtered visual elements, to associate user inputs with selected visual elements and/or clusters of interrelated visual elements of a rendered web page, according to an embodiment.

The process begins with the request of a system user from the client to associate a user input with a visual element of a rendered web page. At 402, the client inquiries whether the rendered web page is scanned, i.e., processed by 200 and 300, or not. If the web page is not scanned, then the process 200 and the process 300 may be executed respectively at 404 before 406 is executed. Else, 406 is executed immediately after.

At 406, the client requests the page information file (PIF) of the rendered web page generated at 300 in order to contextually identify each visual element and cluster of interrelated visual elements via UVEIs and CIs including corresponding roles/functions of each, such as basic operational function/s (BOF), basic roles (SFT), and/or high-level function/s of each cluster of interrelated visual elements (UCFI), etc. Next, based on the received request, the server forwards the page information file (PIF) to the client (408), and the client receives and buffers the page information file (PIF) (410).

Next, based on the page information file (PIF), the client decides on the interactions, i.e., identifying the availability of each visual element and/or each cluster of interrelated visual elements for interaction according to a predefined filtering criteria of the system and flag the UVEIs as 'available' in the PIF, which is buffered in the client. More precisely, based on the role/function of each visual element and their interrelationship including the high-level functions of each corresponding cluster determined at 300, the client (or the server in another configuration) filters visual elements for interaction according to a predefined filtering criteria of the system, (e.g., as only main content, only side content, only auxiliary elements, or any combination thereof for associating user generated contents, and/or as clusters of interrelated visual elements according to their 'positional', or 'positional+functional' relationships for associating user generated software apps), and enables filtered visual elements for interaction, while disabling the remaining visual elements (412). Filtering criteria of the embodiments may vary. For example, for associating user generated contents, in order to focus on contextual information of web pages, e.g., news, articles, comments, videos, social media posts, etc., only visual elements including main content may be available for interaction. According to various embodiments, for associating a user generated content, the system may allow selection of only one visual element among the filtered ones. However, for associating a user generated software app, the system may allow selection of a cluster of visual elements among the filtered ones, and thus, may associate a user generated software app with one or more visual elements. In this process, the system may utilize the interrelated visual elements that are identified and grouped at 300,—where the relationship may be positional, and/or 'positional+functional', and/or any other predefined relationship criteria—, and filters them for interaction, according to a predefined filtering criteria. For associating user generated software applications, predefined filtering criteria may be filtering only clusters with 'positional+functional' relationships. However, predefined filtering criteria may be more specific about the clusters to be filtered for interaction. For example, some particular clusters with distinctive features may be predefined in the system,—which may be specific to certain websites or may be used in general—such as, link previews, social media posts, headers, footers, menu boxes, navigation bars, tables, commenting interfaces, etc., and they may be identified by analyzing the previously detected roles/functions and relationships at 300 (FIG. 3), according to the embodiments. In such embodiments, general features of clusters may be defined and introduced to the system by 'positional and functional' relationships of the visual elements together—instead of only positional—because layouts of clusters may alter in time. In this context,— for example—a social media post may be defined and introduced to the system as a cluster including at least 3 sub-clusters due to one of them including main content, one of them including author ID, and one of them including a commenting/reaction interface. Thus, the mediums/interfaces used in web pages such as, social media posts, link previews, commenting interfaces, tables, media players etc. may be introduced to the system according to their qualifications and characteristics instead of dictating raw positional data only,—which may be considered non-persistent for most of the cases. Alternatively, or in addition, the system may also enable a user to define a cluster of visual elements and introduce it to the system by manual selection of visual elements from among the visual elements of a rendered web page. Thus, a system user may define a unique cluster (e.g., according to its role and/or function) to be dynamically processed/manipulated by one or more software applications each developed for the defined cluster.

Next, the client indicates each of the visual elements and/or clusters of interrelated visual elements that are available to receive one or more user inputs—determined at 412—by a visual indicator, e.g., by highlighting the available (filtered) visual element field (414). Thus, the system user may select a visual element and/or a cluster of interrelated visual elements for associating a user input. In embodiments for associating user generated contents, the system highlights the available visual element fields in green, and for associating user generated software apps the system highlights the available visual element fields in blue.

Next, the client receives a user input for a visual element or a cluster of interrelated visual elements that is available to receive one or more user inputs (416). In various embodiments, system users create user inputs via an input interface that is particularly designed for generating user inputs. In embodiments, for enabling users to generate software applications, a software development tool is provided. According to the embodiments, the software development tool isolates a selected cluster, and indicates each sub-cluster according to the ranks of interrelationship within the selected cluster (similar to a DOM tree, where the document is the selected cluster), wherein a system user may include additional content—including scripts—, and/or alter the properties of visual elements, and/or add new visual elements, and/or define the fields or portions of the fields of visual elements to be dynamically processed/manipulated by the script that he/she is developing. In another embodiment, based on a user's selection of an available cluster, the system displays a list of—system executable—software apps that are particularly developed for the selected cluster of interrelated visual elements. Thus, the user may select an already existing user generated software app to process/manipulate a cluster.

Next, the client generates a post shell message (PSM) that includes all information pertaining to the user input and the uniform visual element identifier/s (UVEI) of the corresponding visual element/s including each corresponding subjective function type (SFT) and corresponding cluster information (CI) (418). In various embodiments, post shell message (PSM) also includes other information obtained in processes 302, 304, and 306 such as, basic operational function/s (BOF) of each visual element, and uniform cluster function identifier (UCFI) of each cluster of interrelated visual elements, etc.

Next, the client transmits the post shell message (PSM) to the server (420), and the server receives and buffers the post shell message (PSM) (422).

Next, in the case of establishing an association with a singular visual element, the server associates the user input with both the corresponding visual element and the hyperlink that is associated with the visual element—if any—by generating a database record that includes the user input (i.e., the content of user input such as images, texts, scripts, etc.), uniform visual element identifier (UVEI) of the corresponding visual element including its corresponding basic operational function/s (BOF), subjective function type (SFT) and corresponding cluster information (CI) and any other information preferred (424). In the case of establishing an association with a cluster of interrelated visual element, the system may associate the user input with the corresponding cluster of interrelated visual elements by generating a database record that includes the user input (i.e., the content of user input such as images, texts, scripts, etc.), the uniform cluster function identifier (UCFI) of the corresponding visual element cluster, each uniform visual element identifier (UVEI) of the visual elements that belong to the cluster including each corresponding basic operational function/s (BOF), subjective function type (SFT), and cluster information (CI), and any other information preferred (424).

In one embodiment, the server appoints a unique resource identifier (e.g., an URL) for the user input as the database ID and creates a database record for the user input under this ID where the server records all information according to the database fields of the user input such as UVEI, BOF, SFT, CI, UCFI of the associated visual element or the associated cluster of interrelated visual elements, contents of the user input, further interactions with the user input such as comments, etc. In this scenario database record of the user input may be updated whenever the user input is edited, or comments are added. In another embodiment, for each user input, a dedicated web page that includes the content of the user input may be generated also, and the web page may be addressed with the appointed resource identifier that is used as the database ID. In various embodiments, only one visual element may be associated with a user input if the user input is a user generated content, while one or more visual elements may be associated with a user input if the user input is a user generated software app. In addition to that, in case of user generated contents, subjective function type (SFT) and cluster information (CI) may be temporary references used for each viewing session of a client, and thus they are not recorded in the database and not included to post shell message (PSM). On the other hand, in case of user generated software apps, subjective function type (SFT) and cluster information (CI) may be permanent references used against contextual and/or structural alterations of interacted clusters of web pages/websites, and thus they may be included to post shell message (PSM) and recorded in the database. Thus, positional and functional relationship of visual elements within an interacted cluster may be used as a reference to identify the cluster if it alters, and further, may be used for adapting the associated software applications to the existing state of the altered cluster. For example, the structure/layout of uniform social media posts (e.g., post interfaces) of a social media website may alter in a way that relative positions of all sub-clusters such as, 'author information', 'main content', 'reaction interface', 'commenting interface' may completely change. Furthermore, content and properties of the visual elements, such as icons, shapes, background colors, etc., may also alter completely. However, the system may still identify the altered 'post interface' based on the analysis of the initial state and recent state according to the positional and functional relationship within the clusters of the pages of the said social media website, according to the embodiments.

Next, for the user input, the server generates an input metadata shell message (IMSM) containing input metadata (IMD), i.e., metadata of the user input, and uniform visual element identifier/s (UVEI) of the corresponding visual element/s (426).

Next, the server forwards input metadata shell message (IMSM) to the client (428), and the client receives and buffers input metadata shell message (IMSM) (430).

Next, for the input metadata shell message (IMSM) received, the client associates input metadata (IMD) with the corresponding visual element or cluster of interrelated visual elements of the web page (432).

Next, the client displays an input marker (IM) on the web page in connection to the corresponding visual element and/or cluster of interrelated visual elements that is associated with the user input (434).

The process terminates after the execution of 434. As a result of the process 400, the client, in collaboration with the server, associates a user input with a visual element and/or a cluster of interrelated visual elements that are available to receive one or more user inputs, according to an embodiment.

Figure 5:
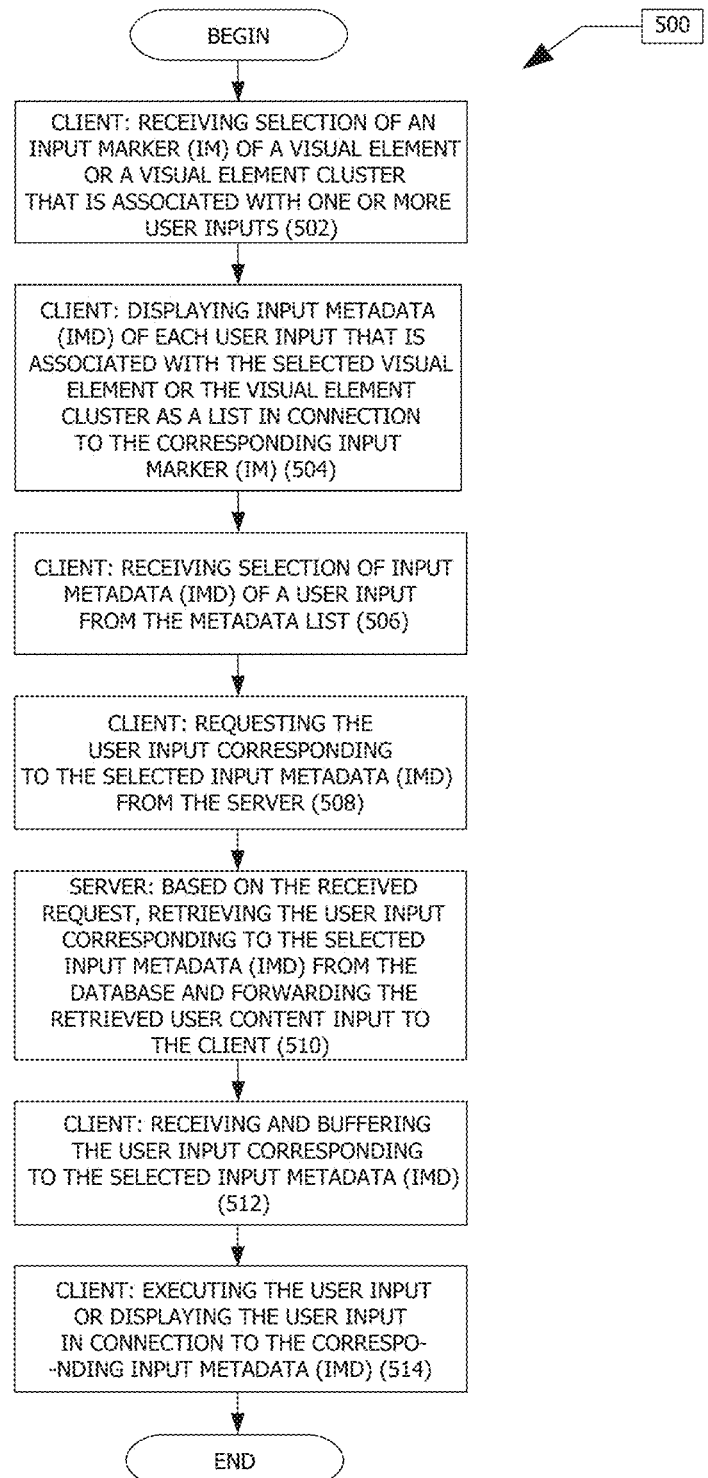
FIG. 5 is a flowchart diagram illustrating an example process to display metadata of user inputs, to display content of user inputs and/or to execute program instructions of user inputs in connection with the corresponding visual elements of a rendered web page.

FIG. 5 is the flowchart diagram 500 illustrating a process to display metadata of user inputs, to display content of user inputs and/or to execute program instructions of user inputs in connection to the corresponding visual elements and/or clusters of interrelated visual elements of a rendered web page, according to an embodiment;

The process begins with the selection of an input marker (IM) of a visual element or a cluster of interrelated visual elements—of a rendered web page—that is associated with one or more user inputs, by the system user. In one embodiment, system user selects the input marker (IM) by clicking a pointing device. At 502, the client receives the selection.

Next, based on the received selection and input metadata shell messages (IMSM) received and buffered at 224 and/or 430, the client displays input metadata (IMD) of each user input that is associated with the selected visual element or cluster of interrelated visual elements as a list in connection to the corresponding/selected input marker (IM) (504). In one embodiment, N number of input metadata (IMD) is listed in rows for N number of corresponding user inputs. The user browses metadata list that is ranked according to various ranking algorithms for display on the web page. The list scrolls downward if needed. Input metadata (IMD) contains summary info such as heading, rank, popularity score, publisher etc., and the system user may decide whether to reach content pertaining to a user input or not according to metadata.

Next, the client receives selection of input metadata (IMD) of a user input from the metadata list (506). In one embodiment, a system user selects one of the input metadata (IMD) from the metadata list manually by a pointing device.

Next, the client requests content pertaining to the user input corresponding to the selected input metadata (IMD) from the server (508).

Next, based on the received request, the server retrieves the requested content pertaining to the user input corresponding to the selected input metadata (IMD) from the database and forwards it to the client (510).

Next, the client receives and buffers the content pertaining to the user input corresponding to the selected input metadata (IMD) (512).

Next, if the user input is user generated content, then the client displays the content pertaining to the user input in connection to the corresponding input metadata (IMD), else the client executes program instructions of the user generated software application in connection to the corresponding visual element and/or cluster of interrelated visual elements (514). As a result of the process 500, the client, in collaboration with the server, displays metadata and content of user inputs in connection to the corresponding visual elements and/or clusters of interrelated visual elements, and/or displays metadata of user generated software apps and executes the selected ones according to an embodiment.

Figure 6:
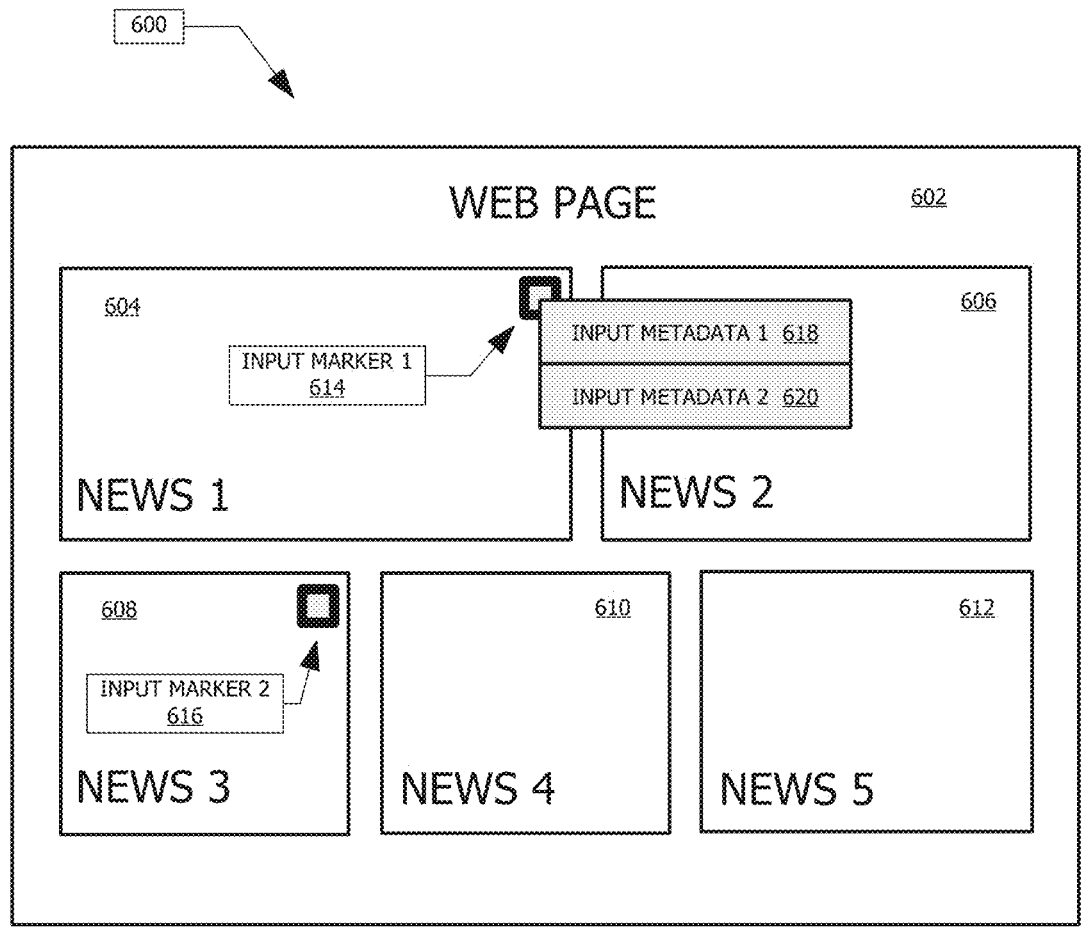
FIG. 6 is an exemplary user interface displaying a plurality of input markers (IM) and input metadata (IMD) of associated user inputs on a rendered web page.

FIG. 6 is an exemplary user interface 600 displaying a plurality of input markers (IM) and input metadata (IMD) of various user inputs that are associated with a web page 602, according to an embodiment. The web page 602 includes several visual objects, shown as 604, 606, 608, 610, and 612. A plurality of user inputs is associated with visual objects 604 and 608, and they are marked with input markers 614 and 616 respectively. 618 and 620 are input metadata (IMD) of previously received user inputs associated with the visual object 604. Input metadata 618 and 620 are displayed on the web page 602 as a list, in connection to the associated visual object 604. Infinite numbers of input metadata (IMD) associated with a visual object may be displayed by a system user via scrolling down the list.

Figure 7:
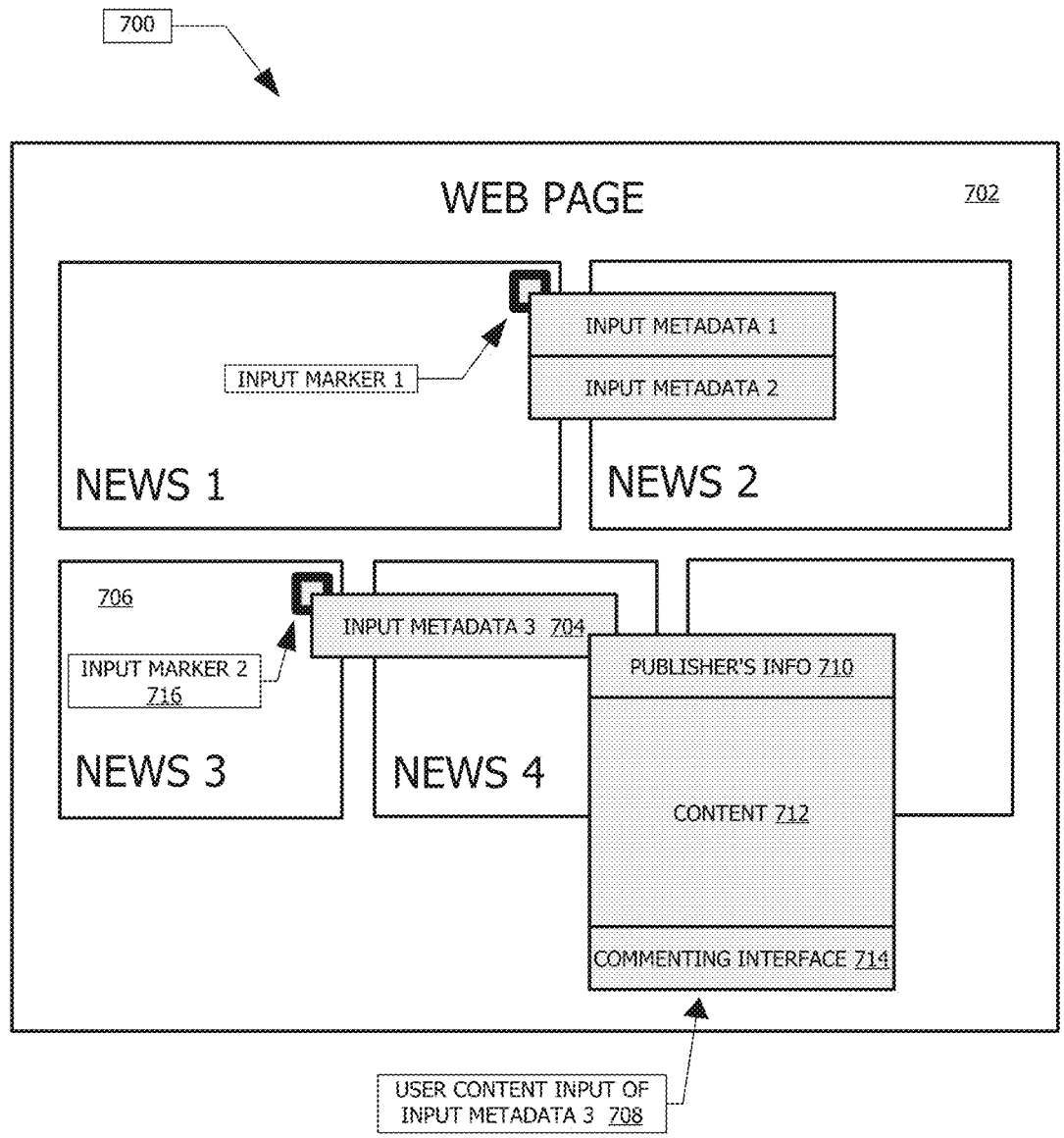
FIG. 7 is an exemplary user interface displaying a user input corresponding to an input metadata (IMD)

FIG. 7 is an exemplary user interface 700 displaying a user input corresponding to a selected input metadata (IMD) at a web page 702, according to an embodiment. As shown, a system user selects input metadata 704 corresponding to the input marker 716 displayed in connection to the associated visual object 706 and based on the selection, the user input 708 that includes publisher's information 710, content 712, and a commenting interface 714, is displayed in connection to the corresponding input metadata 704 on the web page 702.

Figure 8:
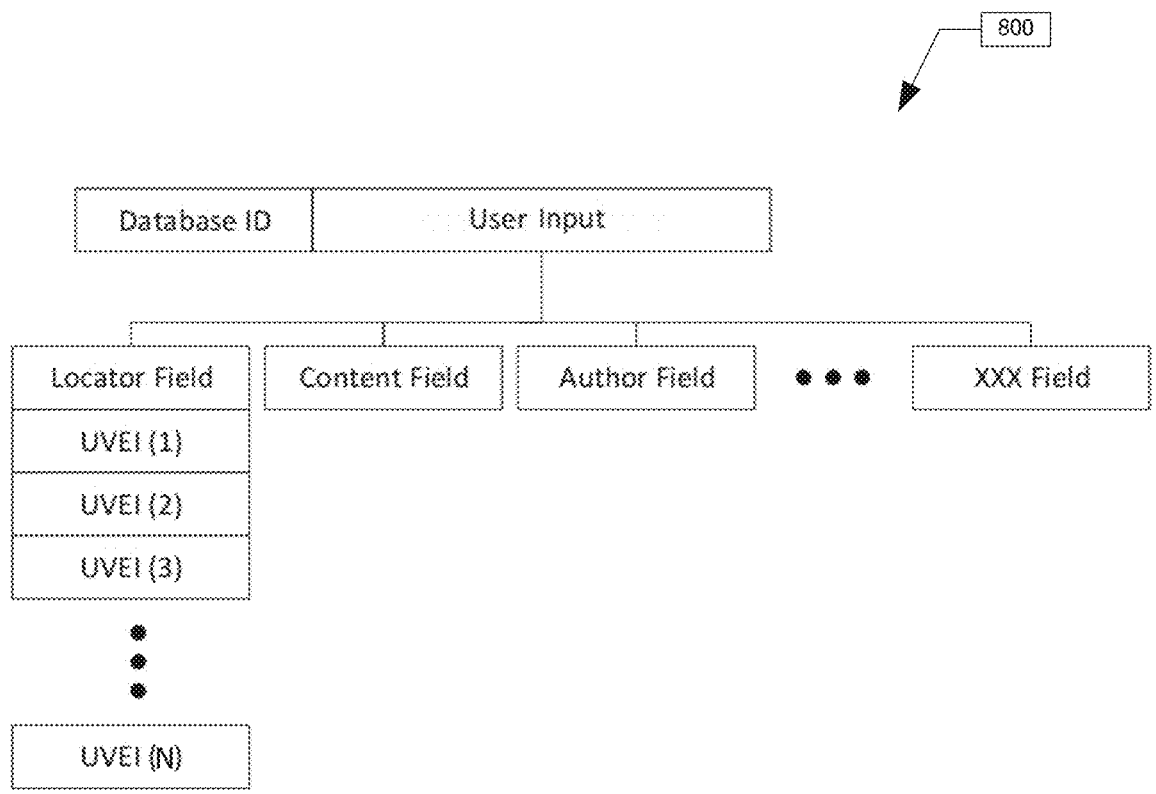
FIG. 8 is an exemplary database record structure representing a database record for a user input.

FIG. 8 is an exemplary database record structure 800 representing a database record for a user input. As illustrated in FIG. 8, the database record structure 800 includes a database ID for each user input stored in the database. In database record structure 800, fields of a user input record are displayed as locator field, content field, author field, and any other field etc. The association of a user input may be identified by the UVEI/s recorded in the locator field. The content field includes the content of the user input. The database record structure 800 may also include an author field to identify the author of the user input, as well as other fields related to the user input or the author, such as a date of generation/revision of the user input, contact information for the author, and other such information. As discussed hereinbefore, the UVEIs stored in the database record structure 800 are only recorded UVEIs (rUVEIs) and a visual element with which a user has interacted is associated through an rUVEI, such as within the user input database record structure 800. In this regard, database is queried based on the comparison of rUVEIs with the nUVEIs that are identified in each viewing session of a client on a rendered web page. Any number of rUVEIs may be stored in the database record structure 800. User input may be associated with a cluster of visual elements, thus multiple UVEIs may be recorded in the locator field of the user input record, and thus these UVEIs become rUVEIs. Alternatively, or in addition, user input may be associated with only a single visual element through a single rUVEI, according to the embodiments.

Figure 9:
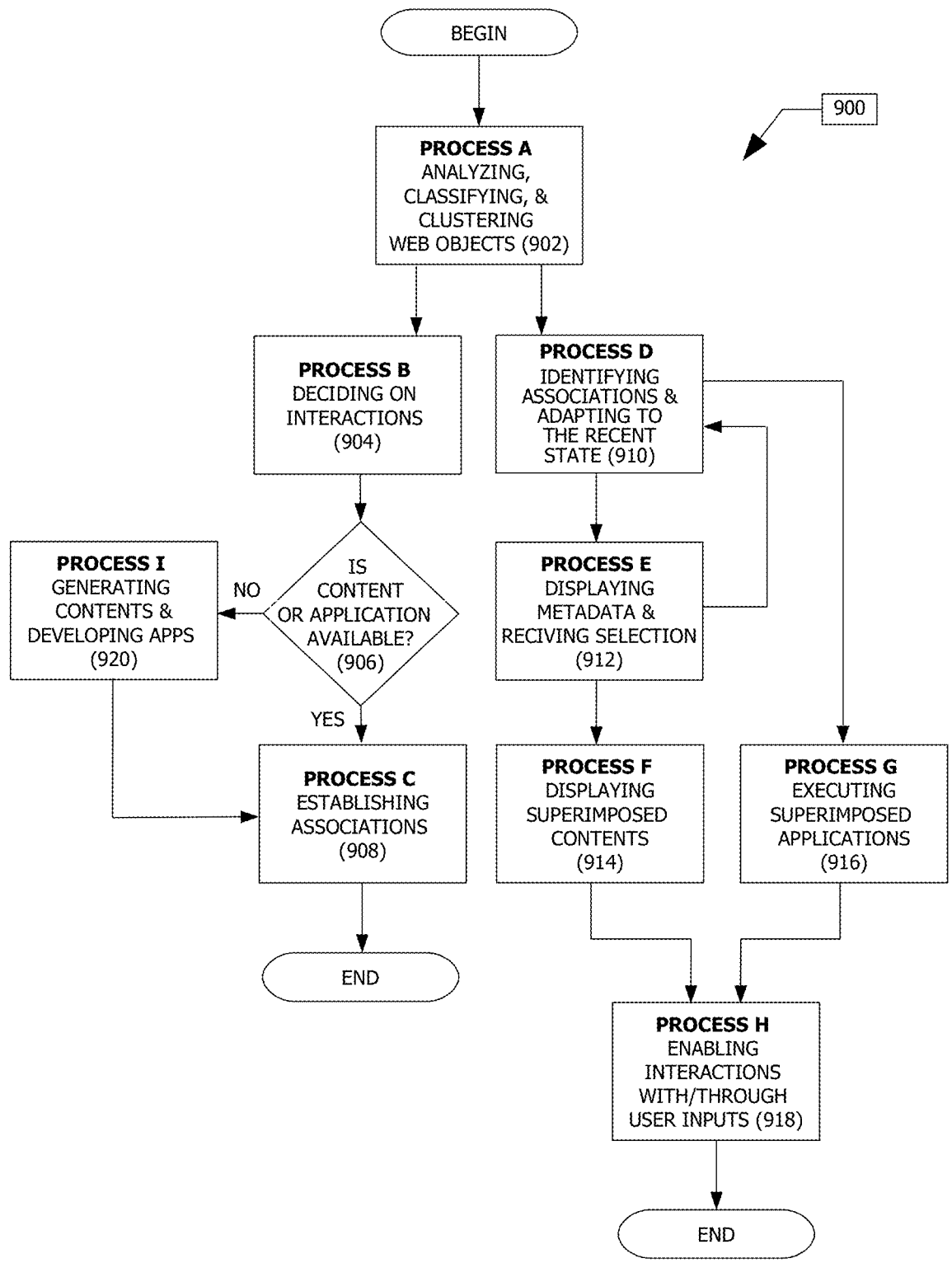
FIG. 9 is a flowchart diagram illustrating an example process that includes steps in respect to processing of/interacting with a rendered web page.

FIG. 9 is the flowchart diagram 900 illustrating an example process that includes steps in respect to processing of/interacting with a rendered web page, according to an embodiment. The process 900 may include the whole system as both the client and server executing the steps in coordination with each other while interacting with a system user through the client. Processes 902 to 920 are processes/steps A to I respectively (excluding the decision process/step 906 which is also a process/step of 900 but without an assigned letter for simplification of the description). The sequence of the steps A→B→C may represent the process of establishing a new association between a user input and a web object (i.e., associating/integrating a content or feature to a web page for the first time), while steps A→D may represent the process of identifying pre-existing associations (i.e., identifying each association between existing user inputs and web objects) and adapting to the contextual/structural alterations that occur from the initial state to the recent state, of each web object that is associated with a user input. The process steps A→B→C as a whole may generally correspond to the processes 200, 300 and 400 as a whole, while the process steps A→D as a whole may generally correspond to the processes 200 and 300 as a whole. Both processes A→B→C and A→D may be executed for each client individually at each viewing/rendering. The steps A→B→C and A→D together may ensure the stability (i.e., consistency) and sustainability (i.e., persistency) of interactions. The steps E, F, and G are about recommending, previewing, displaying, and execution processes of superimposed contents and applications, i.e., associated/integrated contents/features; while the step H is about providing users with the ability to connect and interact with each other through superimposed contents and applications. Finally, the step I is about generating contents and developing apps to be associated with web objects. In this context, the system provides an intelligent tool for assisting both layman and expert users to develop applications that dynamically process/manipulate web objects based on hybrid intelligence.

According to various embodiments, the process 900 begins with the rendering of a web page—partially or wholly—by the web browser of a system user.

Process A—902—includes the interbedded steps of analyzing, classifying, and clustering visual elements of the rendered portions of a web resource that a user is viewing. In this process, the system analyses rendered visual elements for extracting corresponding UVEIs to be used as a contextual reference of the corresponding respective visual element for further analyses such as for classifying visual elements (i.e., singular web objects such as images, videos, audios, texts, etc.) into one or more of a plurality of predetermined classes (e.g., basic operational functions and subjective function types) and clustering interrelated visual elements (i.e., meaningful clusters of singular web objects such as GUIs, forms, tables, lists, articles, etc.) according to their positional and/or functional relationships in rank orders, including extracting/interpreting the role/function of each cluster in rank orders.

In the first sub-step of 902, the system may analyze each visual element individually, including related markup/script and fetched content (such as web images, videos, audios, etc.) to collect distinctive information about the visual element (i.e., to extract the basic context) and generates a 'uniform visual element identifier' UVEI for each of the identified visual elements, which uniquely identifies a corresponding one of the visual elements. More precisely, the system may associate with each of the UVEIs, information regarding the web page, distinctive information and/or properties of content of the corresponding one of the visual elements, and a relative position information of the corresponding one of the visual elements. As a result, the system assigns a UVEI to each visual element (i.e., singular web object) to be used both as a base for further analysis and as a reference (e.g., an analogue) for establishing associations between user inputs and web objects.

Next, based on the UVEIs generated, the system may analyze the elements for classifying each of the elements into one of the basic operational functions classified as, for example, navigational, interactive, informative, decorative, structural, or combinations thereof. In this process, the system may further classify each element into one of the basic roles, i.e., subjective function types classified as 'main content' and 'auxiliary element'. Subjective function type (SFT) is a non-overlapping classification of each element according to its basic role in a page. In this context, further sub-classes/sub-categories may be created according to the operational needs. For example, according to embodiments, 'main content' may also be sub-categorized as 'main content' and 'side content' per se. According to the classification mechanism of the system: i) all elements possess one or more basic operational function/s; ii) an 'auxiliary element' is an element that possesses only operational function/s, i.e., having only an operational role without a subjective role; iii) a 'main content' or a 'side content' is an element that also possesses a subjective function besides operational function/s, i.e., conveying a subject matter, i.e., a matter presented for consideration of the viewers. For example, in YouTube™, a scroll bar or a play button may be identified as an auxiliary element, a video or a link preview of a video may be identified as a main content, while an ad or any other extraneous content may be considered as side content. As a result, the system may classify each visual element (i.e., each singular web object) into one or more of the basic operational functions and further classifies each visual element into, for example, only one of the subjective function types, i.e., one of the basic roles.

Further, in this process, based on the classification of the basic operational functions and utilizing the extracted information regarding the classification of the subjective function types, the system may analyze respective relative positions and respective functional relationships of the elements with other elements, in order to cluster functionally interrelated elements in rank orders and extract the function of each cluster. In this context, unlike conventional segmentation of elements, clustering includes all ranks of interrelationship. For example, a search field and a search button lined up next to each other serving for the same purpose is a first order cluster, while the entire navigation bar containing these two elements besides a couple of link buttons is a second order cluster and so forth. Accordingly, the highest order cluster corresponds to all visual elements of a web page framed/enclosed by the canvas, i.e., the web page itself. Further, the system may extract high-level function/s of each identified cluster of interrelated visual elements and assigns a 'uniform cluster function identifier' (UCFI) for each as a contextual reference to be used for establishing associations with a cluster of interrelated visual elements—in addition to the set of UVEIs that belongs to the cluster.

Referring again to Process A: i) Uniform cluster function identifier (UCFI) may also be used for individual visual elements by considering each visual element as a zeroth order cluster. ii) The process of 'classifying and clustering' are interbedded processes, i.e., the information obtained in one process is used to obtain information in the other and vice versa, as shown with a loop in the flowchart 300 (FIG. 3). iii) Although insufficient, stand-alone analyses purely based on the page view (i.e., image processing based on computer vision such as implementing Gestalt Principles as proximity, similarity, continuity, and closure), may be used as a supportive process such as, in the process of identifying the positional interrelationship of visual elements, or as a preliminary analysis of web resources in order to optimize the process of deep analysis of the HTML/JS code, fetched data, structure, etc.

As a result of Process A, i.e., the process of analyzing, classifying, and clustering web objects, the system determines/interprets at a contextual level 'what exactly the web objects are' in the rendered web page. Following the execution of Process A, the processes B and D may be initiated and executed independent of each other. In some examples, the processes B and D may be initiated simultaneously and executed independent of each other.

Process B—904—includes the step of deciding on interactions with regard to the rendered portions of the web resource that the user is viewing. In this process, based on i) each UVEI generated; ii) the role of each visual element identified; iii) each cluster of interrelated visual elements identified including the corresponding UCFI; and iv) the predefined set of interaction rules that is set according to the operational and implementational needs; the system may control users' interaction with web objects—singular or clustered—by recommending interaction options and enabling/disabling web objects for interaction according to the selected interaction type. The predefined set of interaction rules is a library of operational rules that is set for 'how a user can interact with which 'visual element' or 'cluster of interrelated visual elements' based on an interaction type'. In other words, for each interaction type—which represents a unique interaction option for either content integration, i.e., associating contents, or feature integration, i.e., associating apps—special and general rules are assigned according to the interaction needs and based on the criteria of ensuring the stability and sustainability. For example, as a general rule, interaction with a cluster of randomly selected visual elements is prohibited—due to the violation of the stability/sustainability criteria—, unless a determinable function of the cluster is introduced into the system by the user. Or, for example, as a special rule, only visual elements with particular roles—such as only main content and side content—may be enabled for interaction. In this context, the system recommends interaction options to a user, and based on the preferences of the user, the system enables visual elements and/or clusters of interrelated visual elements for interaction and disables the rest (e.g., filtering visual elements for interaction) according to the corresponding interaction rules and indicates each available visual element or cluster of interrelated visual elements, e.g., with a visual indicator, for the selection of the user.

Referring again to Process B: i) the interaction rules that can be set are infinitely many and take shape individually according to the needs of each implementation possibility. ii) In order to reduce the processing load of the system, Process B may be initiated with a receival of an interaction request of the user.

As a result of Process B, i.e., the process of deciding on interactions, the system decides 'how the user can interact with the web objects' in the rendered web page. Following the execution of Process B, Process C may be initiated if the user wishes to associate a content or application that is available/ready for association/integration.

Process C—908—includes the step of establishing associations. In this process, based on the receipt of the user's selection of a visual element or a cluster of interrelated visual elements, the system may associate the user input with the selected visual element or cluster of interrelated visual elements by generating a database record that includes the contextual reference of the visual element or cluster of interrelated visual elements being interacted with. In this context, for each user input, a unique database record is generated, containing a locator field, a uniform cluster function identifier (UCFI) field, a content field, an author field, and/or any other field, etc. Contextual references may be recorded under the locator field and uniform cluster function identifier (UCFI) field. If interacted web object is a visual element, then the UVEI of the interacted visual element is recorded under the locator field, and the uniform cluster function identifier (UCFI) field remains empty—unless it is preferred to treat the interacted visual element as a cluster, i.e., a cluster that includes a single element; itself. If an interacted web object is a cluster of interrelated visual elements, then each of the UVEIs belonging to the interacted cluster may be recorded under the locator field, while extracted function of the interacted web object is recorded under the uniform cluster function identifier (UCFI) field. Finally, the content of the user input (e.g., general contents, or set of instructions for the system to execute, or both) and information about the author may be recorded under content field, and author field respectively. In some embodiments, extracted basic operational functions and basic roles of visual elements are also included in the database records of user inputs to be used as further references. In this context, both basic operational function/s and basic role of a visual element may be used as a secondary (supportive) reference for the establishment of an association, according to the embodiments.

In various embodiments, the primary reference used for establishing an association with a visual element is a UVEI, while the primary reference used for establishing an association with a cluster of interrelated visual elements is the extracted function of the cluster, i.e., the uniform cluster function identifier (UCFI), along with the UVEIs of the visual elements belonging to the cluster. According to other embodiments, uniform cluster function identifier (UCFI) may be used as the only reference for establishing an association with a cluster. For example, a cluster identified as a GUI having the primary function of being a 'video player' with the secondary functions identified as being a color corrector and a 2D to stereoscopic 3D convertor. On the other hand, the UVEIs of the visual elements belonging to the cluster may be used only as a reference for the adaptation process between the initial state of the cluster—i.e., the contextual and structural state of the cluster when the user input was associated with it—and the recent state of the cluster—i.e., the contextual and structural state of the cluster when the web resource that the cluster belongs to is re-visited/re-rendered. For example when the abovementioned GUI (video player) is re-visited; via i) constructing a reference that represents the initial state of the cluster based on the rUVEIs, ii) constructing a reference that represents the recent state of the cluster based on the nUVEIs, iii) comparing the constructed references to identify the differences between the states, and iv) considering a predefined set of adaptation rules; the system may identify the adaptation procedures, thus the system may not only identify an altered cluster that was previously interacted, but may also identify how to dynamically process/manipulate the most recent cluster, according to the embodiments.

In addition, hybrid referencing is also possible via using both the reference of a visual element and the reference of a cluster of interrelated visual elements simultaneously to establish an association, such as, referencing a GUI with a certain function (e.g., a video interface) that includes a particular content (e.g., a particular video, such as '2001: A Space Odyssey'). Last but not least, contextual reference of a cluster of interrelated visual elements—due to the very nature of contextuality—may be often a composite of multiple attributes, functions, roles, etc. For example, relative position or any feature of a web object may also be used as a part of the reference. In this context, the system may suggest different combinations of references to the user and/or allow users to compose custom references for establishing associations. Further, non-existent features at the initial state of an interacted web object may also be added to the reference. Furthermore, web objects that do not yet exist may be introduced to the system in advance and based on such references the system may be programmed for possible interactions that may occur in the future. Therefore, the presented referencing mechanism herein,—which is in principle solely based on contextual references and analogies—, provides an extremely wide variety of association possibilities. In this context, the scope of a reference may be broadened up or narrowed down via subtraction/addition of further contexts. Furthermore, via addition of specific information to references, such as fragment IDs of web resources, the references may be too narrowed down such that the analogue referencing mechanism described herein may act like a conventional referencing mechanism. In this context, the analogue referencing mechanism described herein is not an alternative to the conventional referencing mechanisms but a technological advancement that may also provide the solutions of conventional mechanism while enhancing the sustainability of established associations dramatically in extremely complex and harsh dynamic web environments.

Referring again to Process C: i) According to the embodiments a user input maybe received and associated with a visual element or a cluster of interrelated visual elements. Similarly, 'a visual element' or 'a cluster of interrelated visual elements' may also be associated with 'a visual element' or 'a cluster of interrelated visual elements' based on the same principles and methods that are applied for associating a user input with a web object. ii) Because each UVEI includes the relative position information of the corresponding visual element with respect to other visual elements, it may be possible for the system to construct a reference for the initial state of a cluster based on recorded UVEIs (rUVEIs). On the other hand, cluster information (CI) may also be utilized in this process and cluster information (CI) of each visual element of an interacted cluster may also be included in the database record of the corresponding user input if preferred, e.g., by adding a sub-field to the locator field of the database record structure 800 and storing thereto. iii) Once an association is identified between a user input and a cluster of interrelated visual elements, in order to compare the initial state of the cluster with the recent state, the system may construct a reference for the initial state of the cluster based on rUVEIs and construct a reference of the recent state of the cluster based on nUVEIs. The reference for the initial state may be constructed since a UVEI (i.e., a uniform visual element identifier generated based on analyses and interpretation of the visual element) include contextual information ready for executing the process of comparison since each UVEI includes distinctive information extracted based on analyses, such as distinctive information about content of the corresponding visual element. iv) Constructing the initial state or recent state of a cluster based on UVEIs is actually constructing a reference for each state for the process of comparison in order to identify the adaptation procedures to the recent state rather than constructing the actual clusters themselves, since a UVEI includes only distinctive information—identified via analyses—rather than the whole content in most of the cases.

As a result of Process C, i.e., the process of establishing associations, the system associates the user input with one or more web objects in the rendered web page. Following the execution of Process C, the process terminates.

Process D—910—is executed following the execution of Process A. Process D includes the step of identifying already established associations, i.e., identifying each association between existing user inputs and web objects and adapting to contextual/structural alterations of the web page content that may have occurred between the initial state and the recent state of each associated web object. In this process, based on the comparison of recently extracted contextual references, with previously recorded contextual references (e.g., utilizing analogies), the system identifies associations between web objects, i.e., visual elements or clusters of interrelated visual elements, and user inputs, i.e., user generated contents and/or applications. In this context, the system queries the database for records of user inputs that are associated with the web page and identifies each of them—if any. After the completion of the extraction of each reference of each visual element and each cluster of interrelated visual elements of the rendered web page in Process A, the system initiates the comparison process of recently extracted references with previously recorded references. For visual elements, the system compares each recorded uniform visual element identifier (rUVEI) with each recently generated uniform visual element identifier (nUVEI)—preferably between elements with similar properties in order to speed up the process. The system may also utilize the identified classes of visual elements, such as basic operational functions, subjective function types, etc., to optimize the process. For clusters of interrelated visual elements, the system compares each recorded 'uniform cluster function identifier' (rUCFI)—recorded under the cluster reference field of a user input—with each of the recently extracted uniform cluster function identifiers (nUCFIs). Next, for a corresponding or matching couple (rUCFI and nUCFI), if the user input is an application, then, based on the recorded uniform visual element identifiers (rUVEIs) the system constructs a representation of the initial state of the cluster (i.e. the contextual and structural representation of the interacted web object at the instant when the association with the corresponding user input is established for the first time) and compares it with the representation of the current state (i.e., the contextual and structural representation of the interacted web object at the instant when the association with the corresponding user input is re-established upon being subsequently rendered or viewed by another user) constructed based on the recently generated uniform visual element identifiers (nUVEIs) in order to identify a procedure to adapt the respective execution procedures of the associated application to the recent state according to a predefined set of adaptation rules. In this context, the system may identify a structurally altered cluster (e.g., a GUI) with a steady function, and the system may adapt itself to its recent structure within a contextually and structurally altered web page.

On the other hand, since the references (UVEIs and UCFIs) are collected/extracted/identified under different conditions they cannot be expected to match exactly for most of the cases. Therefore, the system evaluates the similitude levels of the references and decide whether there is a match. For example, the system may collect content fragments from visual elements that include media files, such as images, videos, audios, documents, etc.—by appropriate sampling procedures particularly selected according to the content properties such as media type, size, format, etc. of each visual element—and include the collected content fragments to the corresponding uniform visual element identifiers (UVEIs) as the distinctive information about content. In such a case, the system compares content fragments with each other according to their similarities, and for each compared pair of collected content fragments for UVEIs calculates the similarity rate—or resemblance rate—based on the similarity analysis. If similarity percentage of a pair of collected content fragments for UVEIs exceeds a predefined similarity threshold, then the system associates the pair of collected content fragments and therefore the corresponding nUVEIs and rUVEIs. Accordingly, various statistical similarity measures may be used as a base for similarity analysis of datasets and various algorithms may be preferred or developed depending on the type of content (e.g., image, audio, video, text, etc.) of elements. Further, semantic similarity comparison of UVEIs, UCFIs, and/or parts thereof may be based on advanced AI algorithms. For example, functional similarities of two clusters may be compared (e.g., comparing the 'social media post interfaces' of Facebook™ and Twitter™, which have functional similarities at a certain level). In this context, the system may identify both a contextually and structurally altered cluster (e.g., a GUI) with slightly altered functions in such a degree that comparing the recently extracted UCFIs (nUCFIs) with UCFIs stored in the database as recorded UCFIs (rUCFIs) may result in exceeding a predefined threshold of similarity (i.e., identifying functionally analogous clusters and matching them based on a predefined threshold of functional similarity), thus the system may associate a user input with the intended cluster and further may adapt itself to the recent state of the cluster both contextually and structurally—based on the comparison of the constructed representation of the initial state (via the corresponding rUVEIs) and constructed representation of the recent state (via the corresponding nUVEIs) and also according to the predefined set of adaptation rules.

The predefined set of adaptation rules is a library of operational rules that is set as regulatory for the system in the process of adapting itself to the most recent state of an interacted web object in order to execute the associated instructions conveyed through a user generated application that is programmed for the initial state, based on the comparison of initial and recent state representations that are constructed via the corresponding rUVEIs and nUVEIs. In essence, each adaptation rule is set in accordance with both the target web object (e.g., in accordance with its content, structure, role/function, etc.) and the instructions to be executed (i.e., the user generated application developed) to dynamically process/manipulate that web object. The adaptation rules of a user generated application in relation to the web object to be dynamically processed/manipulated by the application is set in the process I, i.e., the process of generating contents and developing applications. According to various embodiments, adaptation rules are set individually for each application in accordance with the web object to be dynamically processed/manipulated by the application. The process of adapting to a web object is significantly more complex and challenging for clusters of visual elements (e.g., GUIs) than that of singular visual elements. In this process, based on the extracted information in the processes A→B→C and A→D, the system identifies possible contextual and/or structural alteration scenarios of a web object to which a user generated application is associated. Next, in cooperation with the developer user the system semi-automatically determines each adaptation rule that corresponds to an identified alteration scenario. For example, in the case of integrating a functional thumbs down button to a social media post interface, the system determines N number of permutations of structural alterations and accordance with input from a user, determines the position of the thumbs down button and the counter for each permutation. In this process, the user may introduce the positioning condition to the system of the thumbs down button and counter set, i.e., the sub-cluster. An exemplary instruction may be: define 'thumbs up button and its counter' as sub-cluster A (i.e., the already existing sub-cluster in the GUI); define 'thumbs down button and its counter' as sub-cluster B (i.e., the sub-cluster to be integrated by the system); if possible, position sub-cluster B to the right of sub-cluster A as the first choice; or position sub-cluster B to the left of sub-cluster A as the second choice; else (i.e., if not possible) identify the most similar layout arrangement of the GUI among the N number of layout permutations previously determined and position sub-cluster B accordingly. It is important to note that for complex clusters with many elements and features, such as graphical user interfaces (e.g., a social media post interface), even without the addition of any further elements into, total number of permutations of structural alterations (e.g., alterations in the layout of a GUI without the addition or reduction of visual elements) may be relatively large. Furthermore, the total number of combinations of contextual alterations (e.g., addition of features or alteration of contents including a web image content of an auxiliary element such as a play/pause button icon) may be many, such as infinitely many. In this context, artificial intelligence algorithms may be further developed in accordance with the processes described herein in order to meet the operational needs.

Referring again to Process D: i) Adaptation rules that can be set may be infinitely many or less and may take shape individually or in groups according to each web object and each application to dynamically process/manipulate that web object. In this context, it is believed that the description—including the examples given—regarding the concept of 'setting and utilizing an adaptation rules library' fully enables implement of the systems and methods described herein without undue experimentation. ii) As shown in FIG. 9, for applications that are already associated with a web page and may be set to be executed directly, the system may bypass the step E—912—and directly execute the process G—916—for such applications. New applications selected in Process E may be processed in step D—before being executed in process G—in order to identify the corresponding adaptation rules of each. iii) Since a visual element may be technically considered as a single-element cluster, any process applied for a visual element cluster may also be applicable to a visual element, such as identifying UCFIs of visual elements and recording them as rUCFIs to be used as references, or setting up an interaction rule according to a user generated application that is associated with a visual element, etc.

As a result of Process D, i.e., identifying already established associations, the system identifies each web object associated with at least one user input—if any—and further adapts itself to the most recent state of the interacted web object/s, and thus the system may execute the associated applications properly in the rendered web page. Following the execution of Process D, Process E may be initiated.

Process E—912—includes the step of displaying metadata of associated user inputs in a web page. In this process, based on identified associations in the web page that the user is viewing and based on 'user specific' recommendations of the system, the system displays metadata of superimposed contents and apps (i.e., user inputs that are associated with web objects of the page) for user's selection. For superimposed contents and applications that are identified as available according to the recommendations, the system displays metadata in relation with the associated web objects through intelligent interfaces for the selection of the user. In this context, the system may sort available superimposed contents and applications according to their quality score, popularity, suitability, etc. and the highest-ranking ones may be displayed. Although the system may always display metadata of superimposed contents, as a special case for superimposed applications that have been previously associated/integrated, the system may automatically execute the applications without displaying any metadata and bypass this step in some examples.

As a result of Process E, i.e., displaying metadata of superimposed contents and apps, the system enables the user to select superimposed contents or applications to be display or executed based on the user specific recommendations of the system in the rendered web page. Following the execution of Process E, Process F—914—and/or Process G—916—may be initiated depending on, for example, the selection/s and/or instructions of the user.

Process F—914—includes the step of displaying superimposed contents. In this process, based on the user's selection of a preview of a superimposed content from a metadata list, the system displays the selected superimposed content through intelligent interfaces in relation with the web object that the superimposed content is associated with. The system may be controlled to avoid interference with the content and structure of the web page, and instead only display markers that indicate the existence of associated metadata of superimposed contents and smart interfaces that convey user generated contents if preferred or required by the user and/or system. Such content manipulation controls may be configured in the system based on global system wide settings, country wide settings, statewide settings, city wide settings, content provider level settings, website level settings, web page level settings, web page element level settings or any other granularity and/or criteria that selectively avoids interference with the content and structure of web pages. For example, the system may be set to allow interference with the content and structure for a first country, uniform resource locator (URL), or web page and may be set to prohibit such activity for another country, URL and/or web page. In other words, the system may be configured to selectively allow or not allow direct content integration in web pages in order to maintain and control any legal, ethical, and/or fair use conditions that may be desired or present. In this context, for example, users may be prohibited to replace a web page content with a user generated one including replacement of advertisements.

As a result of Process F, i.e., displaying superimposed contents, the system enables users to view a user generated content that is selected from a metadata list that is related to a web object in the rendered web page. Following the execution of Process F, Process H—918—may be initiated.

Process G—916—includes the step of executing superimposed applications. In this process, based on the adaptation procedures identified in Process D, which may be identified in order to adapt 'the respective execution procedures of each superimposed application that is developed for the initial state of corresponding element or element cluster' to the recent states of corresponding element or element cluster. Thus, the system may execute each superimposed application that is either selected from a metadata preview or already associated/integrated into the page by the user.

As a result of Process G, i.e., executing superimposed applications, the system may execute each selected user generated application that is developed to dynamically process/manipulate the associated web object by adapting it to the recent state and enables the user to interact with it. Following the execution of Process G, Process H may be initiated.

Process H—918—includes the step of enabling interactions with/through superimposed contents and applications. In this process, the system enables the user to connect and interact with other users through the superimposed contents and applications that act as network links. For example, the user may interact with other users through commenting interfaces integrated with superimposed contents—similar to that of social media posts—and further may communicate with other users independently, for example, via private messengers operating on a peer-to-peer (P2P) basis. In this context, the system provides users with the ability to create a webwide social network upon web resources through superimposed contents and applications, thus providing a boundless and versatile social networking alternative (i.e., superimposed networking) to conventional social networking platforms, such as Facebook™, Twitter™, Instagram™, etc. Furthermore, Process H may enable advanced interactions with superimposed contents and applications, such as enabling users to associate user generated contents and applications with the superimposed contents and applications via utilizing the algorithms described herein—if needed—and/or other external applications and/or algorithms.

As a result of Process H, i.e., enabling further interactions with/through superimposed contents and applications, the system enables the user to connect and interact with other users and furthermore enables the user to interact with the superimposed contents and applications via associating user generated contents and applications with them in a rendered web page.

Process I—920—includes the step of generating contents and developing applications. In this process, the system enables the user to generate contents and develop applications to be associated with web objects. In the process of generating contents, the system provides the user with tools to create, arrange, and edit texts, images, videos, audios, documents, etc. that may be separate and distinct from a web page and/or may be included in a web page. The tools to create, arrange, and edit texts, images, videos, audios, documents, etc., may be conventional processes, such as being similar to that of generating social media posts. In the process of developing applications, the system provides a set of tools and frameworks (e.g., a superimposed software development framework) in order to assist the user—who may be an expert web developer or a non-expert layman—to develop applications that dynamically process/manipulate visual elements and/or clusters of interrelated visual elements. In this context, based on the user's expertise level in programming, and also for example, his/her occupation, socio-economic class, fields of interest, etc. the system shares application examples—if any—according to the web objects that the user wishes to process/manipulate, and further assist him/her in the development process. Further, the system utilizes algorithms of explainable AI to help the user to understand and interpret the decisions or predictions made by the system. Thus, the user may debug and improve application performance. Furthermore, the system may utilize hybrid intelligence workflow patterns for the co-creation, deployment, and adoption. Thus, users' engagement, willingness to adopt and willingness to co-create may be increased. Furthermore, utilizing hybrid intelligence, the system in collaboration with the user sets the adaptation rules individually for each application developed in accordance with the web object to be processed/manipulated by the application—as elaborated in Process D.

Referring again to Process I: The superimposed software development framework (SSDF) is a platform provided by the system in order to facilitate the development of superimposed software applications. SSDF may leverage capabilities of the system (i.e., all operations performed based on the processes 902, 904, 906, 908, 910, 912, 914, 916, 918, etc.) such as the interpretations of web objects based on analyzing, classifying, clustering, analogue referencing, etc. In principle SSDF utilizes both the interpretations of the system such as UVEIs, BOFs, SFTs, Cis, UCFIs, and rule libraries such as system-defined interaction rules, in order to identify programming options for each identified visual element and/or cluster of interrelated visual elements in a web page. In this context, one of the interesting features of the SSDF is 'contextual programing' which emerges based on the above-mentioned facilities provided by the system. Contextual programing is a high-level programing approach which may enable both expert and non-expert (layman) users to develop user generated applications that process/manipulate web objects. Alternatively, or in addition, such user generated applications may be retrieved from an applications library of pre-stored user generated applications. Such an applications library may be for access by a particular user, a group of users, and/or all users. Automated programming by the system of such user generated applications may include AI (artificial intelligence) algorithm-based population, by the system, of the user generated applications with webpage specific information obtained by the system's interpretation of web objects and based on analyzing, classifying, clustering, analogue referencing, etc. For example, SSDF may recommend the user to adapt from the application library and/or develop an application for a particular GUI (e.g., a video player interface, a social media post interface, etc.) regardless of any web source and may automatically adapt the developed application for any web resource that includes similar GUIs that are within the proximity of a certain resemblance rate that is set by, for example, the system, or the user, or the system and the user collaboratively together. Thus, the system may customize a developed application for a particular web page the user wishes to associate with the developed application according to the interpretation, by the system, of the web objects of the particular web page based on AI, where the AI is further trained by the collaborative interaction of the user with the system during adaptation/development of the developed application for the particular web page. Alternatively, or in addition, the user may introduce to the system the function/s of a previously unidentified cluster (e.g., a table with certain functions) and the system/user may develop and/or adapt an application/program that process and manipulate similar clusters. Further, SSDF may use previously developed user generated application(s) from the library as samples/examples to identify and recommend programing possibilities to the users by utilizing AI algorithms (such as machine learning algorithms) that may be specially developed for this purpose and further refined/taught based on the user interaction with the system. Furthermore, SSDF may record each corresponding development and deployment process of user generated applications—that are developed in SSDF—to accumulate a big data of software development and deployment processes and may process the big data by specially designed advanced AI algorithms to extract information for conceptualization of software development ideas. Moreover, the system may automatically adapt such developed and associated applications according to changes in web pages as discussed herein.

As a result of Process I, i.e., generating contents and developing applications, the system enables the user—even if he/she is a layman—to develop web-based applications that dynamically process/manipulate web objects,—thus enable the user to become a service provider—while providing a conventional tool for generating contents.

The processes A, B, and D may be re-executed only if the rendered web page is subsequently rendered. However, the processes C, E, F, G, and H may be selectively re-executed according to the demands of the user while the user is browsing the rendered web page—without any subsequent renderings. For example, the user may wish to develop an app and may wish to associate the app with a web object. Thus Process I and Process C may be re-executed. Or the user may wish to select, display, and execute other user inputs from various metadata lists that are associated with various web objects. Thus, Process E, Process F, Process G, and Process H may be re-executed. The process 900 may terminate when the browsing of the rendered web page is finalized, according to the embodiments.

By and large, as a result of the steps A and B, the system may control web objects to be interacted with via i) determining 'what exactly the objects of web resources are' at a contextual level, and ii) deciding 'how users may interact with them' according to system-defined interaction rules, and thus, the system ensures the stability of interactions. As a result of the steps C and D, the system iii) establishes associations and maintains the established associations despite alterations in web resources and further iv) adapts itself to the most recent states, and thus, ensures the sustainability of interactions. Consequently, based on the steps A→B→C and A→D→E→F→H, or A→D→G→H, or A→D→E→D→G→H the system ensures the consistency and persistency of interactions in any web environment within any scenario, in real-time, in a self-contained manner while enabling users to select, display, execute, and interact with associated/integrated contents/apps and also to interact with each other through them.

Figure 10:
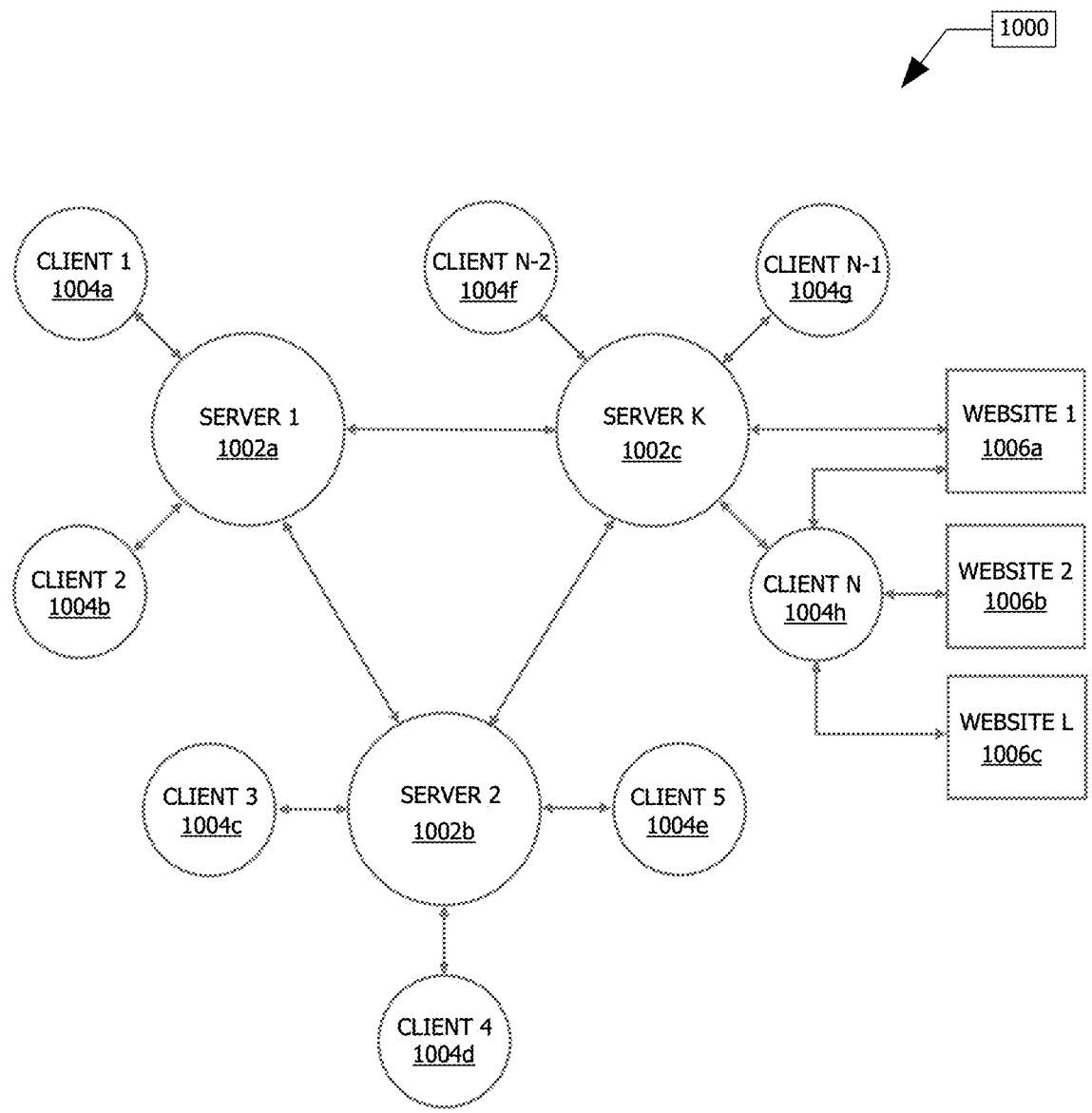
FIG. 10 is a high-level architecture of an exemplary system consisting of multiple servers deployed in various locations, according to an embodiment.

FIG. 10 is a high-level architecture of an exemplary web resource interaction system 1000 consisting of multiple servers 1002 deployed in various locations working in sync with each other (for example, in an administratively decentralized federative structure), according to an embodiment. In this configuration 3 of the K number of servers (1002a, 1002b and 1002c) and 8 of the N number of clients (1004a, 1004b, 1004c, 1004d, 1004e, 1004f, 1004g and 1004h) are shown. Client N (1004h) is shown connected to 3 arbitrary websites (1006a, 1006b and 1006c) and Server K (1002c) is also shown directly connected to the arbitrary website 1006a. At least one client-side application is integrated with the corresponding web browser of each client and executed—along with the web browser—autonomously or in coordination with the server 1002 according to, or depending on, the operation. A server-side application may be executed by an application server in coordination with a database server and a web server. In essence, aside from being an intermediary for interaction, the primary task of a client N may be interaction control, i.e., analyzing and interpreting web objects contextually and deciding on interactions according to system-defined interaction rules, thus ensuring stability. On the other hand, a primary task of a server is to provide a database and to perform database related operations in coordination with the clients connected. In this context, at each viewing/rendering of a web page, Client N (1004h) autonomously processes: i) analyzing, classifying, and clustering web objects of the rendered portions of the web page; ii) deciding on interactions of the rendered portions of the web page; and iii) assisting users—if requested—in the process of generating their own contents and/or developing their own applications to be associated/integrated with the web objects of the page. On the other hand, Server K (1002c) and/or Client N (1004h) collectively process: i) establishing associations with web objects; ii) identifying already established associations with web objects; iii) displaying metadata of established associations of web objects; iv) displaying superimposed contents according to the associations; and v) executing superimposed applications including adapting the superimposed applications in accordance with the contextual and structural alterations of the web page/web resources. In this configuration data exchange between the system and the website servers may be, for example, provided primarily through the clients (shown with the network connections 1004h to 1006a, 1006b and 1006c). In other words, a server may not be directly connected and/or in direct communication with web resources, instead, access and data exchange may be provided through the clients. This may minimize the system load—particularly data processing load—on the server side and could be inevitably essential for all personalized and restricted web resources such as adaptive web pages or individualized social media webpages. Even so, the server may also scan or otherwise communicate directly with the web resources (shown with the network connection 1002c to 1006a), such as for preliminary analyses, or for allocating system load in a preferred proportion between the client side and server-side, where it is applicable, according to the embodiment.

Additional elaborations with regard to the terms, definitions, abbreviations, embodiments, and implementations are as follows:

To elaborate further on the process of filtering: The web resource interaction system may filter and/or group visual elements for interaction, and similarly, may filter and/or group visual elements in order to disable such visual elements from interaction, wherein filtering may be based on identification of each visual element according to their roles and/functions, and identification of each cluster of interrelated visual elements including the role/function of each cluster. To elaborate on the technical purpose of this feature; Web pages may contain hundreds of visual elements with thousands of combinations of them, and in case of an infinite scrolling web page, there can be infinitely many visual elements and infinitely many combinations. In addition, even the content and structure of static web pages may change over time, and a significant portion of visual elements or visual element clusters may be altered. Moreover, these alterations may happen very often and radically in dynamic web pages. As a result, manual selection of visual elements for interaction, i.e. enabling interaction without any automated filtering and grouping mechanism, involves several technical disadvantages such as: i) creating an unsteady system that is extremely prone to loss of associations by the alterations of web pages; ii) creating an unsteady system, where users (human or machine) may make erroneous selections during the selection process of visual elements and/or visual element clusters that they may associate their user inputs with (e.g. associating user inputs with irrelevant elements such as, search fields, containers, buttons, scrollbars, or combinations thereof etc.); iii) creating a vulnerable system, where users (human or machine) may create superfluous associations with random, irrelevant visual elements, e.g. by increasing the data processing and storage load of the system. In addition, enforcing users (human or machine) to interact with content of web resources according to roles and/or features and/or functions, etc. may be a requirement depending on the type of implementation. For example, there may be need to focus on contextual information or subject matter of web pages (e.g., news items, articles, comments, link previews, videos, social media posts, etc.). Alternatively, or in addition, there may be need to associate software applications that are stored and executed by the system with visual elements and/or with clusters of interrelated visual elements with certain functions such as, being a social media post interface, or a video player interface, etc., where the applications are executed within the defined cluster of interrelated visual elements according to particular procedures coded correspondingly. In general, the benefit of interacting with temporary ads or other extraneous content, or with elements of user interfaces, such as search fields, buttons, scrollbars, icons, containers, etc., may be questionable as well. Consequently, identifying and filtering particular visual elements for interaction, and/or identifying and clustering interrelated visual elements may be a necessity in terms of applicability, effectivity, and feasibility.

To elaborate on the subject of interacting with link previews of web pages: Link previews are hyperlinks with a preview. The preview may be textual and/or visual, and/or audial content including metadata about the linked web page. They can be permanent or temporal on a web page. They are mostly used in web pages through dynamic visual elements to alternately present available content of the website or used in the search engine result lists. According to the embodiments of the system, interacting with link previews is also an option,—if preferred so. According to the process 400, when a user input is associated with a visual element, it may also be associated with the hyperlink associated with the visual element—if any—, and accordingly the user input becomes associated with the link location besides the visual element. Further, according to the process 200, for each rendered web page, the database is queried to determine whether the hyperlinks detected in the web page are links of interacted web pages or not. Furthermore, since a link preview is a visual element and/or cluster of visual elements possessing informative and navigational features with certain attributions, link previews may also be identified by utilizing the process 300. In general, any visual element or cluster of visual elements with identifiable features,—such as link previews—, may be identified by utilizing the process 300. In one embodiment, link previews—which are classified/categorized as main or side content according to their roles in a web page—are also identified and disabled for interaction, while any link preview—including search engine results—, that belongs to an interacted web page is determined and marked with one or more input markers (IM) according to the types of associated user inputs. Thus, through the input markers (IM), metadata of all associated user inputs of the previewed web page (except software apps that are integrated with the page) may be reached by users without leaving the rendered web page. In one embodiment this feature is used as a signalization mechanism for identifying and marking the link previews of web pages with special conditions such as, containing fake and doctored news. In this regard, once a web page is flagged by a particular user input, then the link previews of the web page may also be flagged by the system to indicate the condition throughout the data network (e.g., via marking social media posts, search engine result lists, web pages, etc. containing link previews).

To elaborate on the content deletion of websites: For the cases where a user input cannot be associated with any object of a web resource (e.g., due to deletion of the content) a dedicated web page may be created. Moreover, a unique, dedicated web page with a persistent resource identifier (e.g., URL) may be created for each user input, for all cases. Thus, user inputs survive even if the website, web page or content that the user input was associated with is deleted. In this context, all user inputs of a system user may be presented in chronological order and/or according to topic headings on the system user's web page in a manner reachable by other system users, together with links to the web pages with which they are associated.

To elaborate on the usage of APIs: The system is designed to provide an autonomous infrastructure that does not need integration APIs provided by websites. However, the system may provide its own APIs developed to communicate with 'machine users' (i.e., other computer systems), thereby enabling them to have the capabilities available to 'human users' and beyond.

To elaborate further on the definitions of some of the terms and abbreviations that are used in this subject matter: i) 'User generated contents' and 'user generated software applications' are 'user content inputs into the system' referred to as 'user content input' or briefly as 'user input'. 'User content input' and 'user input' are terms that have the same meaning and used interchangeably in the specification, drawings, etc., unless indicated otherwise. User inputs, i.e., user content inputs, are user generated contents or user generated software applications that are associated—or generated/developed to be associated—with singular web objects and/or meaningful clusters of singular web objects. ii) A 'singular web object' corresponds to a 'visual element', a 'meaningful cluster of singular web objects' corresponds to a 'cluster of interrelated visual elements' and a 'web object' corresponds to either a 'singular web object' or a 'meaningful cluster of singular web objects'. An 'object' is a 'web object' and used interchangeably in the specification, drawings, etc., unless indicated otherwise. iii) 'Input metadata' or 'IMD' is metadata of the corresponding user input. iv) Input marker or 'IM' is a visual/audial indicator that indicates the presence of one or more user inputs that are associated with the corresponding visual element or cluster of visual elements. v) The term 'context' is used in the meaning of 'the interrelated conditions in which something exists or occurs' (Ref: Merriam-Webster dictionary). In this regard, the term 'contextual' is used in the meaning of 'about context', but also in the meaning of 'content wise', 'related to content', etc. vi) The terms: 'identifying', 'determining', 'extracting', 'detecting', etc. have been used in a similar sense and may be used interchangeably unless indicated otherwise. vii) An 'interacted visual element' or 'previously interacted visual element' is a 'visual element that is associated with one or more user input'. viii) The general interaction cycle may also be exemplified as such: Web pages share contents to be conveyed to users, then users may react to these contents via user inputs, then the interacted web pages themselves may—automatically or manually—react to these user inputs either via/through user inputs or the web page itself and so forth. ix) The term 'analogy' is used in the meaning of 'a correspondence or partial similarity' or 'a comparison between one thing and another'. The term 'analogue' is used in the meaning of 'a thing seen as comparable to another'. Note: A 'user input' should not be confused with web page activity such as detecting a pointing device input on a visual element field, clicking a button with the pointing device, operating a pull-down menu, and/or other operations by a user on a rendered web page and/or visual element that do not involve user generated input. On the other hand, said web page activity or any kind of user activity—including interpretations of physical activity, such as sentiment analysis of users—may also be collected, encapsulated, and superimposed as a user generated content, and even used as data inputs in a user generated application. Furthermore, in principle, any kind of input, such as live camera streams or signal outputs of industrial sensors, may be used to generate user generated contents or used as data inputs and/or references for user generated software applications.

According to various embodiments, the system comprises the following processes: i) analyzing a rendered web page being viewed by a user; ii) identifying visual elements in the web page; generating, for each of the identified visual elements, uniform visual element identifiers (UVEIs), each of the UVEIs uniquely identifying a corresponding one of the identified visual elements; associating, with each of the UVEIs, information regarding the web page, distinctive information and/or properties of content of the corresponding one of the visual elements, and a relative position of the corresponding one of the visual elements in the web page; iii) classifying each of the visual elements into one of a plurality of predetermined classes; identifying, for each of the visual elements, cluster information to interrelate the visual elements within the web page, the cluster information identified for each of the visual elements based on respective relative position of the visual elements, respective functional relationships of the visual elements with other visual elements, or both; iv) identifying, for each of the clusters of interrelated visual elements, function/s within the web page, and generating, for each of the clusters of interrelated visual elements, uniform cluster function identifiers (UCFIs), each of the UCFIs including a corresponding one of the function/s of clusters of interrelated visual elements; v) deciding on the visual elements and clusters of interrelated visual elements to identify those of the visual elements and clusters of interrelated visual elements suitable for user interaction, the decision is based on a set of predefined interaction rules comprising the cluster information and the classification of visual elements and the uniform cluster function identifiers (UCFIs) of clusters of interrelated visual elements; vi) receiving the user's selection of one of the visual elements or clusters of interrelated visual elements among the available ones for interaction; vi) assisting the user to develop an application that dynamically process and/or manipulate the selected visual element or cluster of interrelated visual elements; setting adaptation rules in coordination with the user for the user generated application according to the corresponding visual element or cluster of interrelated visual elements that the user generated application is to be associated with; viii) receiving an input representative of a user interaction with one of the visual elements or clusters of interrelated visual elements available for user interaction; ix) storing the user interaction with the one of the visual elements as user input in association with the one of the UVEIs; or, storing the user interaction with the one of the clusters of interrelated visual elements as user input in association with the corresponding set of the UVEIs that belong to the cluster and recording the corresponding UCFI of the cluster and/or recording for each of the UVEIs that belong to the cluster the corresponding one of the identified classes and cluster information; x) re-analyzing the rendered web page being viewed by another user and/or when the web page is subsequently rendered; xi) re-identifying the visual elements in the web page; generating, for each of the identified visual elements, new uniform visual identifiers (nUVEIs), each of the nUVEIs uniquely identifying a corresponding one of the identified visual elements; associating, with each of the nUVEIs, information regarding the web page, distinctive information and/or properties of content of the corresponding one of the visual elements, and a relative position of the corresponding one of the visual elements in the web page; xii) re-classifying each of the visual elements into one of a plurality of predetermined classes; re-identifying, for each of the visual elements, cluster information to interrelate the visual elements within the web page, the cluster information identified for each of the visual elements based on respective relative position of the visual elements, respective functional relationships of the visual elements with other visual elements, or both; xiii) re-identifying, for each of the clusters of interrelated visual elements, function/s within the web page, and generating, for each of the clusters of interrelated visual elements, new uniform cluster function identifiers (nUCFIs), each of the nUCFIs including a corresponding one of the function/s of clusters of interrelated visual elements; xlv) comparing the nUVEIs with UVEIs stored in a database as recorded UVEIs (rUVEIs) and associating the nUVEIs with the rUVEIs based on a predefined threshold of similarity; and/or comparing the nUCFIs with UCFIs stored in a database as recorded UCFIs (rUCFIs) and associating the nUCFIs with the rUCFIs based on a predefined threshold of similarity, thus re-establishing a previously established association between a user input and a visual element or a cluster of interrelated visual elements; and xv) constructing based on rUVEIs the initial state representation and based on nUVEIs the recent state representation of each cluster of interrelated visual elements that is associated with one or more user generated application; and comparing the initial state representation with the recent state representation to identify contextual and structural differences—if any—between the states of each associated cluster of interrelated visual elements; and identifying a procedure to adapt the respective execution procedures to the most recent state of each associated cluster of interrelated visual elements according to the identified contextual and structural differences—if any—and a predefined set of adaptation rules defined for each corresponding user generated application and associated cluster pair; according to the embodiments.

Examples of Possible Industrial Implementations

The system described herein may enable an AI based infrastructure with the ability to control users' interaction autonomously and automatically with web resources and the capability to adapt to complex alterations of interacted web resources in real-time on a contextual basis in order to provide a stable and sustainable interaction environment, where users (human or machine) may gain utmost interaction ability on web resources. Further, the system may inherently provide a basis for users to interact with each other through associated/integrated contents and features (i.e., superimposed contents and applications) thus may pave the way for web-wide social networking without borders. Further, the system may provide a software framework that guides users—including laymen—to develop apps that dynamically process/manipulate objects of web resources, thus may pave the way for the development of an enormous variety of unprecedented sub-systems created by masses (e.g., novel systems for improvement of services, integration of websites, evaluation of information, data mining, social networking, entertainment, etc.). Further, besides the semantics of contents, the system also focuses on revealing the semantics of structures in-depth, which is precisely identifying the role/function of each object and each cluster of objects of web resources, thus the system may pave the way for deciphering the full semantics of the entire Web not only as an environment of documents but also as an environment of complex and variable interfaces. Also, because the embodiments provide a fully controlled interaction environment, the system may automatically collect complete data/information for each interaction process within the system (e.g., complete data/information about each software development and deployment process including the processes by which users interact with these apps), thus may pave the way for the accumulation of big data of comprehensive processes. Furthermore, the system may utilize the collected big data of comprehensive processes and artificial intelligence for creating and conceptualizing content and application ideas by itself.

Regarding, social, economic, and scientific impact: Employing such a system/tool based on the technology described herein, users may gain utmost interaction ability on any web page, thereby the Web may be liberalized to a tremendous degree. And because interaction is the key to evolution, such a system/tool may eventually pave the way for the evolution of information and services on the Web, while corroding the monopoly power of major websites and social media networks by extending the borders of interaction far beyond their scope. A totally new industry may thus be formed within the users' initiative that is capable of creating radical solutions right on the spot for improvement of services, integration of websites, evaluation of information, social networking, etc., which may revolutionize the internet as we know it today both socially and economically. Moreover, employing this system/tool may influence various science & technology fields with the idiosyncratic 'big data' that it may collect and accumulate, while creating a new field of scientific research about a novel communication paradigm (i.e., Superimposed Communication) which may be expanded even beyond the boundaries of the web and the Internet.

Regarding, potential of future commercialization: The ultimate goal may be to provide a universal infrastructure and framework for both individual and corporate enterprises who may develop and deploy their own applications to provide services within the scope of said interaction possibilities. As a business model this may be similar to an AIP (Application Infrastructure Provider) which provides the computing and operational infrastructure for developing, deploying, and managing enterprise class applications. In this regard, the infrastructure envisioned to be provided may pave the way for the supply of a vast variety of services, e.g., for improvement of services, integration of websites, evaluation of information, data mining, social networking, entertainment, etc.

Example Case for Evaluation of Information: The Wikipedia™ website provides an internal evaluation mechanism by which wiki users may evaluate any bit of information e.g., a word, a sentence, a paragraph, a picture, a video, an audio, etc., of a wiki article right on the spot, by marking, linking, reporting, annotating, opening up a discussion, offering an alternative etc. In this context, Wikipedia™ may develop and deploy its own 'Superimposed Wikipedia App' through the infrastructure to be provided in order to extend this particular service webwide and enable wiki users to evaluate any information on any web page right on the spot. Similarly, fact checking organizations like BBC, AFP, Le Monde™, etc. may develop and deploy their own 'Fact Checking Superimposed Apps' through the infrastructure to be provided for automatically detecting suspicious news items anywhere on the web (e.g., detecting their source pages, circulating link previews, quotations, etc.) and automatically flagging wherever they appear, including highlighting the disputable fragments and opening them up for public discussion and expert evaluation right on the spot. Similarly, a superimposed application for criticism may be developed and system users may criticize all kinds of information existing/circulating at the web via superimposed critical posts whose scoring and ranking may be based on quality, e.g., critical thinking, rather than on quantity, e.g., popularity. In such a mechanism, 'critical thinking' may be defined as an 'intellectually disciplined process of actively and skillfully conceptualizing, applying, analyzing, synthesizing, and/or evaluating information gathered from, or generated by, observation, experience, reflection, reasoning, or communication, as a guide to belief and action.' In this context, publishers may be expected to create posts conforming to the critical thinking criteria where they support analytical, positive, or negative criticism by concrete evidence. Such a mechanism may also contribute greatly to the dissemination of critical intelligence and skepticism. Uncensored analytical criticism directly at the very source may reduce social/massive reaction time and increase the quality feedback, thus enhancing overall intelligence.

Example Case for Social Networking: Social network platforms, such as Facebook™, enables users to create and publish their own interactive posts. A post appears on the authors Facebook page, while circulating on the news feed of other users' Facebook pages. In this context, Facebook™ may develop and deploy its own 'Superimposed Facebook App' through the infrastructure to be provided in order to extend this particular service web wide and enable Facebook users to publish interactive posts in relation to any information on any web page right on the spot. For example, a Facebook user may initiate a discussion on an article of the constitution on the website of the Supreme Court of the United States or criticize a portion of a political article by a world-renowned columnist published on the website of Die Welt™. Further, users may interact and socialize with each other through these posts thus they may build a web-wide social network without borders. Similarly, any other social networking website like Twitter™, Instagram™, Reddit™, etc. or any online video platform like YouTube™, Vimeo™, Dailymotion™, etc., may develop and deploy its own 'Superimposed App' through the infrastructure provided by the system. Social networking websites may extend services web wide and enable their users to become publishers and/or broadcasters anywhere on the Web right on the spot.

Example Case for Improvement of Services: Enterprise service provider ESPA™ develops browser extensions, plugins, addons and various other applications for improvement of services and integration of websites. For some cases ESPA™ utilizes integration codes—such as APIs—provided by the websites. However, for most of the cases ESPA™ cannot utilize such codes since either they do not meet the needs, or they do not exist. In such cases experts of ESPA™ manually interpret each target web page to be processed/manipulated and develop tailored apps in order to provide the targeted services. In the ongoing process, whenever a serviced web page is altered contextually and/or structurally, a maintenance expert manually interprets the alterations of that page and adapts the corresponding app/s according to the alterations. Because of all these inadequacies, ESPA™ is able to offer only relatively simple apps with limited competence. However, ESPA™ may develop, deploy, and manage any application through the infrastructure to be provided in order to semi-automatically develop and automatically deploy said apps and automatically maintain the services that they provide, without the need of an integration API. Further, by the competencies gained including the contextual adaptation ability with the automation provided by the infrastructure, ESPA™ may expand the scope of the services and develop much more competent applications. Besides, instead of tailored apps that are designed particularly for target web pages, ESPA™ may develop smart apps that are designed to fit similar websites contextually. For example, ESPA™ may develop a 'one size fits all' application package for online video platforms (e.g., YouTube™, Vimeo™, Dailymotion™, etc.) such that the pack comprises an app that processes/manipulates video player interfaces for improvement of their features (e.g., by associating/integrating an effects filter, a 2D to 3D convertor, a video editor for creating and sharing audio-visual commentaries, a star rating system for evaluating video content, etc.) including visually modifying the interfaces by associating/integrating virtual controls (e.g., adding control buttons, displays, etc.), and another app that processes/manipulates link previews of recommended videos (e.g., for displaying star ratings of corresponding videos). Moreover, ESPA™ may introduce non-generic dynamic interfaces such as lists, tables, forms, etc. to the system according to their roles/functions. Thus, ESPA™ may develop and deploy particular apps that process/manipulate and/or utilize system-defined unique interfaces for improvement of services and/or integration of websites. For example, ESPA™ may develop an application that automatically collects data from bus, railway, and airline websites to provide users with better route alternatives (e.g., the cheapest or the fastest route combination) without the need for any manual or semi-automatic maintenance against any kind of alterations made by said websites. Further, ESPA™ may share these alternatives directly on said websites instead of presenting them on an external website, and even may create a second-hand online ticket market upon them for users who want to sell/buy already purchased tickets.

Example Case for Industrial Processes: Boeing Corporation utilizes various automation tools for various processes such as tools for Supervisory Control and Data Acquisition (SCADA), Manufacturing Resource Planning (MRP-II), Enterprise Resource Planning (ERP), etc. Most of these tools are centralized and server-based computing systems, accordingly, some of them are web-based technologies. In this context, Boeing may deploy the system for its own intranet and make the system work on web-based automation systems, thus may enable employees to associate/integrate contents and features within certain limitations in accordance with these systems and corresponding processes. For example, both blue-collar and white-collar employees—such as manual workers, technicians, engineers, researchers, etc.—from various fields and units can be encouraged to review, criticize, and improve functions of the corresponding automation systems in accordance with their field of expertise—within certain limits. For example, a technician—such as an aircraft structures technician working in the fuselage construction process—may criticize a certain function of the automation system that operates in her field of duty—such as a poorly designed interface of an MRP-II or SCADA system. And in response to that criticism, a colleague of hers—such as an aerospace engineer working in the same process—may develop and deploy an app that improves the interface in the context of that criticism. Thus, employees may autonomously contribute to the improvement and optimization of the processes by developing and deploying sub-systems that are virtually integrated into the automation systems, without any direct interference and completely independent of software developers. In the long run, accepted and useful applications can be permanently embedded in the system by the software developers. In addition, for industrial processes, strict limits may be set accordingly, so that interactions do not put production processes at risk.

Example Case for E-commerce: Individual entrepreneurs and software developers Ayse and Levent may develop, deploy, and manage an app that provides a superimposed e-commerce network on web resources. For example, via the app, posts that includes goods or services in accordance with the context of web pages and/or web objects may be published, such as by e-commerce websites or local businesses. For example, a post may be published in relation with a service presented in corporate websites (e.g., IBM™, Microsoft™, Google™, etc.), or in relation with a product existing in major e-commerce websites (e.g., Amazon.com, Alibaba.com, Walmart.com, etc.). Thus, small, and medium scale service providers or e-commerce enterprises including local businesses may compete against large scale major/global corporations virtually through the superimposed e-commerce network provided by this system. Further, system users themselves may become sellers of goods and providers of services anywhere on the web. For example, a local micro business or an individual seller may offer the advantage of possessing a niche product or proposing a niche service or offering a fast & free delivery option—which can be unbeatable when compared to the base e-commerce website (e.g., Amazon.com), thus, the target user may prefer the local business or individual seller. In general, a superimposed e-commerce network may pave the way for fair competition of the small to medium scale enterprises against large scale e-commerce websites worldwide. Also, services regarding e-commerce websites that are provided by independent websites (e.g., fake review analyzing engines/services) may be integrated by the app to the target websites. Thus, Ayse and Levent may create a superimposed e-commerce platform serving to Web users all over the world.

Example Case for Entertainment; Individual entrepreneurs and software developers Lea and Deniz may develop, deploy, and manage an app that provides a superimposed entertainment platform, by which both an infrastructure for superimposed games may be provided and a superimposed network that is fully devoted to entertainment may be set up. For example, objects of web pages that contain images may be transformed into virtual graffiti fields through the app so that network users may process/manipulate images if they wish so. Or more interestingly, various intelligent superimposed video games may be designed and developed based on the system's interpretation of web objects of web resources, such as an animated character, e.g., Pac-Man™, may digest the ASCII characters of a governmental site within the context of a proposed law while strolling on the web pages and the player (e.g., a government officer, a government sympathizer, etc.) may try to recover the digested ASCII characters. Thus, Lea and Deniz may create a superimposed gaming platform serving Web users all over the world.

Some of the benefits of the system with regard to the World Wide Web: i) Administrative restrictions including moderation and censorship, membership requirements, technical/structural limitations, etc. may be fully eliminated; ii) The whole Web may function as a global social networking platform; iii) Any field of a web page may be modified in order to improve the services including improvement of limited features; iv) Websites may be virtually integrated including the rival ones; v) A global signalization mechanism throughout the Web may be created, where existing or circulating Web content may be automatically marked and flagged to indicate the presence of a remarkable condition such as fake, doctored news wherever they appear. This mechanism may be used to fight against disinformation such as fabricated news or fake reviews; vi) Posts, comments, reviews, or any kind of user generated content may be gathered up, on a single, integrated platform and this platform may archive and/or present user generated contents in association with their publishers, instead of disassociated posts/comments on different websites; vii) The noticeability of users who provide content on the Web may be greatly enhanced. For example, an able critic may get noticed by millions—at the very source of the subject matter or information—by adding her own article on top of the article of a popular columnist in a global news website, e.g., New York Times™, Le Monde™, etc. If liked, the user may gain followers and may be able to expand worldwide through her own superimposed network.

To elaborate on the ethical, legal, and fair use issues that may occur with regard to implementations of the system: In essence, the methods and systems described herein provides the technological infrastructure for constructing an AI-based web infrastructure for superimposed communication that allows users to develop and deploy any application which may be parallel to the capabilities of the system. In this context, due to the extreme versatility and capability of the system, some user generated applications may exceed the laws of the regions in which they are applied. To address any ethical and legal problem that may arise on behalf of the infrastructure provider, the infrastructure to be provided—based on the system described herein—may administratively operate similarly to an 'application infrastructure provider' (AIP). In this context, the infrastructure acts as an intermediary only (similar to that of web hosting or cloud service providers), where all responsibility regarding services provided through the infrastructure may be on developers/service providers both legally and ethically. Accordingly, all kinds of violations and their consequences including legal sanctions may solely bind the developers/service providers. Nevertheless, the infrastructure provider may impose restrictions in order to regulate the services to be provided by developers/service providers within the scope of regional laws and universal ethics including ethics in AI.

In summary, the current disclosure provides an adaptive web resource interaction system based on analogue referencing, which includes a computer implemented method, a computer system, and a non-transitory computer readable medium to provide an autonomous infrastructure that enables an automatically controlled interaction environment on web resources for both human and machine users, where the system dynamically adapts itself to contextual and/or structural alterations of each interacted web resource according to each rendering of a client individually. Thus, within the scope of any data network including the Internet, the system provides an infrastructure that ensures the consistency (i.e., stability) and persistency (i.e., sustainability) of interactions, where human and machine users may interact with web resources by associating/integrating—and/or reaching to—virtually any kind of user input including user generated software applications—stored and executed by the system—that dynamically process/manipulate web objects, and interact with those user inputs or with each other through those user inputs that act as network links. The current disclosure therefore offers a procreative communication technology by which an unlimited number of sub-technologies and sub-implementations may emerge.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects (of any kind), and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively, or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method comprising:
analyzing a web page rendered for a user to identify visual elements in the web page;
generating, for each of the identified visual elements, uniform visual element identifiers (UVEIs), each of the UVEIs uniquely identifying a corresponding one of the identified visual elements;
associating, with each of the UVEIs, at least one of: information regarding the web page, distinctive information of the corresponding one of the visual elements, distinctive properties of the corresponding one of the visual elements, or relative position information of the corresponding one of the visual elements in the web page;
identifying, for each of the visual elements, cluster information to interrelate the visual elements within the web page, the cluster information identifying clusters of interrelated visual elements based on respective relative position of the visual elements, respective functional relationships of the visual elements with other visual elements, or both;
associating with at least one of the visual elements or a cluster of interrelated visual elements an application that dynamically processes and/or manipulates at least one of the visual elements or the cluster of interrelated visual elements;
re-analyzing the web page in response to the web page being subsequently rendered as a re-rendered web page to re-identify each of the visual elements in the re-rendered web page;
generating, for each of the visual elements identified in the re-rendered web page, new uniform visual identifiers (nUVEIs), each of the nUVEIs uniquely identifying a corresponding one of the visual elements identified in the re-rendered web page;
associating, with each of the nUVEIs, at least one of: information regarding the re-rendered web page, distinctive information of the corresponding one of the visual elements identified in the re-rendered web page, distinctive properties of the corresponding one of the visual elements identified in the re-rendered web page, or relative position information of the corresponding one of the visual elements in the re-rendered web page;
comparing the nUVEIs with the UVEIs and associating the nUVEIs with the UVEIs based on a predefined threshold of similarity; and
adapting respective execution procedures of the application for the nUVEIs in accordance with association and comparison of the nUVEIs and the UVEIs.

2. The method of claim 1, wherein identifying, for each of the visual elements, cluster information comprises an initial step of classifying each of the visual elements into one of a plurality of predetermined classes.

3. The method of claim 2, wherein identifying, for each of the visual elements, cluster information comprises identifying, for each of the clusters of interrelated visual elements, at least one function of a respective cluster within the web page, and generating, for each respective cluster, uniform cluster function identifiers (UCFIs), each of the UCFIs including the at least one function of the respective cluster.

4. The method of claim 3, wherein identifying, for each of the visual elements, cluster information comprises identifying the visual elements and clusters of interrelated visual elements available for user interaction based on a set of predefined interaction rules, the classification of the visual elements, and the uniform cluster function identifiers (UCFIs).

5. The method of claim 1, wherein associating with at least one of the visual elements or the cluster of interrelated visual elements the application comprises receiving a user selection of the at least one of the visual elements or the cluster of interrelated visual elements;
receiving user commands to generate the application that dynamically processes and/or manipulates the selected at least one of the visual elements or the cluster of interrelated visual elements; and
setting adaptation rules for the application according to the selected at least one of the visual elements or the cluster of interrelated visual elements.

6. The method of claim 1, further comprising receiving an input representative of a user interaction with at least one of the visual elements or the cluster of interrelated visual elements; and
storing the user interaction with the at least one of the visual elements as user input in association with the one of the UVEIs, or storing the user interaction with the cluster of interrelated visual elements as user input in association with a corresponding set of the UVEIs that belong to the cluster of interrelated visual elements.

7. The method of claim 6, wherein identifying, for each of the visual elements, cluster information comprises identifying, for each of the clusters of interrelated visual elements, at least one function of a respective cluster within the web page, and generating, for each respective cluster, uniform cluster function identifiers (UCFIs); and
recording a corresponding UCFI of the respective cluster and/or recording for each of the UVEIs that belong to the respective cluster corresponding cluster information.

8. The method of claim 7, wherein identifying, for each of the visual elements, cluster information comprises classifying each of the visual elements into one or more of a plurality of predetermined classes, and wherein recording the corresponding UCFI comprises recording, for each of the UVEIs that belong to the respective cluster, corresponding cluster information and a predetermined class of each of the visual elements in the respective cluster.

9. The method of claim 1, wherein the UVEIs are stored in a database as recorded UVEIs (rUVEIs) and comparing the nUVEIs with UVEIs comprises comparing the nUVEIs with the rUVEIs stored in the database.

10. The method of claim 1, wherein re-identifying, for each of the visual elements identified in the re-rendered web page, new cluster information comprises:
re-identifying, for each of a plurality of new clusters, a function within the re-rendered web page; and
generating, for each of the new clusters, new uniform cluster function identifiers (nUCFIs), each of the nUCFIs including the function of a respective new cluster of interrelated visual elements.

11. The method of claim 10, wherein re-identifying, for each of the visual elements identified in the re-rendered web page, new cluster information further comprises an initial step of re-classifying each of the visual elements identified in the re-rendered web page into one or more of a plurality of predetermined classes.

12. The method of claim 10, further comprising comparing the nUCFIs with UCFIs stored in a database as recorded UCFIs (rUCFIs) and associating the nUCFIs with the rUCFIs based on a predefined threshold of similarity to re-establishing a previously established association between a user input and a visual element or a cluster of interrelated visual elements.

13. The method of claim 1, wherein comparing the nUVEIs with UVEIs comprises:
constructing, based on the UVEIs, an initial state representation of the at least one of the visual elements or the cluster of interrelated visual elements associated with the application;
constructing based on the nUVEIs a recent state representation of the at least one of the visual elements or the cluster of interrelated visual elements associated with the application; and
comparing the initial state representation with the recent state representation to identify contextual and structural differences.

14. The method of claim 13, wherein adapting respective execution procedures of the application comprises adapting the respective execution procedures of the application to the recent state representation of the at least one of the visual elements or the cluster of interrelated visual elements associated with the application in accordance with the identified contextual and structural differences.

15. The method of claim 14, wherein adapting respective execution procedures of the application to the recent state representation comprises identifying a procedure to adapt the respective execution procedures to the recent state representation of the at least one of the visual elements or the cluster of interrelated visual elements associated with the application according to the identified contextual and structural differences, a predefined set of adaptation rules defined for the application, and the at least one of the visual elements or the cluster of interrelated visual elements associated with the application.

16. A system comprising:
a server computer configured to:
analyze a web page rendered for a user to identify visual elements in the web page;
generate, for each of the identified visual elements, uniform visual element identifiers (UVEIs), each of the UVEIs uniquely identifying a corresponding one of the identified visual elements;
associate, with each of the UVEIs, at least one of: information regarding the web page, distinctive information of the corresponding one of the visual elements, distinctive properties of the corresponding one of the visual elements, or relative position information of the corresponding one of the visual elements in the web page;
identify, for each of the visual elements, cluster information to interrelate the visual elements within the web page, the cluster information identifying clusters of interrelated visual elements based on respective relative position of the visual elements, respective functional relationships of the visual elements with other visual elements, or both;

associate with at least one of the visual elements or a cluster of interrelated visual elements an application that dynamically processes and/or manipulates at least one of the visual elements or the cluster of interrelated visual elements;

re-analyze the web page in response to the web page being subsequently rendered as a re-rendered web page to re-identify each of the visual elements in the re-rendered web page;

generate, for each of the visual elements identified in the re-rendered web page, new uniform visual identifiers (nUVEIs), each of the nUVEIs uniquely identifying a corresponding one of the visual elements identified in the re-rendered web page;

associate, with each of the nUVEIs, at least one of: information regarding the re-rendered web page, distinctive information of the corresponding one of the visual elements identified in the re-rendered web page, distinctive properties of the corresponding one of the visual elements identified in the re-rendered web page, or relative position information of the corresponding one of the visual elements in the re-rendered web page;

compare the nUVEIs with the UVEIs and associate the nUVEIs with the UVEIs based on a predefined threshold of similarity; and adapt respective execution procedures of the application for the nUVEIs in accordance with association and comparison of the nUVEIs and the UVEIs.

17. The system of claim 16, wherein the server computer is further configured to classify each of the visual elements into one of a plurality of predetermined classes in order to identify, for each of the visual elements, respective cluster information.

18. The system of claim 17, wherein the server computer is further configured to identify, for each of the clusters of interrelated visual elements, at least one function of a respective cluster within the web page, and generate, for each respective cluster, uniform cluster function identifiers (UCFIs), each of the UCFIs including the at least one function of the respective cluster.

19. The system of claim 18, wherein the server computer is further configured to identify the visual elements and clusters of interrelated visual elements in the web page available for user interaction based on a set of predefined interaction rules, classification of the visual elements, and the uniform cluster function identifiers (UCFIs).

20. The system of claim 16, wherein the server computer is further configured to:
receive a user selection of the at least one of the visual elements or the cluster of interrelated visual elements;
receive user commands to generate the application that dynamically processes and/or manipulates the selected at least one of the visual elements or the cluster of interrelated visual elements; and
set adaptation rules for the application according to the selected at least one of the visual elements or the cluster of interrelated visual elements.

21. The system of claim 16, wherein the server computer is further configured to:
receive an input representative of a user interaction with the at least one of the visual elements or the cluster of interrelated visual elements; and
store, in a database, the user interaction with the at least one of the visual elements as user input in association with the one of the UVEIs, or store, in the database, the user interaction with the cluster of interrelated visual elements as user input in association with a corresponding set of the UVEIs that belong to the cluster of interrelated visual elements.

22. The system of claim 21, wherein the server computer is further configured to: identify, for each of the clusters of interrelated visual elements, at least one function of a respective cluster within the web page, and generate, for each respective cluster, uniform cluster function identifiers (UCFIs); and
record a corresponding UCFI of the respective cluster and/or recording for each of the UVEIs that belong to the respective cluster corresponding cluster information.

23. The system of claim 22, wherein the server computer is further configured to: classify each of the visual elements into one or more of a plurality of predetermined classes, and wherein recordation of the corresponding UCFI comprises the server computer being further configured to: record, for each of the UVEIs that belong to the respective cluster, corresponding cluster information and a predetermined class of each of the visual elements in the respective cluster.

24. The system of claim 16, further comprising a database, and wherein the server computer is further configured to store the UVEIs in the database as recorded UVEIs (rUVEIs) and compare the nUVEIs with the rUVEIs stored in the database.

25. The system of claim 16, wherein the server computer is further configured to:
re-identify, for each of a plurality of new clusters, a function within the re-rendered web page; and
generate, for each of the new clusters, new uniform cluster function identifiers (nUCFIs), each of the nUCFIs including the function of a respective new cluster of interrelated visual elements.

26. The system of claim 25, wherein the server computer is further configured to: re-classify each of the visual elements identified in the re-rendered web page into one of a plurality of predetermined classes prior to identification, by the server computer, of new cluster information.

27. The system of claim 25, wherein the server computer is further configured to: compare the nUCFIs with UCFIs stored in a database as recorded UCFIs (rUCFIs) and associate the nUCFIs with the rUCFIs based on a predefined threshold of similarity to re-establish a previously established association between a user input and a visual element or a cluster of interrelated visual elements.

28. The system of claim 16, wherein the server computer is further configured to:
construct, based on the UVEIs, an initial state representation of the at least one of the visual elements or the cluster of interrelated visual elements associated with the application;
construct based on the nUVEIs a recent state representation of the at least one of the visual elements or the cluster of interrelated visual elements associated with the application; and
compare the initial state representation with the recent state representation to identify contextual and structural differences.

29. The system of claim 28, wherein the server computer is further configured to: adapt the respective execution procedures of the application to the recent state representation of the at least one of the visual elements or the cluster of interrelated visual elements associated with the application in accordance with the identified contextual and structural differences.

30. The system of claim 29, wherein the server computer is further configured to: identify a procedure to adapt the respective execution procedures to the recent state representation of the at least one of the visual elements or the cluster of interrelated visual elements associated with the application according to identified contextual and structural differences, a predefined set of adaptation rules defined for the application, and the at least one of the visual elements or the cluster of interrelated visual elements associated with the application.

31. A non-transitory computer readable medium storing instructions executable by a processor, the computer readable medium comprising:

instructions executable with the processor to analyze a web page rendered for a user to identify visual elements in the web page;

instructions executable with the processor to generate, for each of the identified visual elements, uniform visual element identifiers (UVEIs), each of the UVEIs uniquely identifying a corresponding one of the identified visual elements;

instructions executable with the processor to associate, with each of the UVEIs, at least one of: information regarding the web page, distinctive information of the corresponding one of the visual elements, distinctive properties of the corresponding one of the visual elements, or relative position information of the corresponding one of the visual elements in the web page;

instructions executable with the processor to identify, for each of the visual elements, cluster information to interrelate the visual elements within the web page, the cluster information identifying clusters of interrelated visual elements based on respective relative position of the visual elements, respective functional relationships of the visual elements with other visual elements, or both;

instructions executable with the processor to associate with at least one of the visual elements or a cluster of interrelated visual elements an application that dynamically processes and/or manipulates at least one of the visual elements or the cluster of interrelated visual elements;

instructions executable with the processor to re-analyze the web page in response to the web page being subsequently rendered as a re-rendered web page to re-identify each of the visual elements in the re-rendered web page;

instructions executable with the processor to generate, for each of the visual elements identified in the re-rendered web page, new uniform visual identifiers (nUVEIs), each of the nUVEIs uniquely identifying a corresponding one of the visual elements identified in the re-rendered web page;

instructions executable with the processor to associate, with each of the nUVEIs, at least one of: information regarding the re-rendered web page, distinctive information of the corresponding one of the visual elements identified in the re-rendered web page, distinctive properties of the corresponding one of the visual elements identified in the re-rendered web page, or relative position information of the corresponding one of the visual elements in the re-rendered web page;

instructions executable with the processor to compare the nUVEIs with the UVEIs and associate the nUVEIs with the UVEIs based on a predefined threshold of similarity; and instructions executable with the processor to adapt respective execution procedures of the application for the nUVEIs in accordance with association and comparison of the nUVEIs and the UVEIs.

\* \* \* \* \*

UNITED STATES PATENT AND TRADEMARK OFFICE
CERTIFICATE OF CORRECTION

| | |
|---|---|
| PATENT NO. | : 12,293,148 B2 |
| APPLICATION NO. | : 18/178382 |
| DATED | : May 6, 2025 |
| INVENTOR(S) | : Osman Levent Soyarslan |

Page 1 of 1

It is certified that error appears in the above-identified patent and that said Letters Patent is hereby corrected as shown below:

On the Title Page

In item (71) Applicant, delete "AR" and replace with --TR--.

In item (72) Inventor, delete "AR" and replace with --TR--.

Signed and Sealed this
First Day of July, 2025

Coke Morgan Stewart
*Acting Director of the United States Patent and Trademark Office*